US008121808B2

(12) United States Patent
Huang et al.

(10) Patent No.: US 8,121,808 B2
(45) Date of Patent: Feb. 21, 2012

(54) SYSTEMS AND METHODS FOR LOCATION, MOTION, AND CONTACT DETECTION AND TRACKING IN A NETWORKED AUDIOVISUAL DEVICE

(75) Inventors: Andrew Shane Huang, Cardiff-by-the-Sea, CA (US); Duane Stewart Maxwell, San Diego, CA (US); Kenneth Earl Steele, San Diego, CA (US); Stephen Lawrence Tomlin, San Diego, CA (US); Steven Michael Adler, San Diego, CA (US)

(73) Assignee: Chumby Industries, Inc., San Diego, CA (US)

( * ) Notice: Subject to any disclaimer, the term of this patent is extended or adjusted under 35 U.S.C. 154(b) by 0 days.

(21) Appl. No.: 12/857,448

(22) Filed: Aug. 16, 2010

(65) Prior Publication Data

US 2011/0093227 A1 Apr. 21, 2011

Related U.S. Application Data

(63) Continuation of application No. 11/953,756, filed on Dec. 10, 2007, now Pat. No. 7,778,792.

(60) Provisional application No. 60/869,297, filed on Dec. 8, 2006.

(51) Int. Cl.
*G06F 15/00* (2006.01)

(52) U.S. Cl. ....................................................... 702/141
(58) Field of Classification Search ................. 702/141, 702/190; 701/207, 220
See application file for complete search history.

(56) References Cited

U.S. PATENT DOCUMENTS

| 4,980,833 | A | 12/1990 | Milligan et al. |
| 5,862,511 | A | 1/1999 | Croyle et al. |
| 7,778,792 | B2 * | 8/2010 | Huang et al. ............... 702/141 |
| 2007/0176898 | A1 | 8/2007 | Suh |

OTHER PUBLICATIONS

U.S. Appl. No. 11/953,756 Non-Final Rejection Jan. 8, 2010.
U.S. Appl. No. 11/953,756 Non-Final Rejection Sep. 14, 2009.

* cited by examiner

*Primary Examiner* — Bryan Bui
(74) *Attorney, Agent, or Firm* — Cooley, LLP

(57) ABSTRACT

Systems and methods for location, motion, and contact detection and tracking in a portable networked device are disclosed. A portable device may include a motion detection unit including an accelerometer for detecting accelerations in one or more axes. Signals associated with the detected motion are processed to generate estimates of device acceleration, velocity, and relative and absolute locations. Additional processing may be performed to detect user gestures or other user input relevant to portable device control. Particular motion or vibrational characteristics may be also be detected and used by other processes in the portable device.

27 Claims, 49 Drawing Sheets

Choose Option & GO:
- Add Widget
- Edit Widget
- Remove Widget
- GO
- BACK

FIG. 26B

Choose Category & GO:
- News
- Sports
- Media
- Weather
- Finance
- GO
- BACK

FIG. 26C

Choose Widget & GO:
- Widget 1
- Widget 2
- ...
- Widget N
- GO
- BACK

FIG. 26D

You have selected the "Name" widget: "Widget description." Continue?
- GO
- BACK

FIG. 26E

Configure Widget Now?
- GO

OR
Use Defaults for Widget.
- GO

SYSTEMS AND METHODS FOR LOCATION, MOTION, AND CONTACT DETECTION AND TRACKING IN A NETWORKED AUDIOVISUAL DEVICE

CROSS-REFERENCE TO RELATED APPLICATIONS

This application is a continuation of U.S. patent application Ser. No. 11/953,756, entitled SYSTEMS AND METHODS FOR LOCATION, MOTION, AND CONTACT DETECTION AND TRACKING IN A NETWORKED AUDIOVISUAL DEVICE, filed Dec. 10, 2007 now U.S. Pat. No. 7,778,792, which claims priority under 35 U.S.C. §119 (e) to U.S. Provisional Patent Application Ser. No. 60/869, 297, entitled SYSTEMS AND METHODS FOR LOCATION, MOTION, AND CONTACT DETECTION AND TRACKING IN A NETWORKED AUDIOVISUAL DEVICE, filed Dec. 8, 2006, the contents of which is incorporated by reference herein in its entirety for all purposes. This application is related to U.S. Utility patent application Ser. No. 11/845,018, entitled CONFIGURABLE PERSONAL AUDIOVISUAL DEVICE FOR USE IN NETWORKED APPLICATION SHARING SYSTEM, to U.S. Utility patent application Ser. No. 11/845,026, entitled SYSTEM AND METHOD FOR TRANSFERRING ELECTRONIC CONTENT TO NETWORKED PERSONAL AUDIOVISUAL DEVICES, to U.S. Utility patent application Ser. No. 11/845,027, entitled SYSTEM AND METHOD FOR AUTOMATICALLY UPDATING THE SOFTWARE OF A NETWORKED PERSONAL AUDIOVISUAL DEVICE, and to U.S. Utility patent application Ser. No. 11/845,021, entitled NETWORKED PERSONAL AUDIOVISUAL DEVICE HAVING FLEXIBLE HOUSING, the contents of each of which is hereby incorporated by reference herein in its entirety for all purposes.

BACKGROUND

It is well known that broadband Internet connectivity is becoming substantially more pervasive among consumers as a result of competition among service providers utilizing various different technologies (e.g., cable, digital subscriber line (DSL), satellite). In many households personal computers (PCs) constitute the primary users of the bandwidth furnished by these broadband connections. In order to facilitate sharing of the Internet connection among PCs in a given household, a variety of "wired" and "wireless" home networking technologies have been utilized.

As a result of the impracticality of installing Ethernet cable throughout a residence, RF-based wireless networking technology is becoming increasingly commonplace among consumers. Although systems based upon the 802.11b, or "Wi-Fi", wireless networking standard may currently be the most pervasive, versions of the 802.11 standard offering increased bandwidth have been introduced and yet higher-bandwidth approaches have been proposed.

The increased bandwidth available within the home has increased the usage of a number of different services, such as Internet-based delivery of digital audio, video and graphic content. However, since many of these services are facilitated by a desktop or notebook PC capable of communication over a broadband Internet connection, users are forced to remain proximate to their respective computers in order to utilize such services. Although other strategies to leverage the availability of broadband Internet connectivity within the home are currently being developed, many of these approaches involve creation of a relatively powerful, costly centralized communications "hub" (e.g., a PC with enhanced media capabilities, or a multi-purpose cable set-top box). Unfortunately, this typically requires either the purchase of an expensive hardware device or extended subscription plan, and constrains the extent to which Internet-enabled entertainment or other services are enjoyed outside of the immediate vicinity of the centralized hub device.

Accordingly, the increasing availability of wireless bandwidth within the home and elsewhere creates an opportunity for economically leveraging this bandwidth in a flexible, consumer-friendly manner.

BRIEF DESCRIPTION OF THE DRAWINGS

For a better understanding of the nature of the features of the invention, reference should be made to the following detailed description taken in conjunction with the accompanying drawings, in which:

FIGS. 26A-26E are screen shots of exemplary user interfaces presented by a Web browser used to facilitate certain of the processes described by FIGS. 22-25.

DETAILED DESCRIPTION OF EMBODIMENTS OF THE INVENTION

Overview

Figure 1:
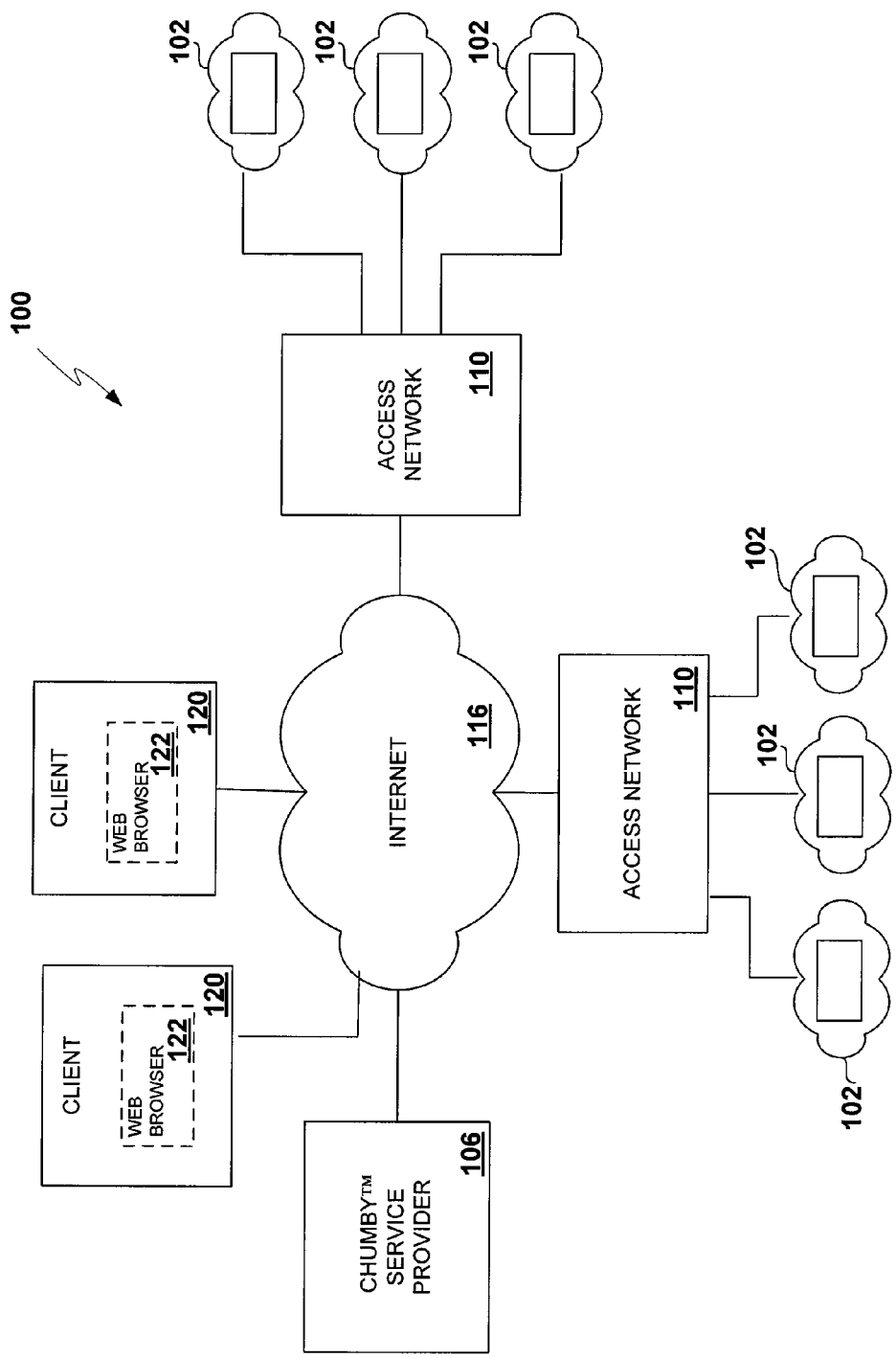
FIG. 1 is a block diagram illustrating a set of networked components comprising an embodiment of a system in accordance with aspects of the present invention.

The present invention generally relates to a system comprised of a set of personalized audiovisual devices in Internet-based communication with a service provider. It is anticipated that the personalized networked audiovisual devices will be commercially distributed under the trademark CHUMBY™, and may also be referred to herein as "CHUMBY™ devices," or "portable devices."

During communication with the service provider, each portable device periodically receives a set of application programs, or "widgets", which are sequentially executed by the portable device after being received from the service provider or locally from a personal computer (e.g., via a USB connection). Since each portable device is typically Internet-enabled, each may also be remotely configured and otherwise personalized via the portable device service provider through a Web browser executed by a remote terminal (e.g., a PC or wireless handset). Such personalization may include, for example, specifying the set of widgets provided to a given portable device as well as their sequence and priority of execution.

As is described hereinafter, it is a feature of embodiments of the invention that a user configuring a portable device via an interface provided by the portable device service provider may "drag and drop" icons representative of various widgets onto a rectangular or other portion of the interface representative of the screen of the portable device being configured. In this way the "layout" of the screen of the portable device may be remotely configured by the owner of the device. Although each portable device will preferably be capable of being configured in this manner, in certain embodiments each may also come "loaded" with a default set of widgets (e.g., an "alarm clock" widget) disposed to be executed by the portable device upon its registration with the portable device service provider. Once a portable device has been configured (i.e., with either a "default" or user-specified configuration), it will generally execute the widgets defined by the configuration without user intervention.

The configuration of a portable device may also specify the events or conditions under which the sequence of execution of widgets is to be altered or interrupted, and allows certain widgets to be accorded the highest available priority with respect to execution. For example, an "alarm clock" widget could be granted such priority in order to ensure that its alarm function would not be prevented from being actuated at the scheduled time due to contemporaneous execution of another widget. In one embodiment the Web interface provided by the portable device service provider is in the form of a "timeline" enabling the sequence of execution of the widgets associated with a given portable device to be controlled in an intuitive manner. In an exemplary implementation the timeline defines the order in which the widgets are to be played in a constantly repeating sequence; that is, the timeline is representative of the complete set of widgets played by a given portable device as well as their relative order of execution. However, certain widgets (e.g., the "alarm clock" widget) can be specified to be actuated at a given time by appropriately setting the applicable configuration element of such widgets.

Although in exemplary embodiments it is not contemplated that more than a single "content-related" widget be operative at any given time, a system configuration widget may be utilized to run concurrently with each such content-related widget in order to, for example, control the relative priority of execution of such content-related widgets and system settings such as loudness, brightness, navigation, and the like.

In one embodiment portable devices are each capable of wireless communication in accordance with an accepted wireless networking standard, such as the 802.11b or 802.11g standard. Accordingly, in homes or other environments containing one or more wireless access points, multiple portable devices may be distributed throughout the coverage area of the access points.

Among the features of the invention is the capability of the interface presented by each portable device to change in accordance with the nature of the widget currently being executed by the device. For example, a "clock radio" widget could be employed to produce audio and visual imagery consistent with a conventional alarm clock at an appointed time in the morning. In exemplary embodiments the clock radio widget would allow for the selection of a standard "wake up" chime or choice of several different audio programs. Later in the day the device interface could be devoted to a rotating selection of several standard information screens such as news headlines, local weather, sports scores, stock market updates, horoscope and the like.

In accordance with another aspect of the invention, users of portable devices may optionally participate in a portable device network (also denoted herein as a "CHUMBY™ Network") along with other users by logging on to an associated Web site (e.g., www.chumby.com) hosted by the portable device service provider. At this site (also referred to hereinafter as the "CHUMBY™ site" or portable device site) a user will be able to register with the portable device network and access services enabling the basic capabilities of the user's portable device to be enhanced and refined. Such enhancements may comprise, for example, the opportunity to send/receive widgets and other content to/from other portable device users, for improved personalization of the device's generic information features, more detailed alarm-setting capabilities, and better selection and configuration of audio capabilities.

In an exemplary embodiment related to a CHUMBY™ Network, registration, which would potentially require payment of a periodic subscription fee, enables members of the Network to access a wide array of additional widgets. It is contemplated that certain of such widgets would be developed by the entity operating the CHUMBY™ Network while other widgets would be developed by independent developers. In addition, members of the "CHUMBY™ Network would also be able to communicate with the CHUMBY™ devices of other members, provided that permission for such communication has been authorized by the other members. Such communication could entail, for example, the sending of a widget and corresponding data from the CHUMBY™ service provider to a member of the CHUMBY™ Network (the "receiving member") in response to a request sent to the CHUMBY™ service provider by another member (the "sending member"). For example, a sending member could, after receiving permission from a receiving member, request the CHUMBY™ service provider to send a "photo-viewer" widget to the receiving member. In addition, the sending member could specify that a link be established between the photo-viewer widget and pictures uploaded by the sending member to the CHUMBY™ service provider. In this way the receiving member could, without any effort other than providing authorization to the sending member, enable their CHUMBY™ device to essentially automatically receive and display a sequence of photos provided by the sending member. Similarly, while traveling a sending member could send a personalized "wake up" message to the CHUMBY™ device of a consenting receiving member. Finally, a sending member could send widgets to a group of receiving members included on a "buddy list" of the sending member, which could be established after the receipt of suitable permissions from those proposed to be included on the list.

In an exemplary embodiment members of the CHUMBY™ Network are enabled to completely configure, through any Web browser, their respective CHUMBY™ portable devices by specifying a set of "premium" widget programs or content to play or be shown rotationally (or in some other user-defined sequence) on their respective CHUMBY™ portable devices. Such premium widgets and content may include, for example, webcam shots, RSS readers, filtered news reports, personalized stock performance data, short animations or movies, podcasts or audio files to function as the audio sources for alarms or reminders scheduled to be triggered at different times throughout the day.

As is discussed further below, one exemplary implementation of a CHUMBY™ portable device is comprised of a malleable housing attached to a rigid "core" structure supporting a display screen and the electrical components of the device. The malleable housing would generally encompass all of the electrical components of the CHUMBY™ device, including those related to acceleration/motion sensing, detection, tracking, and processing, and will preferably be filled with an appropriate material or otherwise constructed to enable it to be "squeezed" or otherwise deformed by a user.

Moreover, in one exemplary embodiment, the core structure is designed to be capable of being removed from the housing and "snapped" in to a different housing. A set of "bend sensors" are enclosed by the malleable housing in order to permit the detection of such a squeezing or similar action by a user. In this way a user is afforded the opportunity of conveying information through physical deformation of the portable device in addition to the more conventional textual and other modes of communication facilitated by the display screen. For example, in one exemplary system a user could initiate the conveying of a "hug" to another user by squeezing the housing of the user's portable device in a particular manner. The electrical signals generated by the sensor array in response to this squeeze would be appropriately interpreted and the user's portable device would communicate, via the portable service provider, a "hug" message to the intended recipient user. At this point the recipient's portable device could register receipt of the hug message by, for example, illuminating an indicator light or sending a message to the display of the device.

In certain embodiments a portable device may have modules including hardware, software, or both hardware and software in combination for use in detecting and tracking device location and relative position, as well as for tracking physical contacts with the device and for detecting and tracking motion, gestures, or other vibrational actions. In one exemplary embodiment, a portable device may include an accelerometer and related hardware and software to implement a variety of motion related functions including motion detection, position identification and tracking, gesture recognition, as well as other user contact such as detecting a user squeezing or squishing the device.

System Components

FIG. 1 is a block diagram illustrating a set of networked components comprising an exemplary embodiment of the system 100 of the invention. As shown, the system 100 comprises one or more personal audiovisual devices (portable devices) 102 in communication with a central service provider 106 via one or more access networks 110 and the Internet 116. As those skilled in the art will appreciate, the access networks 110 are representative of various intermediary network routing and other elements between the Internet 116 and the personal audiovisual devices 102. Such intermediary elements may include, for example, gateways or other server devices, and other network infrastructure provided by Internet service providers (ISPs). As is discussed below, the personal audiovisual devices 102 obtain application programs ("widgets") for execution from the central service provider 106 or locally from a personal computer or other computing device. In this regard the service provider 106 typically contains a repository of widgets and has access to other content capable of being communicated to a given portable device 102 upon the request of its authorized user or another user to which appropriate permission has been granted.

Referring again to FIG. 1, the system 100 also includes a plurality of user computers 120 disposed for communication with the service provider 106 via an access network (not shown) and the Internet 116. Each user computer 120 executes a Web browser 122 capable of displaying Web pages generated by the service provider 106 through which a user may configure one or more portable devices 102. As mentioned above, such configuration may include, for example, specifying a set of widgets to be sent to a particular portable device 102 and their sequence of execution, adjusting audio or visual parameters relating to such execution, defining and managing a user's portable device network (including, for example, defining a "buddy list" comprised of other portable device users with respect to which the portable device 102 is permitted to communicate), and defining the layout or other aspects of the user interface presented through the screen of the portable device 102. To this end a given Web browser 122 may, when in communication with the service provider 106, present a rectangular configuration window corresponding to the display screen of a corresponding portable device 102. By "dragging and dropping" iconic representations of widgets or content files into such a configuration window, a user may personalize the behavior and user interface presented by the corresponding portable device 102. Moreover, users may access the service provider 106 via a Web browser 122 for the purpose of sending widgets or other information to other users for execution or display by their respective portable devices 102. In one embodiment the service provider 106 maintains a record of the permissions granted among users of portable devices in order to determine which users are authorized to provide, via the service provider 106, a given user with widgets, messages or other information, and vice-versa. Such permissions may be granted or withdrawn by a given user via appropriate pages presented by a Web browser 122 in communication with the service provider 106.

In the exemplary embodiment a configuration window may be utilized to configure one or more portable devices 102 consistent with the permissions granted by the users of such devices 102. In addition, a user of a given portable device 102 may elect to have the interface of the device 102 "mirror" or otherwise replicate that of another device 102 subject to the requisite permissions being granted. Similarly, one or more portable devices 102 may be configured to mirror the interface for a "virtual" portable device (or vice-versa) defined via a configuration window.

Different users of a given portable device 102 may be accorded different roles or privileges in configuring the device 102. For example, a user granted supervisory privileges could be given the authority to filter or monitor the widgets or content sent to the portable device 102. This would enable, for example, parents to manage and/or monitor the widgets and content executed and displayed by the one or more portable devices 102 used by their children. Moreover, administrators of the system 100 would typically possess an elevated level of privilege relative to users of portable devices 102 within the system 100. Also, if a specific widget performs functions requiring communication with a web site controlled by a third party in order to access content, the developer of the widget may create a hierarchical user model to regulate such access (and perhaps the functions of the widget).

Figure 2:
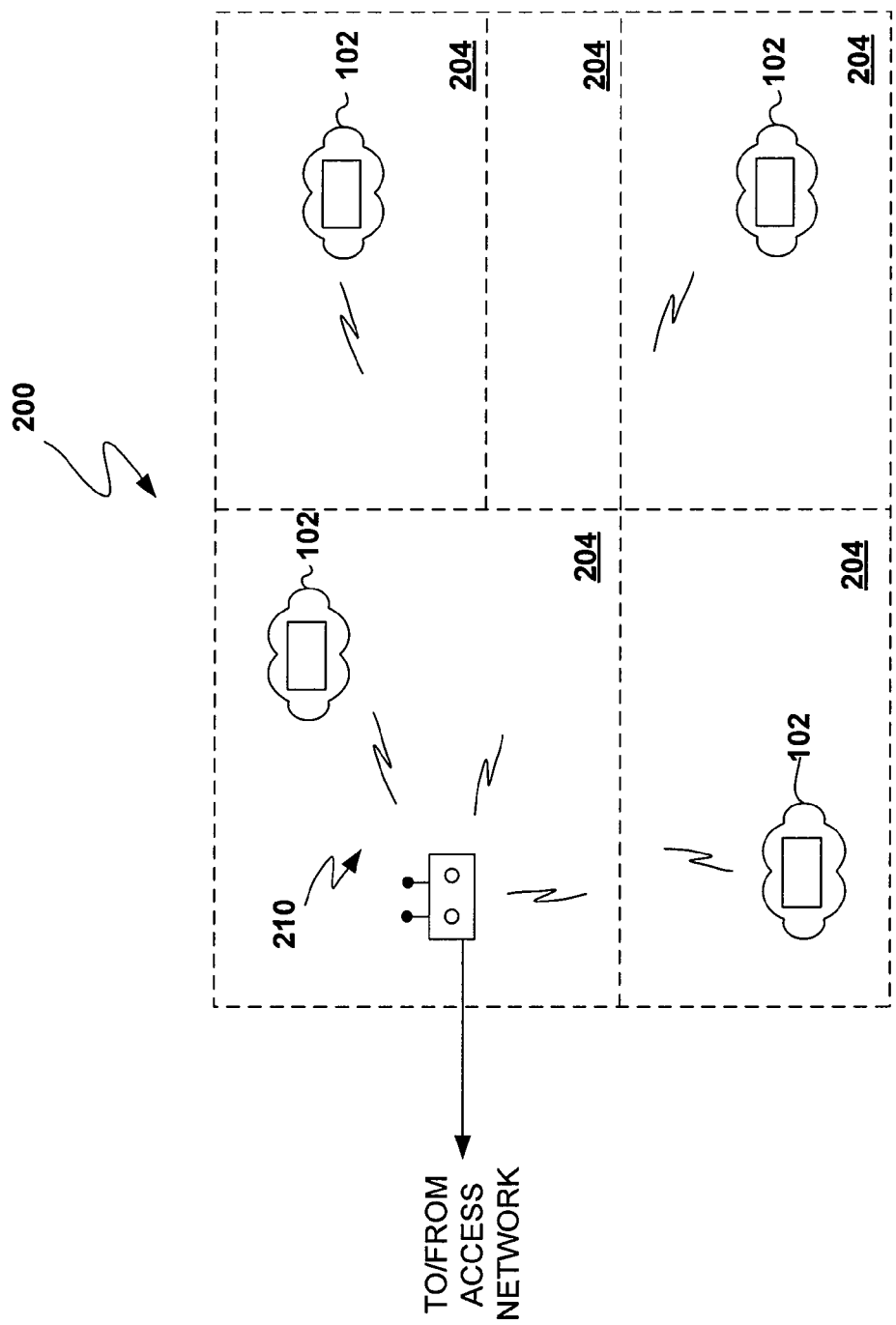
FIG. 2 illustrates a configuration of portable devices in accordance with aspects of the present invention distributed throughout a residence or other building having a several rooms.

Attention is now directed to FIG. 2, which illustrates an exemplary distribution of portable devices 102 throughout a residence 200 or other building having a number of rooms 204. In the embodiment of FIG. 2, each portable device 102 is equipped with wireless transceiver (e.g., a Wi-Fi transceiver) to facilitate communication with one or more access points 210. Each access point is interconnected with an access network 110 by way of, for example, a local area network, thereby enabling Internet-based communication to be established between the service provider 106 and the devices within the residence 200.

Figure 3:
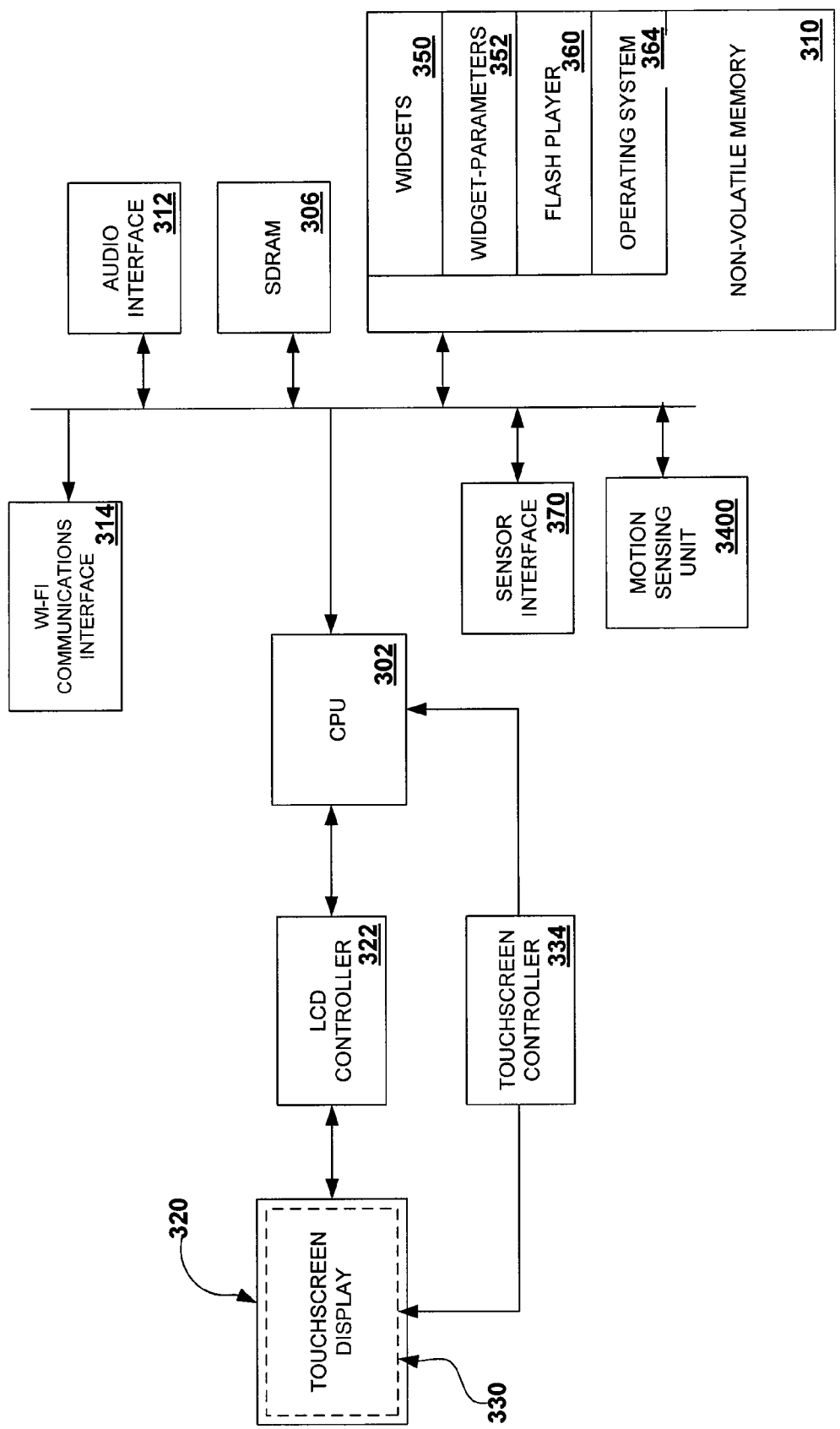
FIG. 3 is a block diagrammatic representation of the principal components of an embodiment of a portable device in accordance with aspects of the present invention.

Turning now to FIG. 3, a block diagrammatic representation is provided of the principal components of an embodiment of a portable device of the present invention. As shown, the device includes a central processing unit (CPU) 302, memory including volatile (e.g., SDRAM) 306 and non-volatile memory 310 (e.g., flash memory), an audio interface 312, a wireless communications interface 314, and a sensor interface 370. In an exemplary implementation the CPU 302 comprises a microprocessor (e.g., based upon an ARM core) configured to run a Linux kernel and having attendant capabilities for graphics rendering. The device may or may not include a battery backup unit, which serves to preserve real-time information in the event of a power outage, and may also serve as a primary power source if the user desires untethered operation. The battery may or may not be rechargeable. The operating system is made aware of the power status and actively configures the portable device and the running widget to either save power or modify the user interface consistent with untethered operation.

The portable device may or may not include a Security Module (not shown). If included, the Security Module serves to store secrets and compute authentication algorithms in a fashion that fully isolates core security routines from otherwise unsecured code running on CPU 302. The secret storage and authentication capability may or may not be used by the client-server communication protocol to enable authenticated and encrypted communication capabilities for, among other things, financial transactions. The Security Module is initialized in such a way that there is no default mapping of the secrets contained within the module versus the identity of the hardware of the user. Furthermore, the secrets are revocable and a routine exists for generating new secrets based upon a master secret that is never associated with a specific user's profile. This enables opt-in policies for privacy and a limited ability to revoke identity information, barring forensic network analysis, thereby enabling anonymity as well. The anonymous trust network can be extended with a variety of client-server protocols to enable a wide range of anonymous transactions, including but not limited to cash and content transactions.

As shown, software comprising widgets 350 or other applications received from the service provider 106 are stored in memory 310 and loaded into SDRAM 306 or non-volatile memory 310 for execution by the CPU 302. In one embodiment widgets are downloaded from the service provider 106 to portable devices in the format of a "Macromedia Flash" file, also referred to as a "Flash movie". As is known by those skilled in the art, Flash movies are usually accorded a ".swf" file extension and may be played by a Flash Player developed and distributed by Adobe Systems. Accordingly, the memory 310 also includes a Flash Player 360 as well as a copy of the operating system 364 executed by the CPU 302. In other embodiments widgets may be developed in accordance with other formats and played by players compatible with such other formats.

The portable device also includes a display, such as liquid crystal display (LCD) 320 controlled by an LCD controller 322, which may or may not be integrated into the CPU 302. The display 320 visually renders iconic representations of the widget programs stored within the portable device and images generated in connection with the execution of such widgets by the CPU 302. In an exemplary implementation a touchscreen 330 overlays the LCD 320 and is responsive to a touchscreen controller 334. In one embodiment a user may induce the portable device to enter a "user interface mode" or "U.I. mode" by touching the touchscreen 330. When this occurs the touchscreen controller 334 informs the CPU 302, which then instructs the LCD 320 to enter U.I. mode and display representations of arrows, buttons and/or icons selectable by the user via the touchscreen 330. As is discussed below, selection of one or more of these elements during operation in the U.I. mode enables the user to control various aspects of the operation of the portable device. In alternate implementations the LCD 320 and touchscreen 330 may comprise an integral device controlled by an integrated controller.

Figure 4:
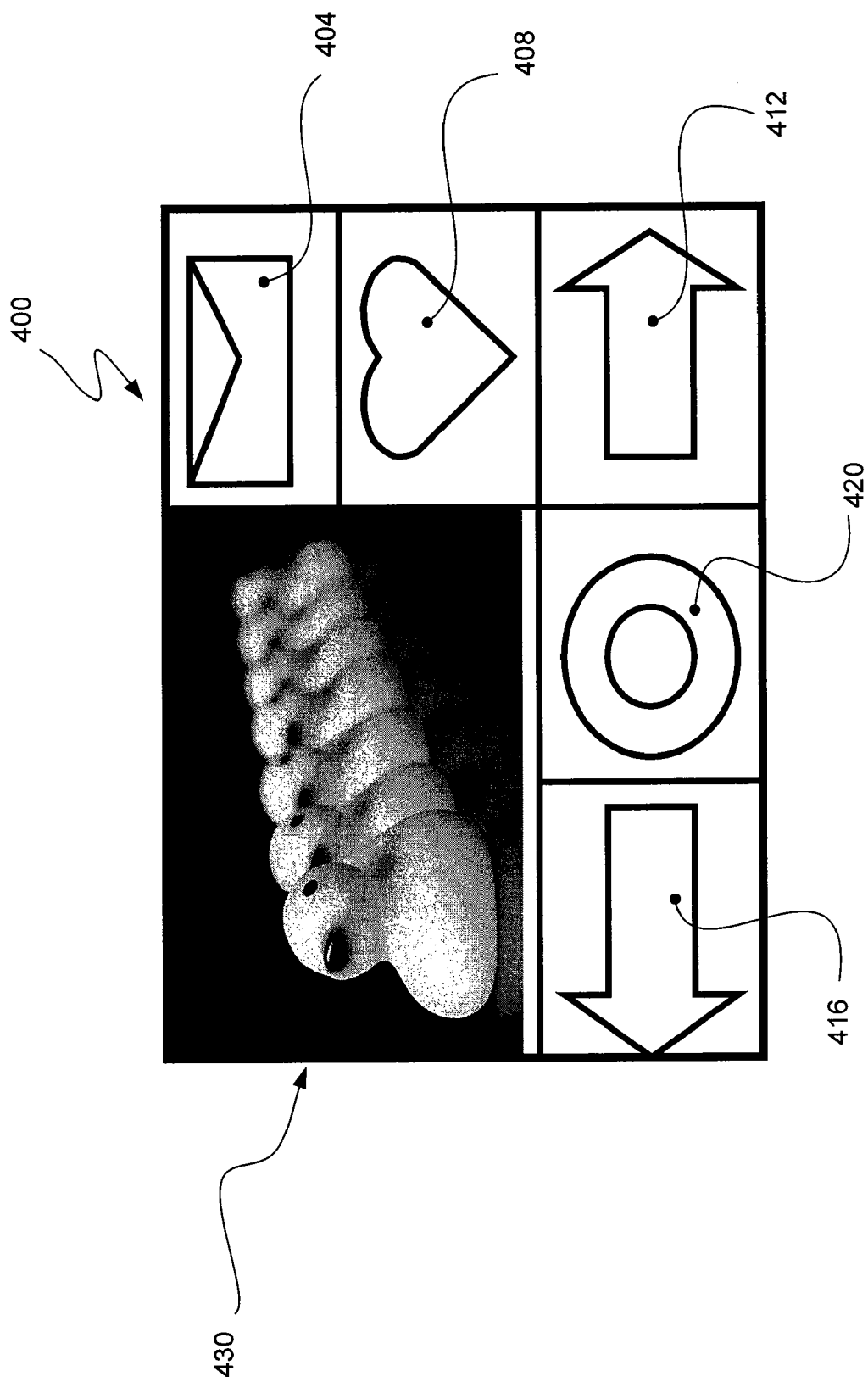
FIG. 4 shows an exemplary user interface generated through a screen of a portable device during operation of the portable device in a control panel mode.
Figure 5A:
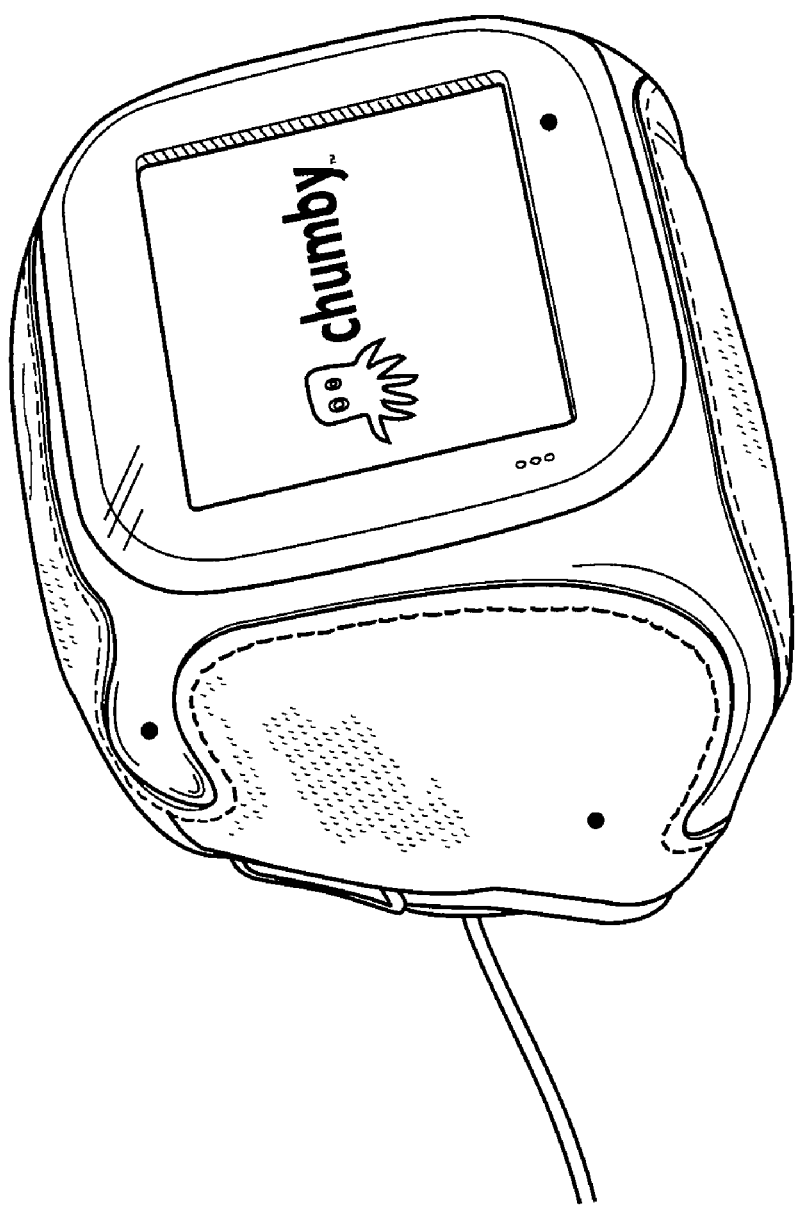
FIG. 5A-5E illustrates various views of an exemplary portable device configured with a malleable housing.
Figure 5B:
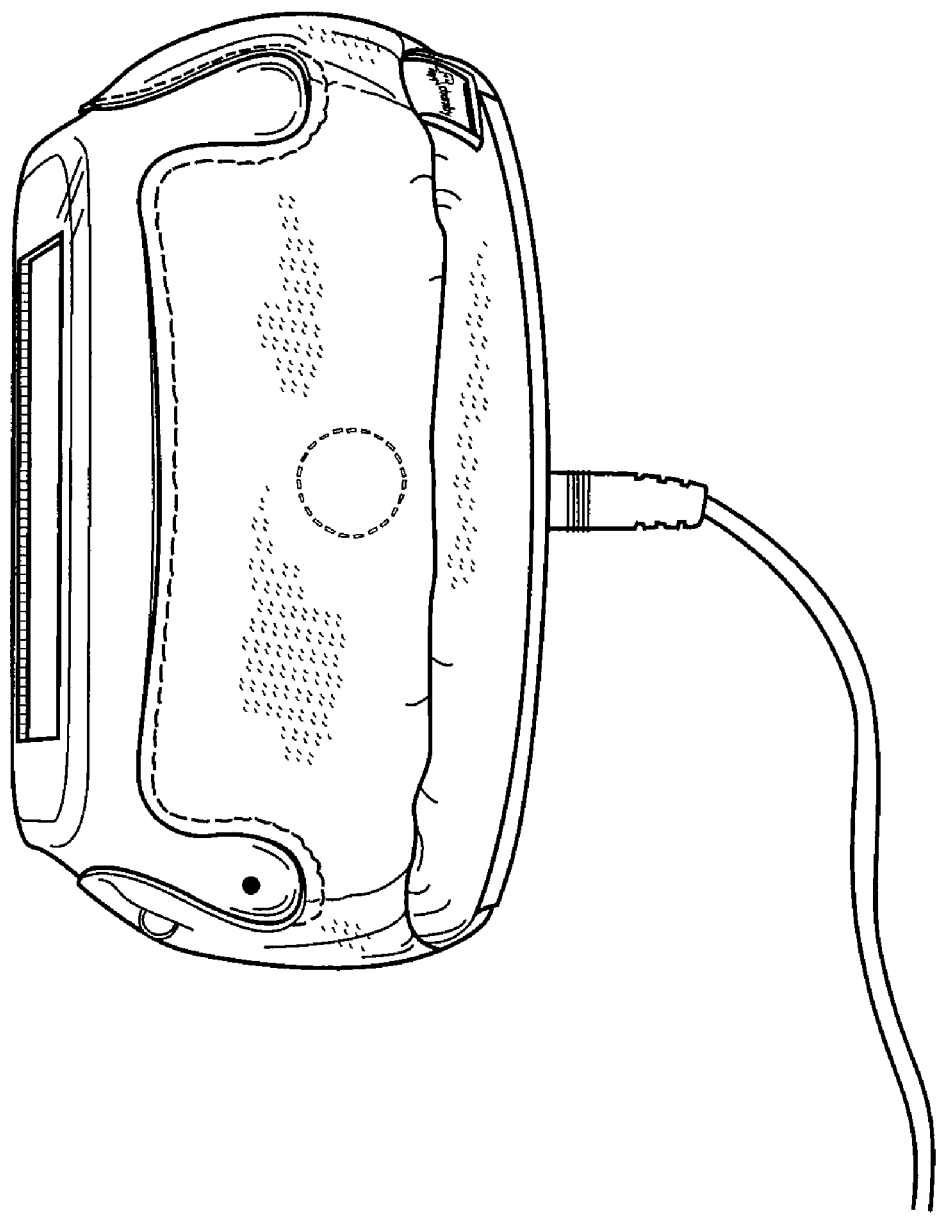
Figure 5C:
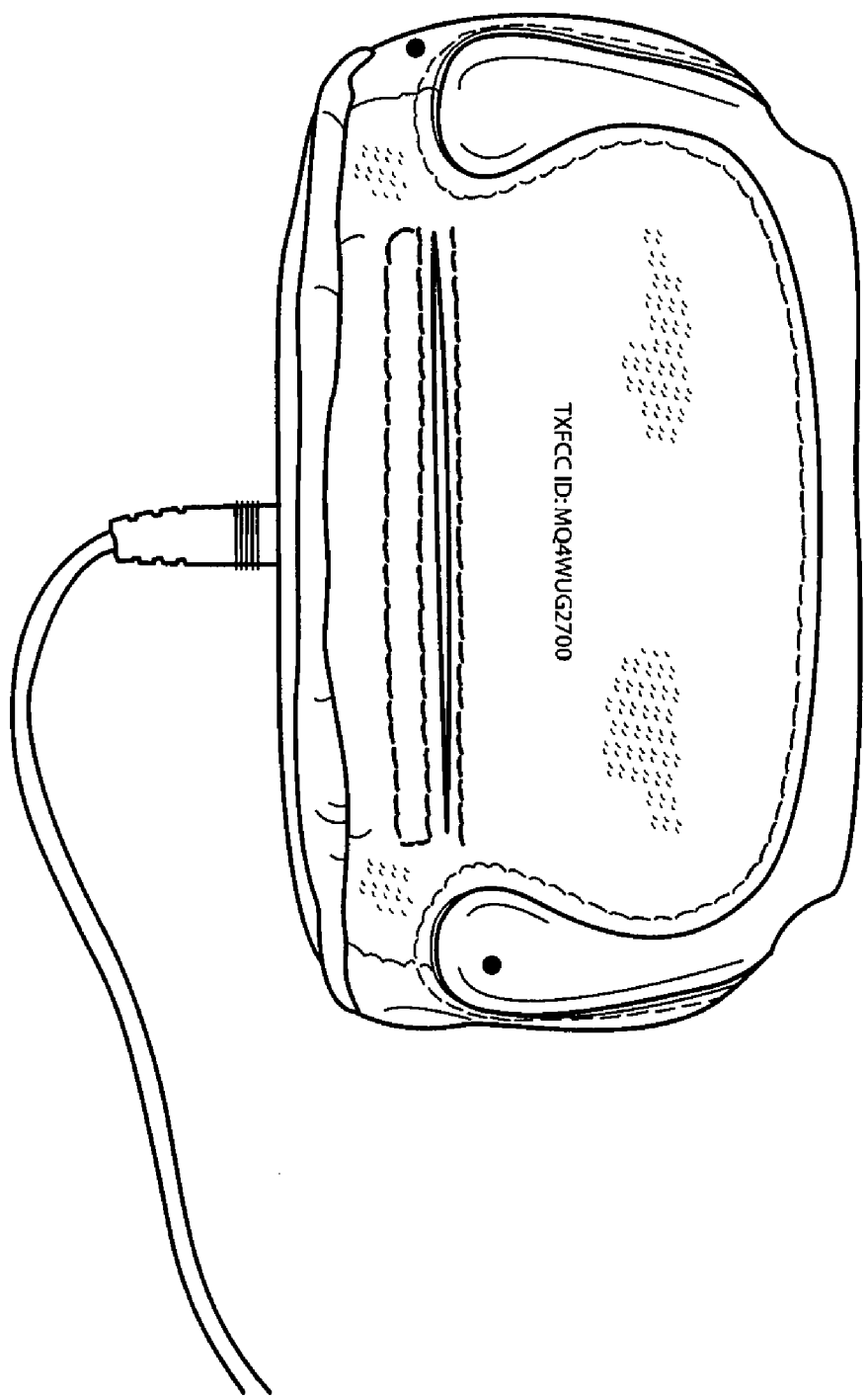
Figure 5D:
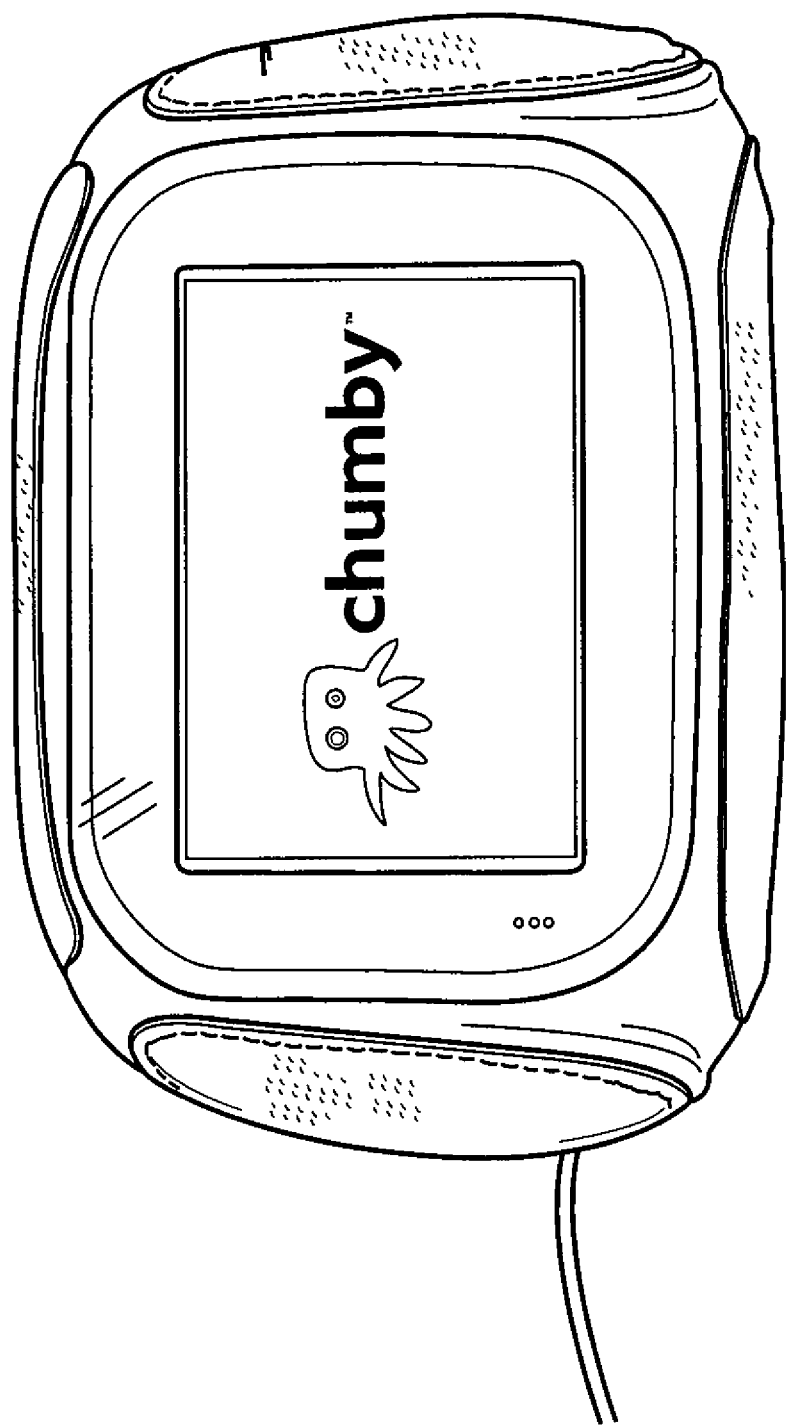
Figure 5E:
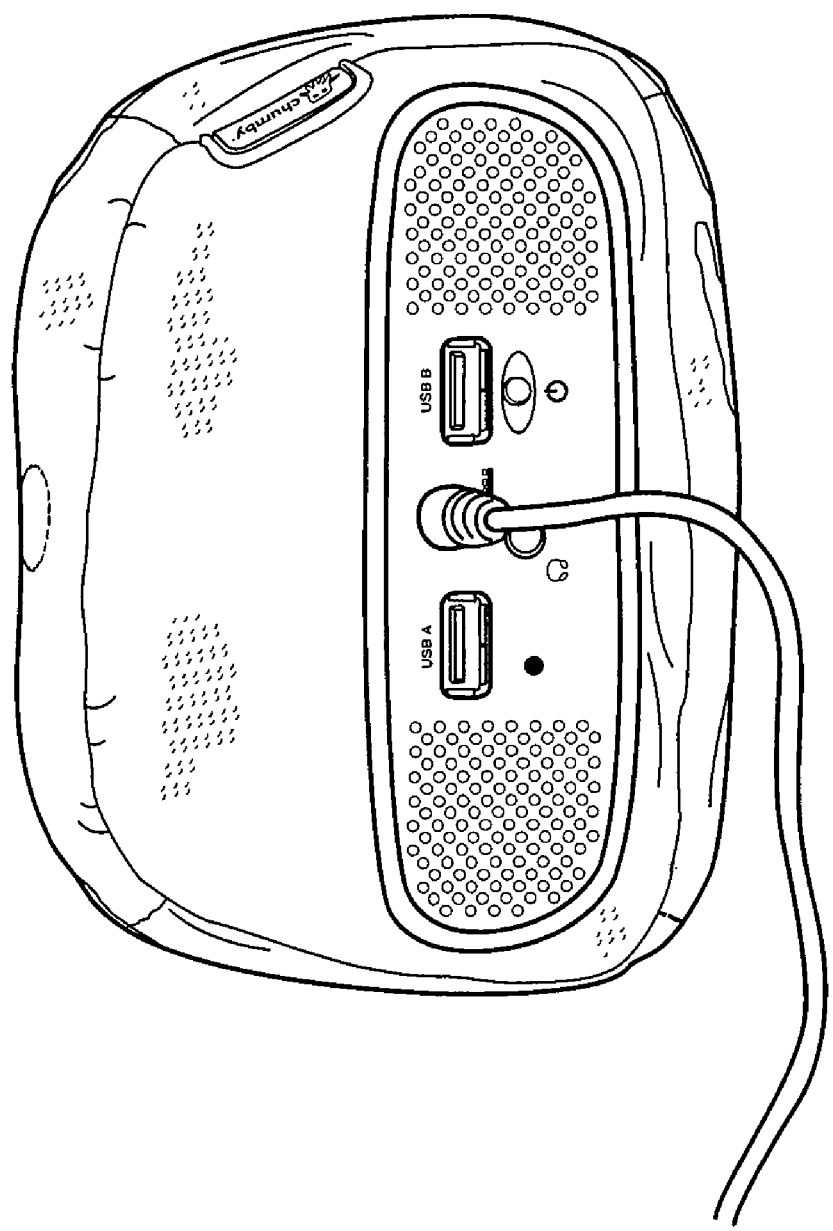

Turning to FIG. 4, there is shown an exemplary user interface 400 generated by the LCD 320 during operation of the portable device in U.I. mode. As shown, the interface 400 defines an address book icon 404, a heart-shaped icon 408, a right arrow button 412, a left arrow button 416, and an exit U.I. mode icon 420. Selection of the address book icon 404 brings up a personalized list of other users of portable devices to which it may be desired to send widgets or otherwise communicate. A user may, from any Web browser 122, access a Web page generated by the service provider 106 and designate a "favorite" widget. Alternatively, a user may press a virtual, touchscreen-based button on his or her portable device 102 to designate the current widget as the new "favorite" widget. When the user then selects the heart-shaped icon 408 on his or her portable device, an iconic representation of this favorite widget (e.g., a clock widget) replaces the heart-shaped icon 408 and enables the user to immediately activate (i.e., cause the CPU 302 to execute) the program instructions corresponding to such favorite widget. Alternatively, selection of the heart-shaped icon 408 (or other predefined icon) results in the portable device becoming configured in accordance with a "favorite" or other profile rather than executing a favorite widget. Of course, certain profiles may be specified to include only a single widget such as, for example, an "alarm clock" or "photo viewer widget.

Referring again to FIG. 4, selection of the right arrow button 412 advances one widget in a user-defined (or default) widget sequence, or just skips ahead in implementations in which widgets are chosen to be displayed randomly. Similarly, selection of the left arrow button 416 results in "going back" one widget in the user-defined (or default) widget sequence. As the buttons 412 and 416 are selected, an iconic representation or avatar corresponding to the currently active widget is displayed in a display box 430. If it is desired to configure the currently active widget, the exit U.I. mode icon 420 is selected and the U.I. mode interface 400 changes to a screen though which the user may adjust parameters of the active widget (e.g., set time or alarm in the case of an active "clock" widget).

In certain embodiments a physical button element (not shown) may be provided proximate the LCD screen 320 to enable navigation through menus and the like presented by the LCD screen 320. In one implementation this button element is cross-shaped in order to facilitate two-dimensional navigation, and may further include a smaller, dedicated button (e.g., in the center of the cross) associated with a specific widget (e.g., clock widget). Pressing this dedicated widget would interrupt the operation of all other widgets.

In implementations in which two-dimensional navigation through the user interface of the portable device is supported, users may be provided with the ability to navigate forward and back in the configured widget timeline. Similarly, users may navigate up and down a stack of related widgets. This function depends on the implementation of the concept of widget categories—i.e., associating widgets into logical categories that can be displayed sequentially, if configured to be displayed. An example of a category could be "News." Widgets included within this category could include, for example, a local news widget, a sports news widget, an entertainment news widget, a business news widget, and the like. For each category, there would be a default widget, which is designated by the user on the associated portable device web site for each category selected to be displayed by the user's portable device.

If more than one widget in a category is selected, then the widgets are conceptually "stacked" with the default widget being:

on the top of the stack; and the widget that is displayed as the CHUMBY™ device automatically cycles through configured widgets.

If a widget for a given category (e.g., "News") is displayed and there exist additional widgets in the category which are also configured for display, then in the exemplary embodiment these additional widgets are "stacked" below the displayed widget. In this case the user may take some predefined action with respect to the user's portable device (e.g., perhaps selecting a control on the touchscreen or accessing a function via the control panel, which is instantiated via actuating the bend sensor) in order to cause the next widget in the "stack" for that category to be displayed. The portable device may be configured such that taking further predefined actions of the same type will cause the widgets either above or below in the stack to be displayed, as designated by the user. The last widget that is displayed in the stack for the applicable category when the portable device cycles to the next widget category will be the widget displayed in the next cycle for the just exited category (e.g, News).

The tabular illustration below provides a conceptual layout of exemplary widget stacks in various categories:

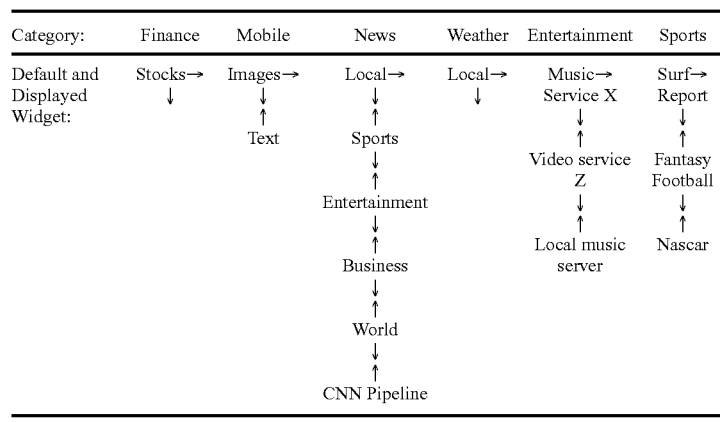

The following provides a conceptual representation of the case in which the user has navigated into widget stacks for News, Entertainment and Sports:

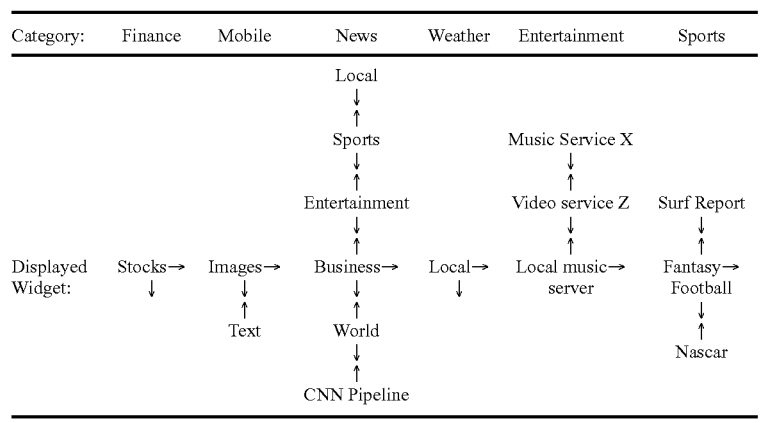

Attention is now directed to FIG. 5A-5E, which provides various perspective views of an exemplary portable device configured with a malleable housing comprising a rubber-type frame in combination with a fabric material. The housing surrounds a core structure and a plush interior fill material (not shown in FIG. 5A-5E). The rubber-type frame, fabric and fill materials collectively impart a soft and malleable feel to users handling the portable device.

In one embodiment the rubber-type frame is composed of Texin™, a soft, tactile, rubber-like material similar to TPE (thermo plastic elastomer). The frame provides structure and form to the housing and allows the core electronics unit to be replaced and inserted. The frame will generally be manufactured in a relatively flattened configuration and then manually flexed or curved and stitched to the fabric when assembling the housing the portable device.

Figure 28:
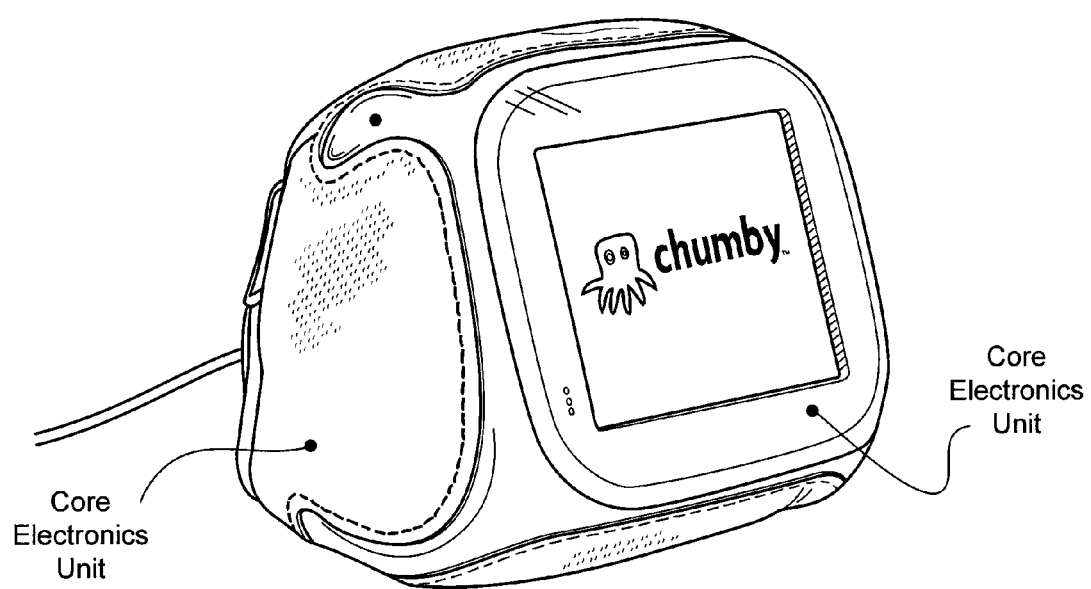
FIG. 28 provides an alternative illustration of a portable device in which is identified a core electronics unit and flexible housing of the device.

FIG. 28 provides an alternative illustration of a portable device in which are identified the core electronics unit and flexible housing of the device. As opposed to existing wireless or other consumer electronic devices in which the device electronics are typically simply mounted into rigid plastic enclosures that are not subject to any user modification or customization, in an exemplary embodiment the flexible housing of a portable device may be created using any number of exterior fabric materials such as those used in soft-goods or plush toy manufacturing. Such materials may include, for example, suede, Neoprene, rubber, vinyl, etc. Interior to the flexible housing may be contained any number of fill materials, such as Poly-Fil, polyester beads, gel, foam, etc., not unlike a pillow, stuffed animal, or plush toy. Such interior fills enable the portable device to be "squishable.". Moreover, such interior fill enables the device to retain its shape after being "squeezed" or "pressed" by a user in order to trigger an internal bend sensor. (In other embodiments an electric field/capacitance sensor may be used in lieu of a bend sensor to detect the location/distance of a user's hand to the sensor; that is, since the user's hand moves closer to the sensor as the user squeezes the flexible housing of the portable device, the sensor is capable of indicating that a "squeeze" event has occurred).

Figure 29:
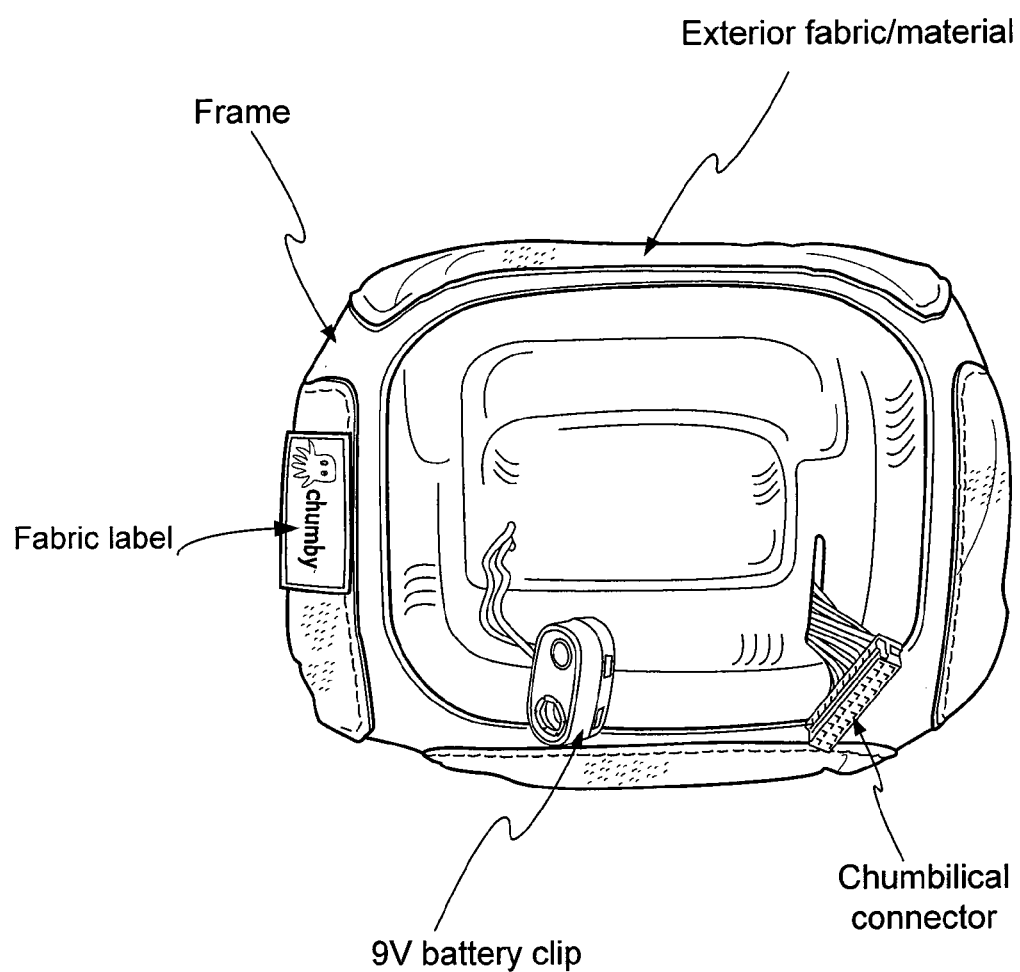
FIG. 29 illustrates various components interior to a flexible housing of an exemplary portable device.

Turning now to FIG. 29, interior to the flexible housing of an exemplary embodiment of the device there is included daughterboard circuitry containing an external power switch, external power supply connector, external headphone connector, external USB connector, internal left and right speaker connectors, internal 9V back-up battery connector, internal bend sensor connector, and internal "Chumbilical" connector. In one implementation the Chumbilical connector is used to connect all the signals received/processed by the daughterboard to the core electronics unit of the portable device, which is press-fit into the soft TPE frame. Also positioned interior to the flexible housing are a pair of speakers (for left and right audio output), as well as a bend sensor and various cabling required to attach such elements to the daughterboard.

Figure 30:
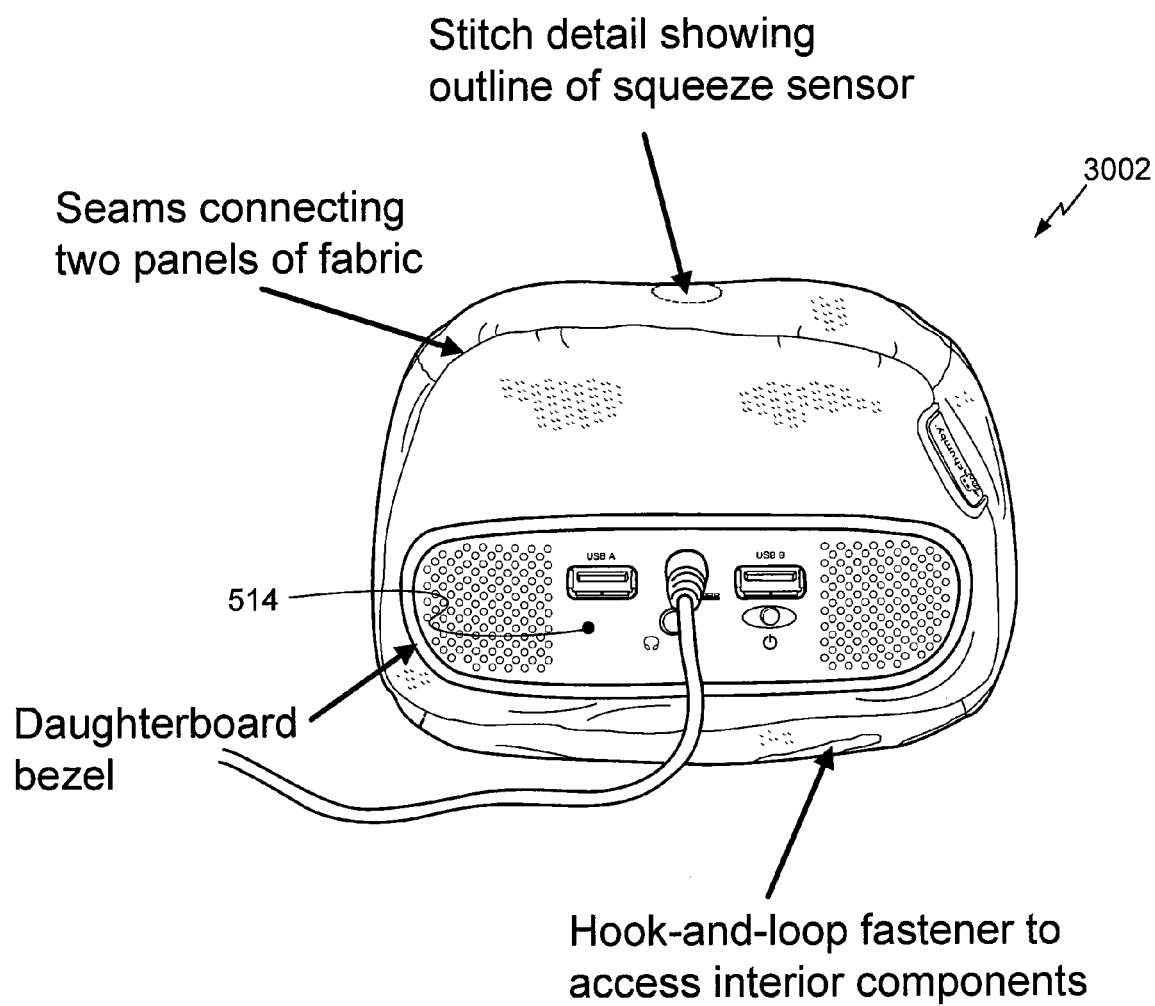
FIGS. 30-31 provide an example of a flat pattern used to define the exterior structure of a flexible housing of an exemplary portable device.

Referring to FIGS. 30, a flat pattern, commonly used in soft-goods and garment manufacturing, is used to define the exterior structure of the flexible housing or "bag" of an exemplary portable device ("CHUMBY™ bag"). Any number of artistic/design elements can be added to the exterior fabric material of the CHUMBY™ bag to add dimension and visual features. The use of a fabric-type enclosure for the portable device provides for unlimited possibilities for product housing creation, both by the original manufacturer and end-users (such as craftspeople, hobbyists, etc.), and is believed to represent a novel approach in the design of consumer electronic and/or wireless devices. Fabric tags, patches, or other fabric/garment-related items can be stitched or otherwise attached to the exterior housing of the portable device to convey product or corporate information, such as a logo.

Figure 6B:
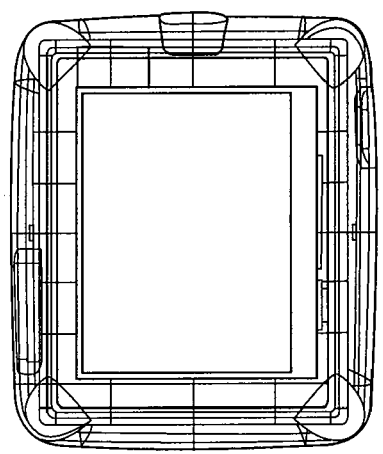
FIGS. 6A-6D provide various partially transparent perspective, side and plan views of an embodiment of a portable device.
Figure 6D:
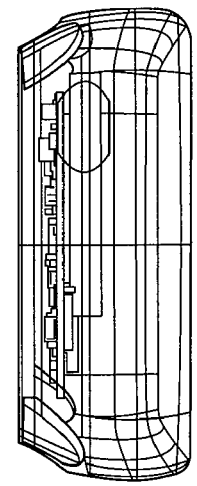
Figure 6A:
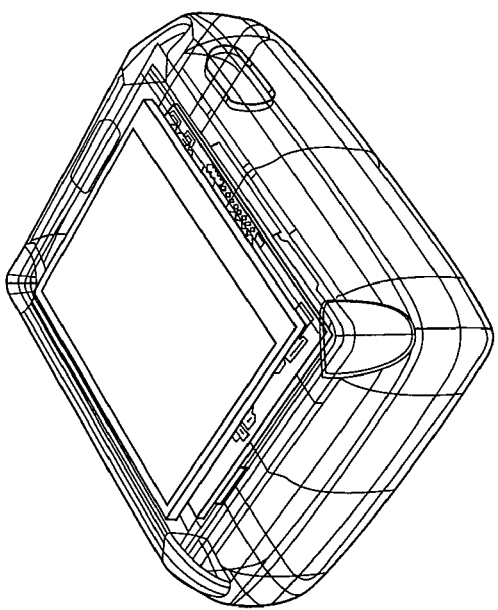
Figure 6C:
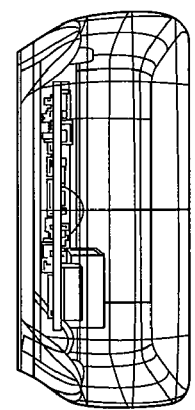
Figure 6E:
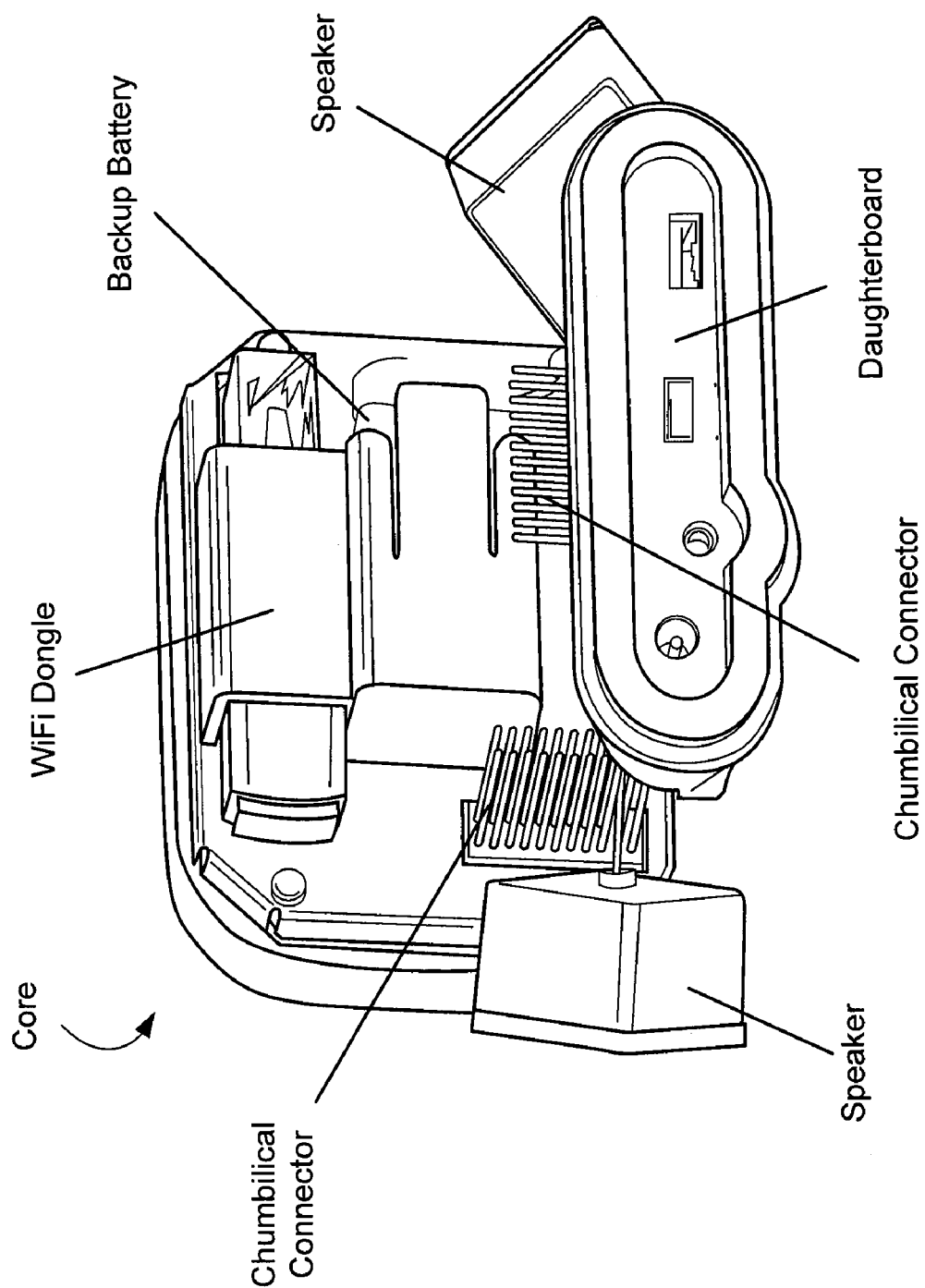
FIGS. 6E-6G depict the core electronics and other components contained within the housing of a portable device, and the arrangement of certain of these components within a housing of the device, in accordance with aspects of the present invention.
Figure 6F:
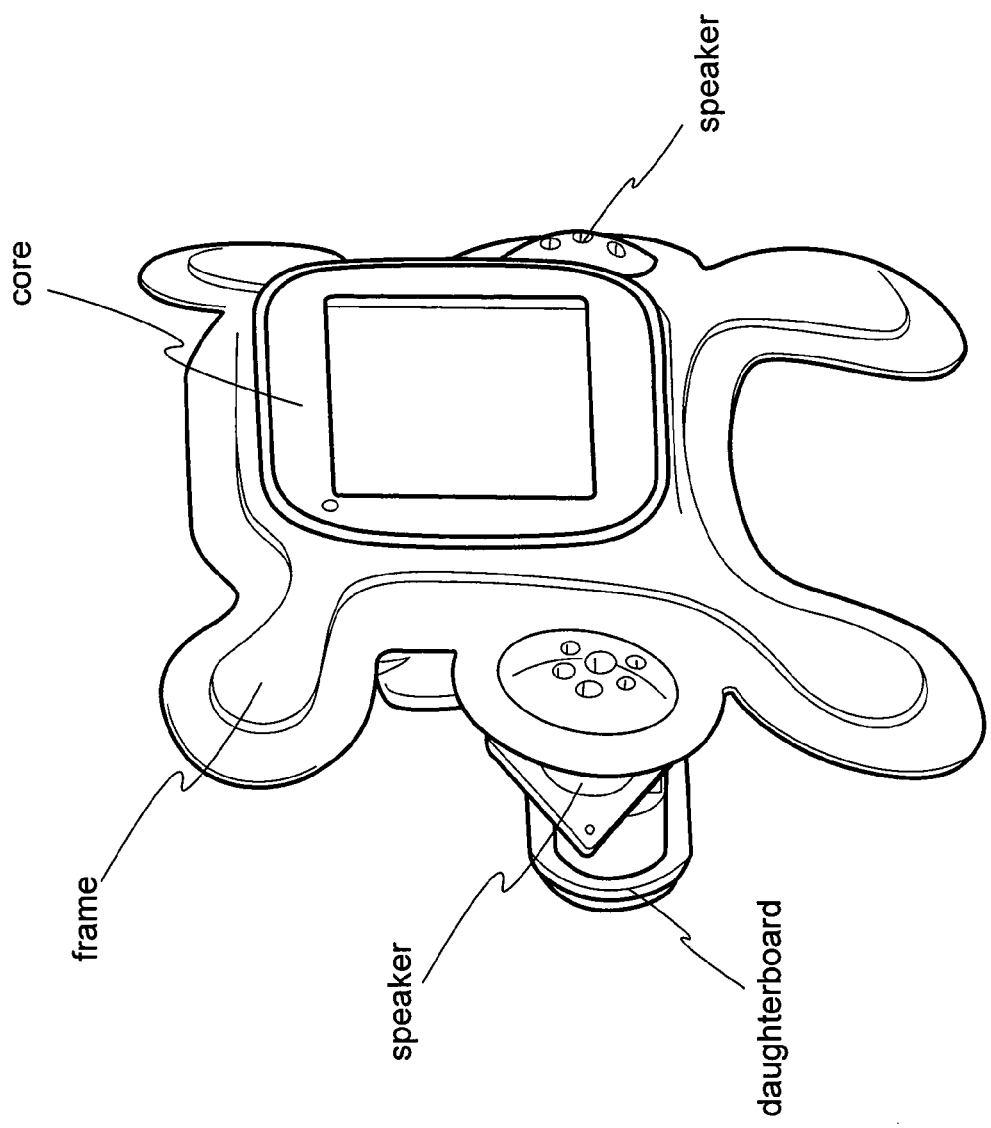
Figure 6G:
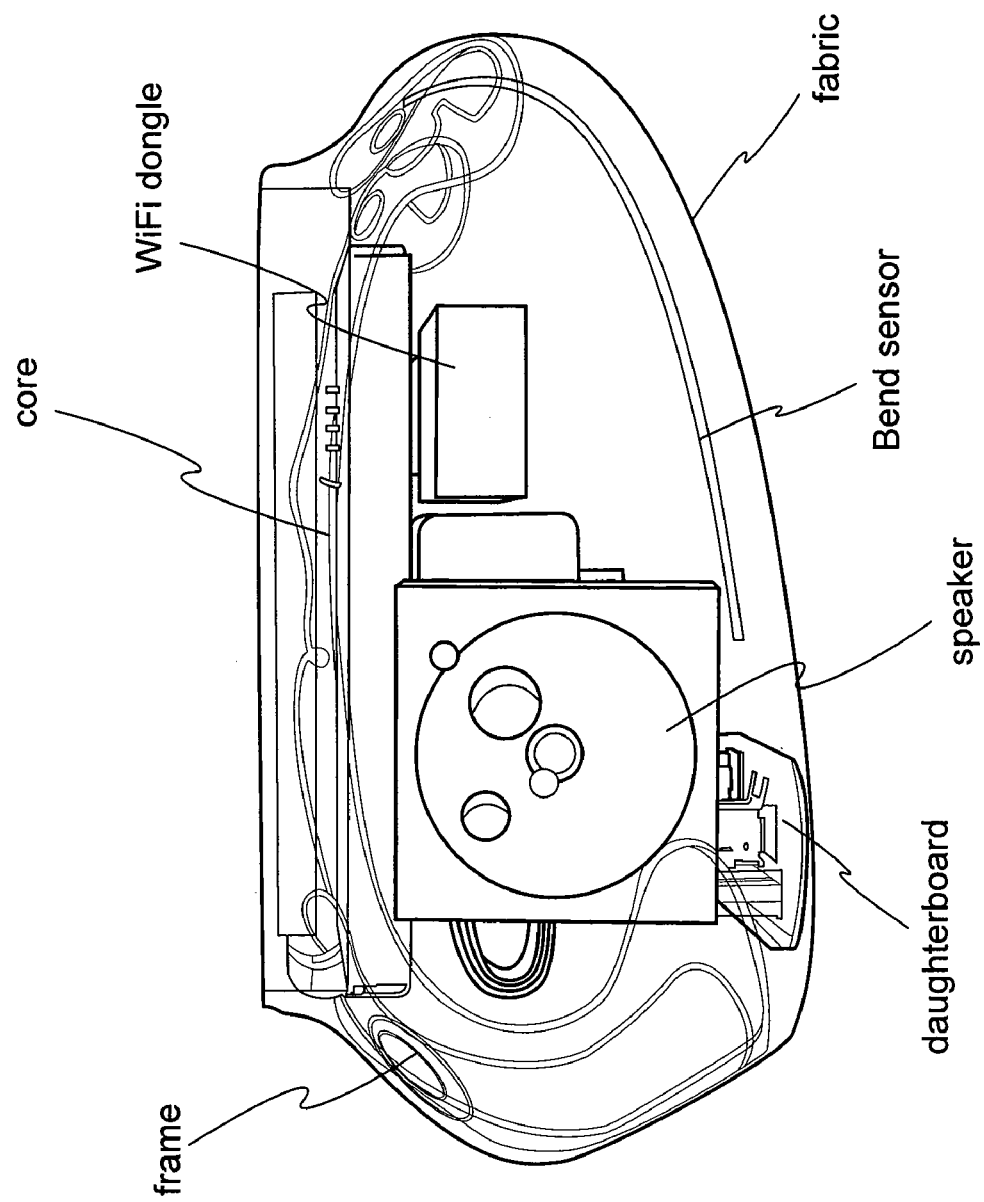
Figure 31:
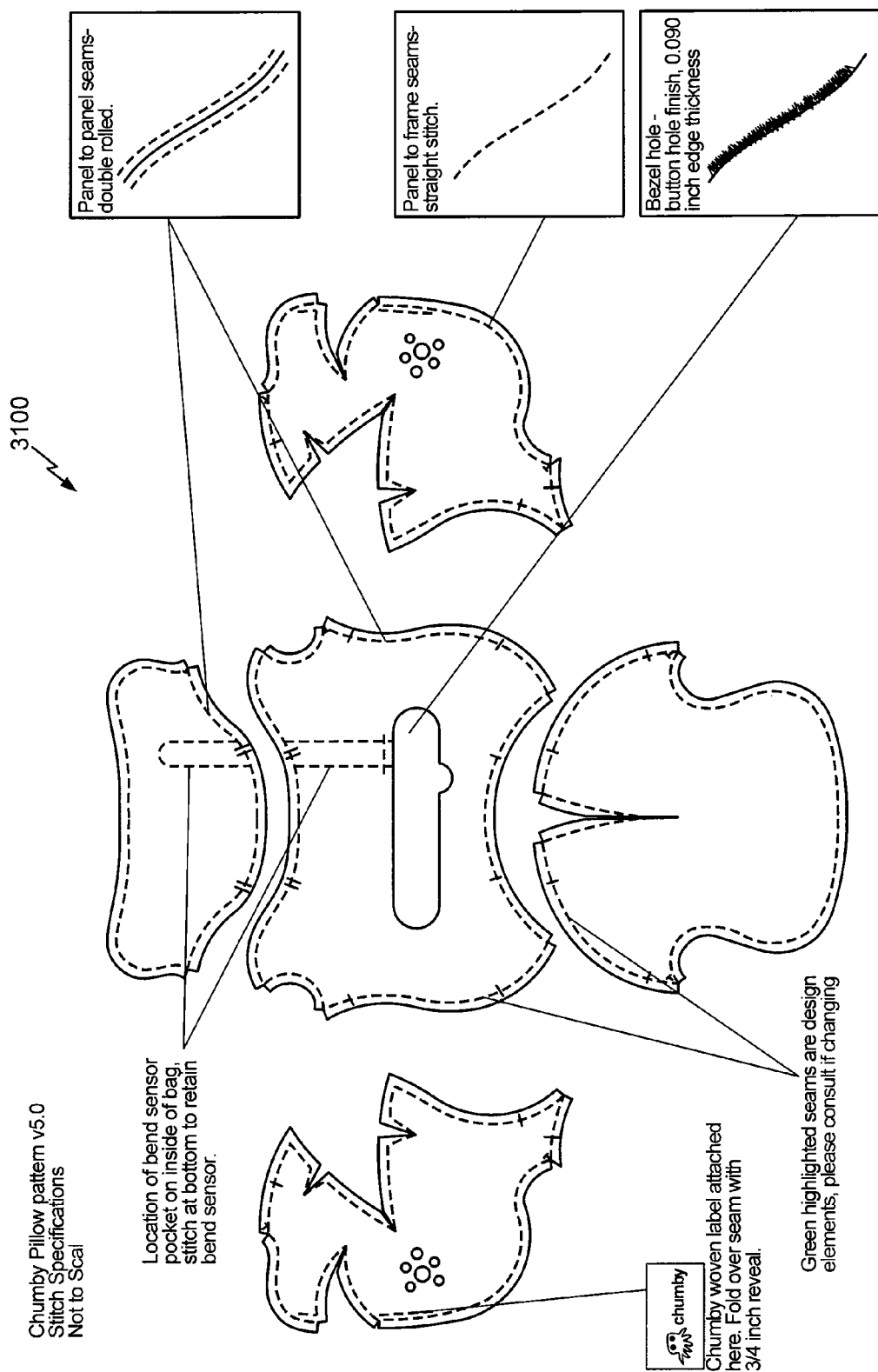

FIG. 31 provides a sample flat pattern drawing for the flexible housing or "bag" of a portable device, showing individual fabric panel shapes, stitching details, and design elements:

FIGS. 6A-6D provide various partially transparent perspective, side and plan views of an embodiment of the portable device. FIGS. 6E-6F depict the core electronics and other components contained within the housing of the portable device, and FIG. 6G illustrates the arrangement of certain of these elements within the housing.

The core electronics module will generally include, for example, a main circuit board, LCD display, touchscreen, ambient light sensor, USB WiFi dongle, 9V backup battery, and an RF shield. This core module is designed to be removable from the frame by the user of the portable device. It is typically connected into the housing portable device via a 22 pin cable assembly, also referred to herein as a "Chumbilical™."

The WiFi dongle is a part of the core electronics module and provides 802.11 wireless networking support. In an exemplary embodiment, the WiFi dongle attaches externally to the core electronics.

The backup battery, currently consisting as a standard 9V alkaline, is used to provide backup/supplemental power to the portable device in the event of failure of the primary power supply. The backup battery is mounted onto the RF shield and is meant to be replaceable by the user. The RF shield is positioned on a back side of the core electronics module.

The daughterboard provides connectors available to the user, including power input, headphone output, and external USB-style connector for future accessories and/or facilitating device upgrades. The daughterboard is clamped to the fabric in between the daughterboard front and rear bezel components, which are made of rigid ABS-type plastic. The daughterboard connects to the core electronics via the Chumbilical™.

In an exemplary embodiment, the portable device includes a pair of internally-mounted speakers to provide stereo sound. The speakers are held in place using square pouches sewn into the interior of the unit. The pouches each have a small drawstring to keep the speakers in a relatively fixed position within the interior of the portable device. Both speakers connect to the daughterboard.

The bend sensor is connected to the daughterboard and may comprise a flexible resistive element which varies in resistance based upon the angle of flex of the sensor. Accordingly, the bend sensor is capable of detecting physical "squeezing" of the soft housing of the portable device. Signals from the bend sensor are processed (e.g., by the core electronics module or dedicated electronic circuitry) and generally will precipitate performance a defined action, which may be dependent upon characteristics of the currently active widget. The bend sensor connects to the daughterboard. The bend sensor will generally be attached to the inside of the CHUMBY™ bag and oriented parallel to the vertical access of the portable device. In other embodiments, one or more displacement sensors may be used to effect the same function.

Figure 32:
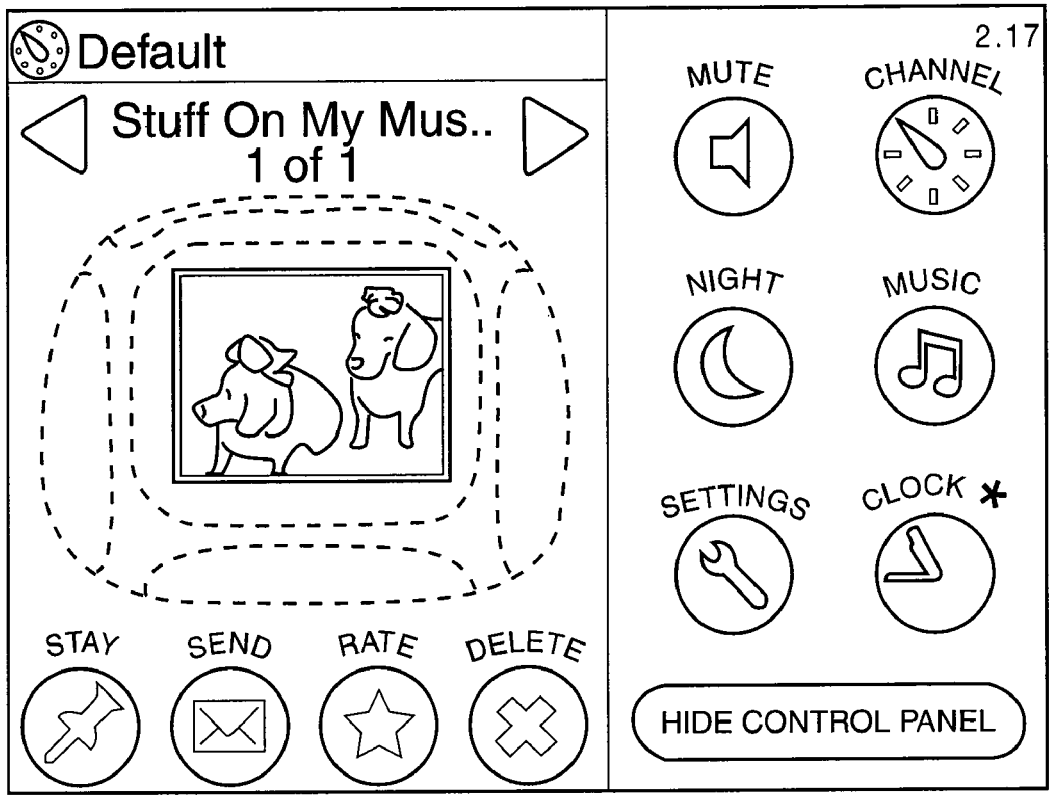
FIGS. 32-33 show exemplary user interface screens of a portable device applicable to a process for calibration of one or more bend sensors within the device.
Figure 33:
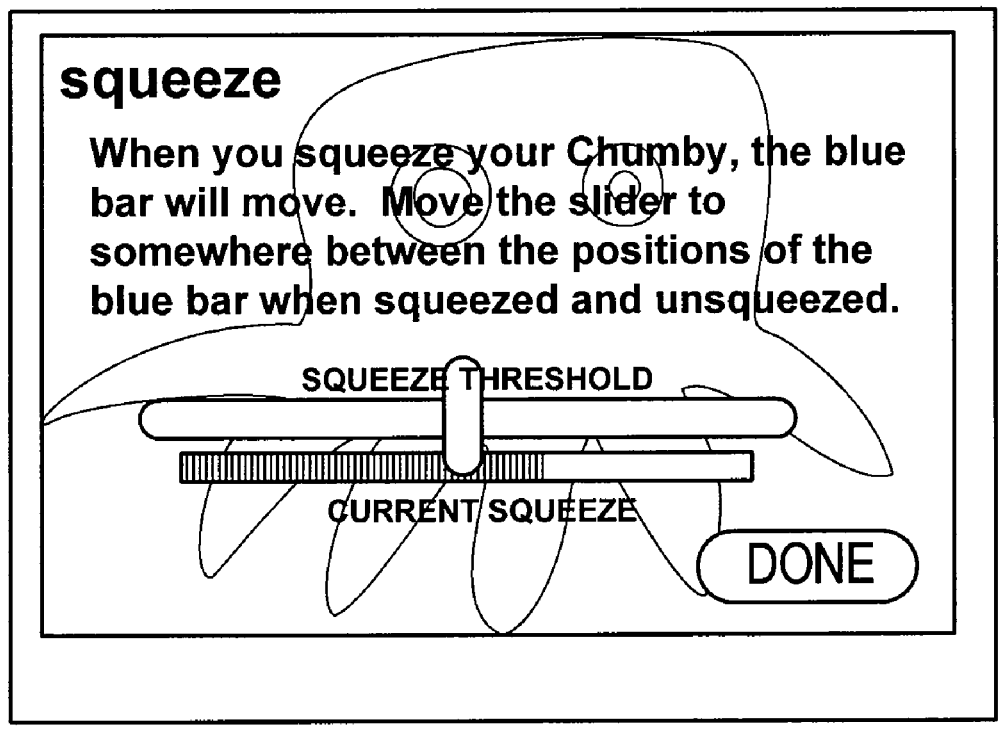

Attention is now directed to exemplary user interface screens of a portable device shown in FIGS. 32-33, to which reference will be made in describing a process for calibration of bend sensors within the device. When a user "squeezes" the back of a portable device and displaces the bend sensor beyond the calibrated tolerance, the Control Panel function is activated and the appropriate user interface is displayed (FIG. 32). From a "settings" screen accessed via the Control Panel of FIG. 32, the user can then access the "squeeze" calibration function (FIG. 33) to recalibrate the bend sensor.

Although in certain embodiments the flexible or malleable housing of each portable device is intended to be essentially permanent and not replaced, in other embodiments such housings may comprise interchangeable "skins" designed to be easily detached and replaced at the discretion of the user. In such implementations the portable device may be configured to operate in accordance with various profiles depending upon the particular "skin" currently attached to the underlying hardware "core" of the device. Specifically, one or more sensors could be deployed upon the core of the portable device in order to read electronic identifiers embedded within the various skins disposed to be employed as the housing for the portable device. Each identifier could consist of a persistent (non-volatile) storage module containing unique identifying information, and would be physically configured so as to make electrical or radio contact with a corresponding sensor on the core of the portable device upon its skin becoming attached to the device core. The information read from such embedded identifiers could be used to inform the control system of the portable device of the identity of the skin currently enveloping the core of the device. Certain of such skins could, for example, include characteristics or features suggestive of various applications (e.g., "clock radio", or "boom box") or intended operating environments (e.g., "car", "kitchen", "workshop")

Once a new skin has been attached or otherwise secured to the core of a portable device and the information from the embedded identifier has been read, the portable device may send a message to the service provider 106 indicative of its current skin (e.g., "skin #1"). In response, the service provider 106 may reply with a message instructing the portable device to utilize a particular profile (e.g., "profile #3"). It is contemplated that users may elect to define, via a Web browser 122 in communication with the service provider 106, profiles for each of their skins or simply utilize default profiles available from the service provider 106. Each profile could define, for example: (i) the widgets to be executed, (ii) the configuration to be used for executing the widgets, and (iii) the style and theme information (color schemes, control decorations, fonts, backgrounds, etc) utilized in presenting information via the LCD display 320.

Motion, Position, and Contact Detection Systems and Applications

In some embodiments a portable device may include hardware, software, or hardware and software in combination to implement functionality related to acceleration, motion, and location detection and tracking. Additional related applications and functions are also envisioned, such as detection of contact with the device including contact caused by persons or objects hitting or squeezing the device, as well as contact caused by the device impacting other surfaces or objects such as a floor, table, desk, or other surface or object. In some applications, motion detection and tracking may also be used to implement gesture recognition where movement of the device in pitch or roll axes or in rectilinear motion may be used to control device functionality. In addition, motion matching may be used to identify when the portable device is moving in a particular predefined way, such as based on a particular type of vibration.

Figure 34:
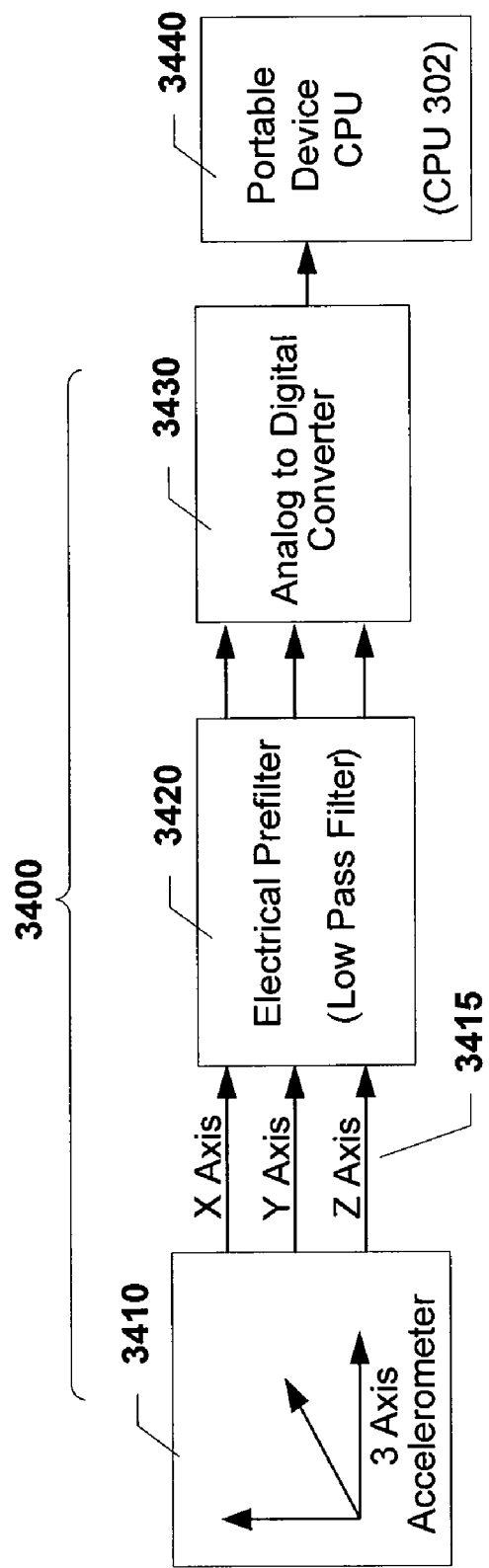
FIG. 34 illustrates an embodiment of a portable device motion sensing unit and CPU interface in accordance with aspects of the present invention.

Referring now to FIG. 34, a block diagrammatic representation of one embodiment of motion detection system hardware (also denoted herein as a motion sensing unit) 3400 in accordance with aspects of the present invention is shown. It is understood that FIG. 34 is merely representative of one embodiment, and that other configurations providing similar functionality are possible within the spirit and scope of the present invention.

As illustrated in FIG. 34, motion sensing unit 3400 may be implemented in one or more axes of motion by use of an accelerometer and associated hardware. For example, accelerometer 3410 may be a three-axis accelerometer such as an Analog Devices ADXL330 (which is an integrated acceleration to voltage converter), Kionix KXP74-1050, or similar device providing detection of acceleration and signal outputs in one or more axes of motion. The output of accelerometer 3410 may consist of multiple analog signal channels 3415 representing the acceleration in each of the associated axes, such as three voltage signals corresponding to orthogonal X, Y, and Z axes of motion.

The multiple axis analog signals may then be provided via channels 3415 to a signal filtering network 3420 for signal conditioning. Signal conditioning may include a variety of functions related to improving the quality of the signals provided to successive stages of signal processing. For example, signal filtering network 3420 may comprise a lowpass filter to set the time constant of the system response to changes in the accelerometer output or to remove higher frequency acceleration components or noise from the signal. Such a filter may be implemented via a wide variety of circuits. For example, in one embodiment a network of capacitors in parallel with the input signals from each channel may be used.

The outputs from signal filtering network 3420 may then be provided to an analog to digital converter 3430. Analog to digital converter 3430 may then convert the filtered analog input signals to one or more channels of digitized data representing accelerations along the associated axes of motion of the device. The output of the analog to digital converter may then be stored, buffered, and transmitted to the portable device CPU 3440 (such as CPU 302 as shown in FIG. 3) and processed by system software as described in further detail below.

Figure 35A:
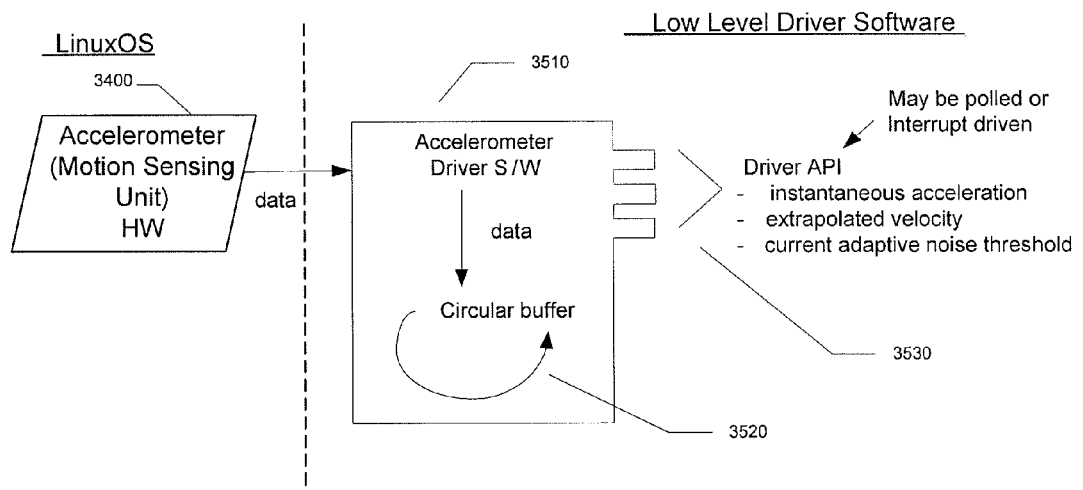
FIG. 35A illustrates one embodiment of a portable device motion sensing low level hardware/software interface and driver in accordance with aspects of the present invention.
Figure 35B:
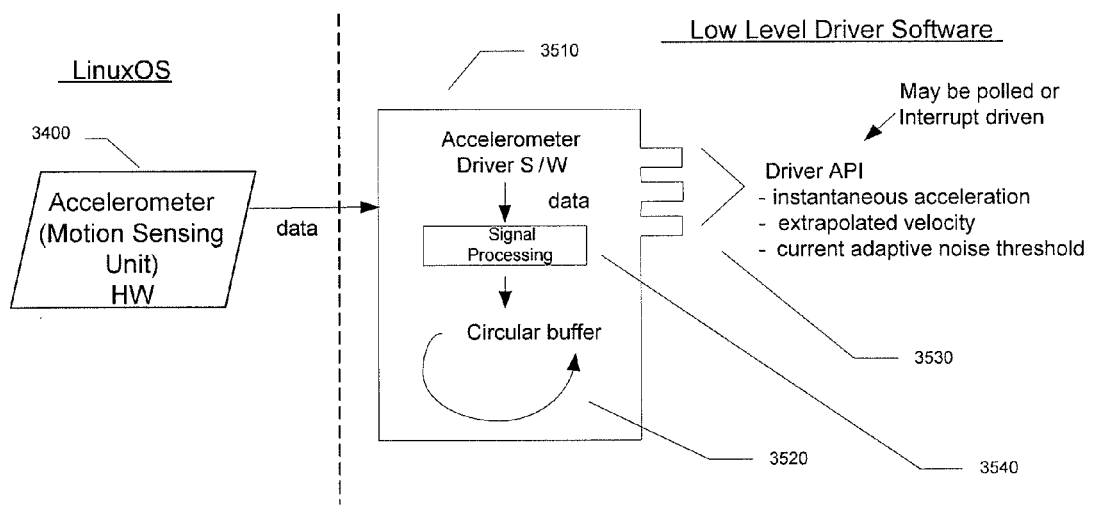
FIG. 35B illustrates one embodiment of a portable device motion sensing low level hardware/software interface and driver with signal processing in accordance with aspects of the present invention.

FIG. 35 illustrates embodiments of certain aspects of interfaces and processing between the accelerometer hardware and system software with respect to low level accelerometer signal storage, buffering, and retrieval. As shown in FIGS. 35A and 35B, data representing accelerations/motions along one or more axes of motion may be provided to accelerometer driver software module 3510 from accelerometer hardware, such as motion sensing unit 3400 as shown in FIG. 34.

The provided data may then be stored and buffered, as well as further processed, in driver software module 3510. Storage of data may be accomplished via a scheduled task running on the device's operating system, such as a scheduled task running on a linux operating system. Such a task may be run periodically or asynchronously based on a time reference such as an operating system clock, "tick," or other timing signal. In one embodiment, an asynchronous task may be run approximately once every operating system "tick" period, which may be set to occur at the rate of 100 Hz.

At each tick, the X, Y, and Z acceleration data may be recorded and stored in a circular buffer 3520 which may be configured in different lengths based on the desired amount of stored data and system data retrieval timing. The circular buffer may also have a data structure associated with it that keeps track of relevant statistics. These may include aggregate statistics on parameters related to the acceleration data such as mean and variance of the signal. In some embodiments as shown in FIG. 35B, driver software module 3510 may also implement higher level signal processing functions, such as those higher level functions described in further detail below, or others.

Driver software module 3510 will generally be configured to interface with other system software modules to provide data related to the accelerometer signals. In some embodiments, driver software module 3510 may interface with the operating system and other software modules within the portable device via an application programming interface (API) 3530 as shown in FIGS. 35A and 35B. The interface mechanism to higher level software may be implemented in a variety of ways based on different types of interfaces. One exemplary embodiment uses a file device interface that dispatches to the accelerometer device driver. The file device can be used to query the driver for any information that the driver may contain, such as the instantaneous acceleration and extrapolated velocity, or the current adaptive noise thresholds as determined by the running average and variance of the data in the sample buffer.

In addition to the conventional interface as described previously, driver module 3510 may also serve as an interrupt source, wherein an interrupt is generated based on the acceleration data, processed results, buffer status, or other related parameters. The driver module may also serve as a source of polled data that can be used to emulate the interrupt event. In some embodiments, a system integrator may use the interrupt mode of the accelerometer to provide better response to certain events, such as rapid changes in the portable device position.

In addition to low level software as described above, a portable device may also include higher level software modules for processing accelerometer data to extract related information. Such software may apply a variety of signal processing algorithms to the raw accelerometer data to extract useful information. This information may include a range of related parameters such as relative angle and position of the portable device, rate of angular or rectilinear positional change, and other useful parameters. For example, in some embodiments it may be desirable to measure the relative angle of the device with respect to a previous or reference position. In the case of a reference position, determination of the reference position may be done by calibrating the device as further described in detail in later sections of this document discussing calibration. It will be noted that the relative angle of the device with respect to a reference position may be given in three dimensional coordinates x, y, and z, as (θ,φ,ϕ). Given a reference orientation defined as ($g_{xo}$, $g_{yo}$, $g_{zo}$) and a current orientation defined as ($g_x$, $g_y$, $g_z$), the relative angle may be approximately determined simply by the following equation:

$$\theta=\sin^{-1}(g_x-g_{xo})$$

$$\phi=\sin^{-1}(g_y-g_{yo})$$

$$\varphi=\sin^{-1}(g_z-g_{zo})$$

Where each of the terms of $\sin^{-1}$ may be saturated to +1 or −1 as appropriate. In order to improve the fidelity of this operation, the values of $g_n$ recorded may be oversampled and averaged.

In some embodiments it may be desirable to determine relative velocity and position of the device in one or more axes. As is well known in the art, acceleration is the time derivative of velocity and velocity is the time derivative of position. Therefore, velocity, v(x,y,z), and position, p(x,y,z) may be determined by integrating acceleration, a(x,y,z) as shown below.

$$p(x,y,z)=\int v(x,y,z)dxdydz=\int\int a(x,y,z)dxdydz$$

It will be noted that a system based on integration may be sensitive to offsets in acceleration which may further enhance errors in calculating velocity and position. Furthermore, when implementing such a system with discrete time sampled data, additional errors may be introduced, however, these errors may be addressed by various means known in the art. In a digital system, integration such as might be applied to determine velocity or position may be implemented in the form of a Reimann sum:

$$\int f(x)dx \cong \sum_{i=1}^{n} f(x_i)\Delta x$$

In such an implementation, the error term can be somewhat minimized by applying the trapezoidal rule, which yields an error term that is bounded as follows:

$$\left|\int_a^b f(x) - A_{trap}\right| \le \frac{M_2(b-a)^3}{(12n^2)},$$

where $M_2$ is the maximum value of the absolute value off f''(x).

Eliminating errors due to the inherent limitations of Reimann approximation as well as to systematic offsets in the electronics is not a trivial task. However, as is known in the art, a variety of techniques, including DC offset cancellation and heuristics to disable cancellation in the case that an actual gesture is identified, may be employed.

Figure 36:
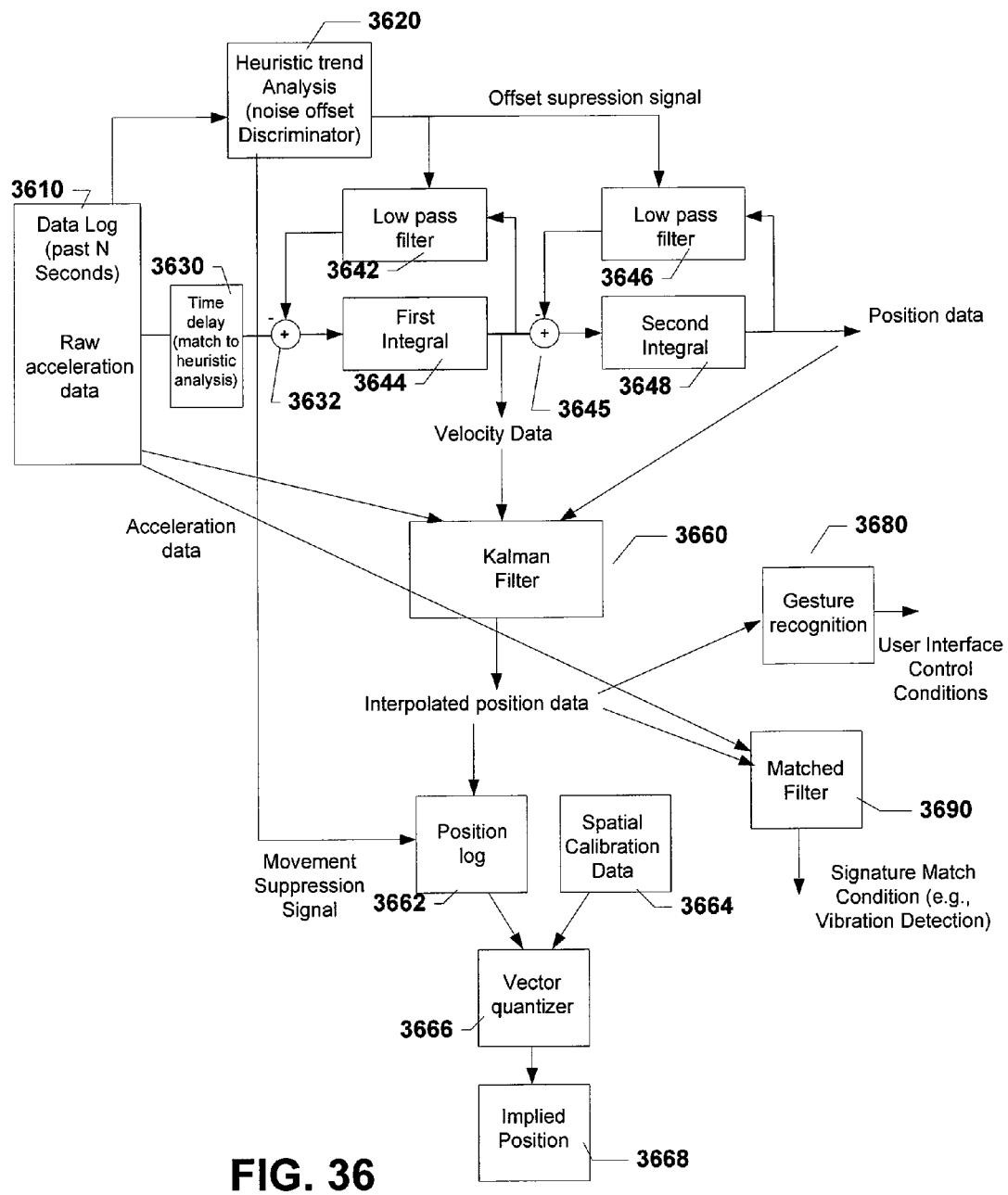
FIG. 36 illustrates one embodiment of portable device motion sensing signal processing modules associated with motion detection, processing, analysis, and tracking, in accordance with aspects of the present invention.

Referring now to FIG. 36, a block diagrammatic representation of certain aspects of one embodiment of a accelerometer signal processing system is provided. Data buffer 3610 may be used to provide storage and buffering of multiple samples of raw accelerometer data. Accelerometer data may consist of multiple samples of data in one or more axes of motion. Data stored in buffer 3610 may then be provided to one or more signal processing modules to provide various motion related information. In some embodiments, data from buffer 3610 may be provided to a heuristic trend analysis module 3620 configured as a noise offset discriminator. The output of analysis module 3620, which may be an offset suppression signal, may then be applied to low pass filter modules 3642 and 3646 used in conjunction with integration modules 3644 and 3648 to calculate velocity and position data. In addition, embodiments including heuristic trend analysis may also include a time delay module 3630 to delay integration of the raw accelerometer samples a sufficient amount of time to be in synchronization with the output of heuristic trend analysis module 3620. It will be noted that the use of heuristic filters may introduce some dead zones in the signal response of the system, but this can be compensated at higher levels, such as by modifying the states of the gesture recognition machine, or through the use of a vector quantizer to snap the location of the portable device in 3 space to one of a small set of known possible locations.

As further shown in FIG. 36, some embodiments may contain integration modules such as 3644 and 3648 that integrate acceleration data to determine velocity based on a first integration, and position based on a second integration. As implemented in the embodiment shown in FIG. 36, acceleration samples are provided to first integrator 3644 which provides an output that is an approximation of the integral of the input signal, such as by use of a Riemann sum algorithm or by other discrete time integration algorithms known in the art. The output, representative of the velocity of the device, may then be applied to a lowpass filter module 3642 for purposes of noise and other error correction. Lowpass filter module 3642 may also apply a correction signal from heuristic trend analysis module 3620 to improve noise and error performance. The output of lowpass filter module 3642 may then be subtracted from the input acceleration signals in a signal addition module 3632 as part of a closed loop feedback system. A similar feedback loop, comprising second integrator module 3648, lowpass filter module 3646, and signal addition module 3645, may also be provided to integrate the velocity data in order to provide position data.

In some embodiments a Kalman filter may be provided to improve prediction of the device's position, velocity, and acceleration in the presence of noise. As is known in the art, Kalman filters are widely used in navigation systems to improve performance in the presence of limited or inaccurate data samples and noise. As shown in FIG. 36, a Kalman filter module 3660 may be provided with acceleration, velocity, and position data from the associated stages of the signal processing chain. For example, acceleration data may be provided from data buffer 3610, velocity data may be provided from the output of first integrator module 3644, and position data may be provided from the output of second integrator module 3648. The Kalman filter module 3660 may then process the input signals using filtering methods known in the art to provide improved positional data. In some embodiments, as shown in FIG. 36, interpolated position data output from Kalman filter module 3660 may be provided to a position log 3662, which may also be provided with a movement suppression signal output from heuristic trend analysis module 3620. The output of position log 3662, representing an approximation of the relative position, may then be combined in a vector quantization module 3666 with spacial calibration data. Spacial calibration data, as described in further detail in successive sections of this disclosure, may be provide from a special calibration data module 3664. The vector quantization module may include quantization routines to limit the resulting output to a finite set of values, thereby reducing errors that may be introduced through other processing steps such as heuristic filters. The resulting output of vector quantization module 3666, which is representative of the device's absolute position, may then be provided to an implied position module where it may be further used by applications or widgets to provide position related functions.

In some embodiments a matched filter may be provided to detect particular motion related signatures. As is known in the art, a matched filter may be used to detect particular signals by correlating an incoming signal with a sampled representation of a desired target signal and making a decision on whether the desired signal is present based on the output of the correlator. For example, acceleration data, velocity, or positional data may be provided to a matched filter module 3690 to detect a particular motion event such as vibration of the portable device at a particular frequency. Motion events may be based on either preset or system programmed target events, or may be programmed by the user. In some embodiments, matched filter module 3690 may be provided with one or more reference signals corresponding to targeted motion profiles such as acceleration, velocity, or position profiles related to particular targeted movements. Matched filter module 3690 may then correlate the incoming signals with the target signals and signal a match when the correlation output exceeds a preset threshold.

Alternately, the user may train the matched filter to detect a particular motion sequence. For example, a user might train the filter to monitor motion processes related to their washing machine. The user might do this by selecting a training mode, placing the device on the washing machine while it is operating with a particularly desired motion for a specified amount of time, perhaps 5 seconds, and then recording the motion signature. The motion signature may then be stored in the matched filter module 3690 as a target signal and the incoming signal could then be correlated with the target signal to detect the desired motion signal. As is apparent, a wide variety of other motion related matched filter applications are possible within the spirit and scope of the present invention.

In some embodiments a gesture recognition module 3620 may be included. Such a module may operate on position data, such as interpolated position output data from Kalman filter module 3660 to detect particular position sequences associated with motions of the device caused by hand movement. A wide range of gesture implementations are possible. For example, in one embodiment, a dynamic programming algorithm such as the Viterbi algorithm or a similar trellis algorithm may be used to determine the most likely user intended gesture based on the input position profile. In this implementation, a state diagram may be laid out consisting of the various legal states and branching conditions that may occur. As the user traces a trajectory through the state diagram, a maximum likelihood predictor may be dynamically applied to determine which gesture is implied by the transaction through state space.

To further illustrate one possible example, the device may be configured with 4 control motions providing four different functions based on rotation about 2 orthogonal axes X and Y. Rotation in one direction about the X axis controls the first motion, rotation in the opposite direction controls the second, and likewise for the 2 directions along the Y axis. Applying the positional data to the gesture recognition module 3650 results in detection of both the corresponding axis and direction of rotation for device movements. This information may then be provided to other applications or widgets to provide associated functionality.

Figure 37:
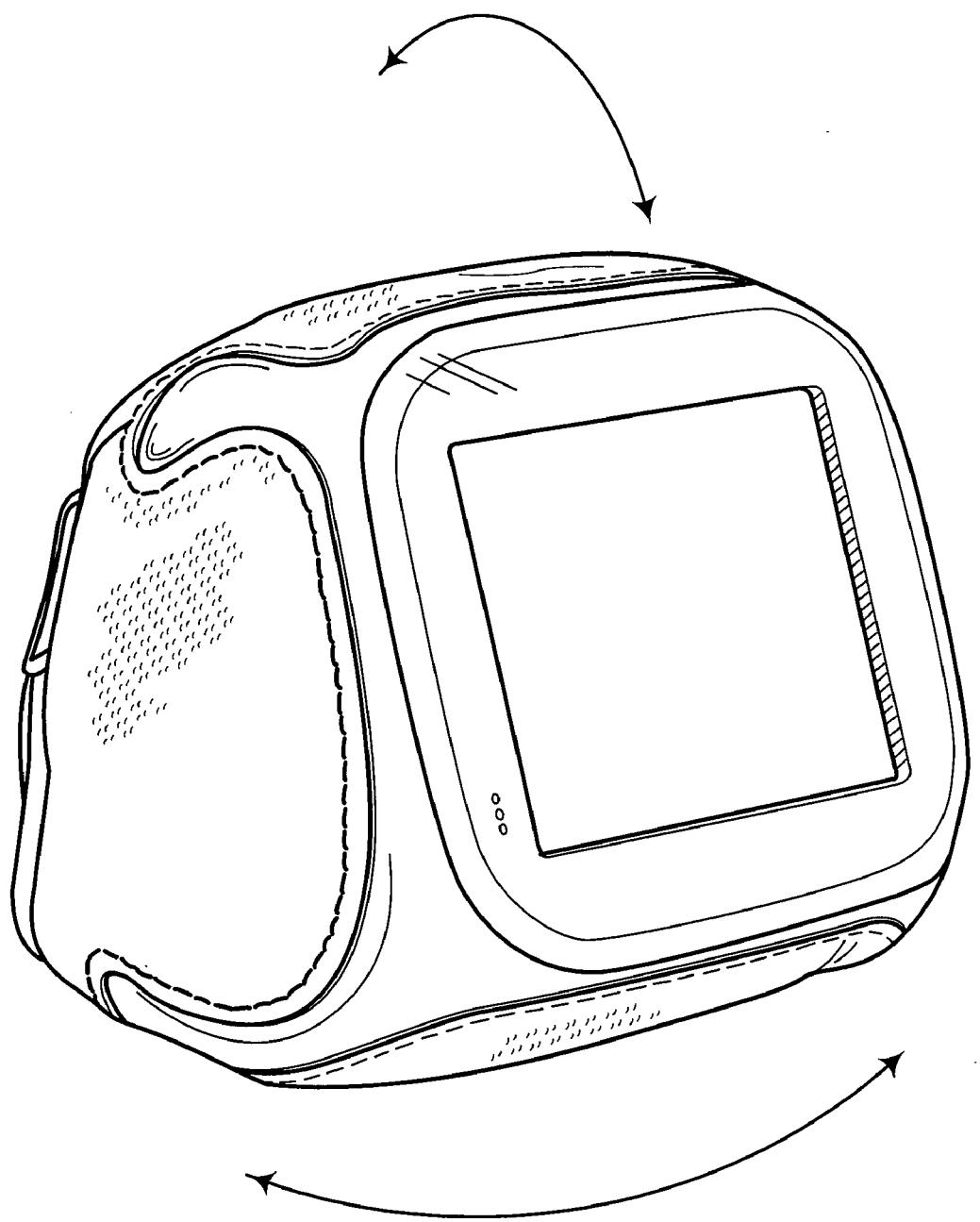
FIG. 37 illustrates some types of motion associated with gesture recognition in accordance with aspects of the present invention.
Figure 38:
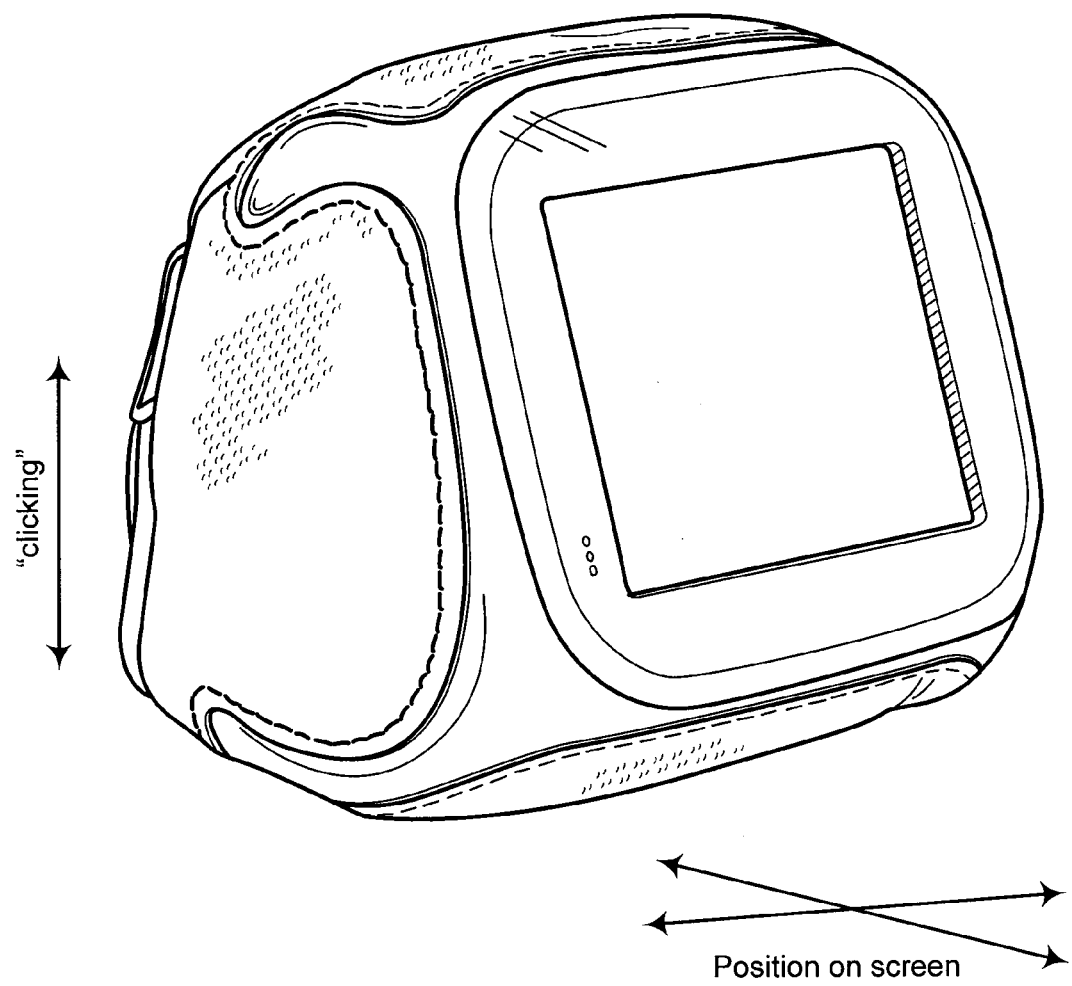
FIG. 38 illustrates some additional types of motion associated with gesture recognition in accordance with aspects of the present invention.

As discussed previously with respect to FIG. 36, portable devices may include modules implementing gesture recognition functionality, such as through gesture recognition module 3680. A wide range of gesture recognition applications are possible. In some embodiments gesture recognition may be based on pitch and roll axes of motion to control a pair of horizontal and vertical scroll bars. As illustrated in FIG. 37, the portable device may be moved as shown by the arrows and the associated device motion may be detected. This process may be used in place of a keyboard or mouse in widgets or applications where text scrolling is required. Alternately, the portable device may be moved in a rectilinear fashion as shown by the arrows in FIG. 38 where the device is used to trace out the position on the screen, and then the device may be moved up or down to emulate the equivalent of a mouse click. Operation in the rectilinear mode may require sampling the accelerometer at a high rate and double integrating the acceleration data, as shown in FIG. 36, to derive the device position.

A range of processing may be further applied such as adaptive detection and cancellation of accelerometer drift and static offsets within the integration process. There may also be need for application of intelligence in interpreting the resultant positional readings as these translate into screen coordinates, because the human user's perception of linear motion is tempered by the total range of linear motion allowed. For example, a common problem when using a mouse is that the area for mouse usage is smaller than the area traced on the screen, requiring the user to pick up the mouse and replace it on the mouse pad. Intelligence algorithms may be applied to monitor the acceleration profiles to detect and correct differences between re-centering a device and the actual movement and clicking motions made by the user.

Another mode of operation using gesture recognition may be implemented using common gestures in a form of sign language. For example, a series of sign language motions for particular words or expressions could be predefined. Flipping a portable device upside down and shaking it, like one might shake a piggy bank, could be defined to switch the portable device to a stock portfolio application or widget. Other common gestures, such as those associated with frustration, affection, or simple symbols, could be used as a method of activating a particular behavior on the device. Other embodiments could allow the user to throw the device and measure how fast it has been thrown, or acceleration data could be stored on the device in non-volatile memory to indicate that the device is no longer in warranty because it was thrown or dropped too hard. It will be noted that all of the above profiles could be used in a variety of applications from video game interfaces to control panel configurations.

In certain embodiments portable devices may use a bend sensor to detect when the device is squeezed by a user. Alternately, the accelerometer and associated modules may also be trained to recognize this type of gesture. In particular, there are at least two types of motions that portable devices may be configured to learn that are specific to soft devices. The first is denoted here as the squeeze, and the second is denoted as the squish. A squeeze motion occurs when a user takes the device and compresses it in their hands, as may be done with a stress ball or similar device. This may cause the accelerometer to deflect in a characteristic velocity and tilt profile. As previously discussed with reference to FIG. 36, a matched filter such as matched filter 3690 may be either pre-programmed based on calibrated squeeze motions or user programmed based on their specific squeeze motion to recognize the squeeze gesture. Subsequent squeeze motions may then be detected based on correlating a squeeze motion with the pre-programmed motion sequence in the matched filter. Such as process could be used either in conjunction with bend sensors or as a replacement for a bend sensor in certain embodiments.

A squish motion occurs when a user pushes a portable device down on a hard surface, such as a table, similar to pushing off an alarm clock sounding in the morning. This type of motion can be detected through a variety of mechanisms, including matched filtering, acceleration profiling, tilt detection, or by other means. As defined, the difference in detection of a squeeze motion versus a squish motion lies in the way the device is manipulated. A squeeze motion compresses the device primarily depth-wise, while a squish motion compresses the device height-wise. It will be recognized, however, that both motions are related to the more general motion related detection processes and systems described previously.

In some embodiments, portable devices may use the accelerometer and related modules to detect and track the position of the device within a building. For example, in some embodiments the device may be configured to detect and track which room it is currently located in. In order to determine location in this way, it is assumed that the device is fitted with proper hardware and software to allow it to operate in a portable, mobile mode. In the simplest implementation, the X, Y, and Z accelerations are double integrated, such as is illustrated in FIG. 36, and position is determined As previously noted, absolute position determination applying this approach may be difficult because of introduction of noise and system errors. In particular, position errors may accumulate rapidly because the double integral required to convert acceleration into position tends to accumulate error factors at a square law rate. Nevertheless, there are a variety of ways of addressing these problems as discussed in further detail below.

Figure 39A:
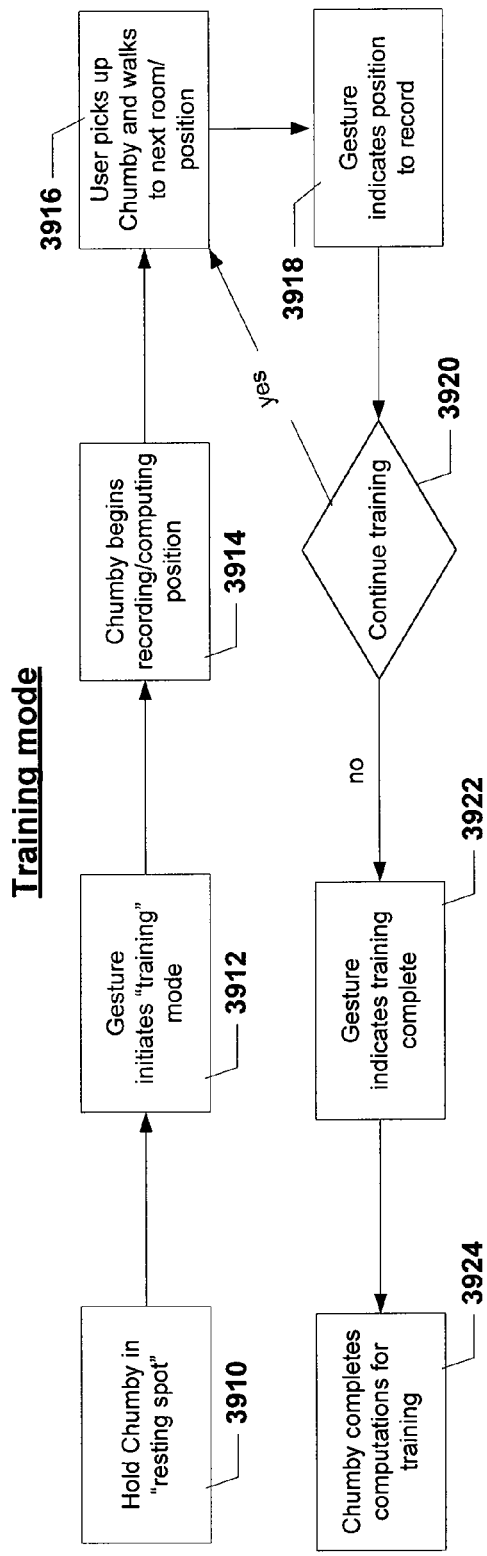
FIG. 39A is a flowchart illustrating an embodiment of a portable device training mode process for mapping device positions in a defined area, in accordance with aspects of the present invention.
Figure 39B:
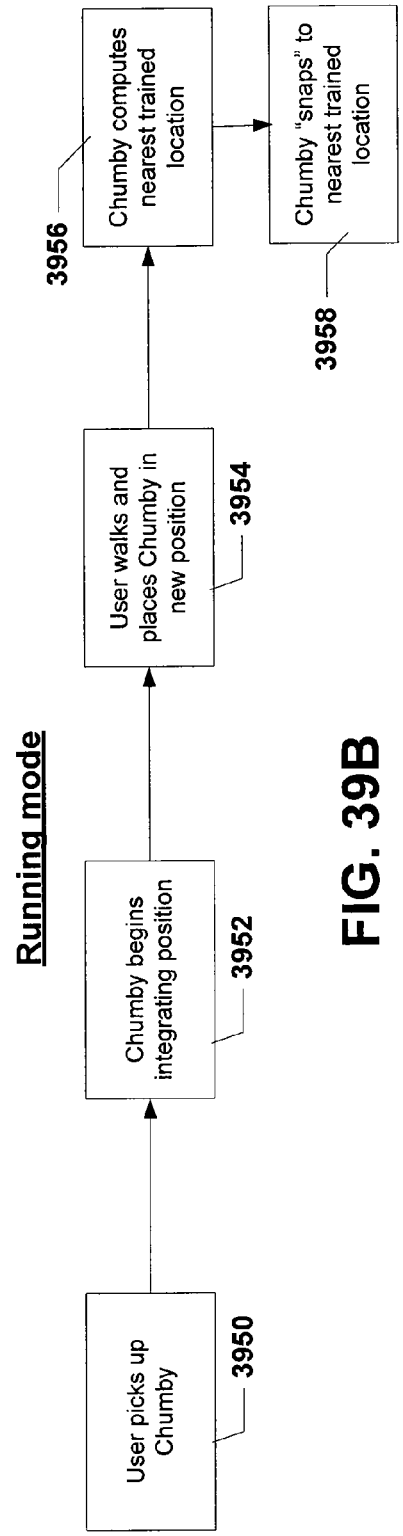
FIG. 39B is a flowchart illustrating an embodiment of a portable device running mode process for determining device positions in a defined area in accordance with aspects of the present invention.

With reference to FIGS. 39A & 39B, in one embodiment, the portable device may be used in two distinct operating modes related to location detection. The first mode is denoted as a training mode, and the second is a running mode. Diagrams showing operation and movement of the portable device in accordance with training and running modes are shown in FIGS. 41A & 41B respectively.

Figure 41A:
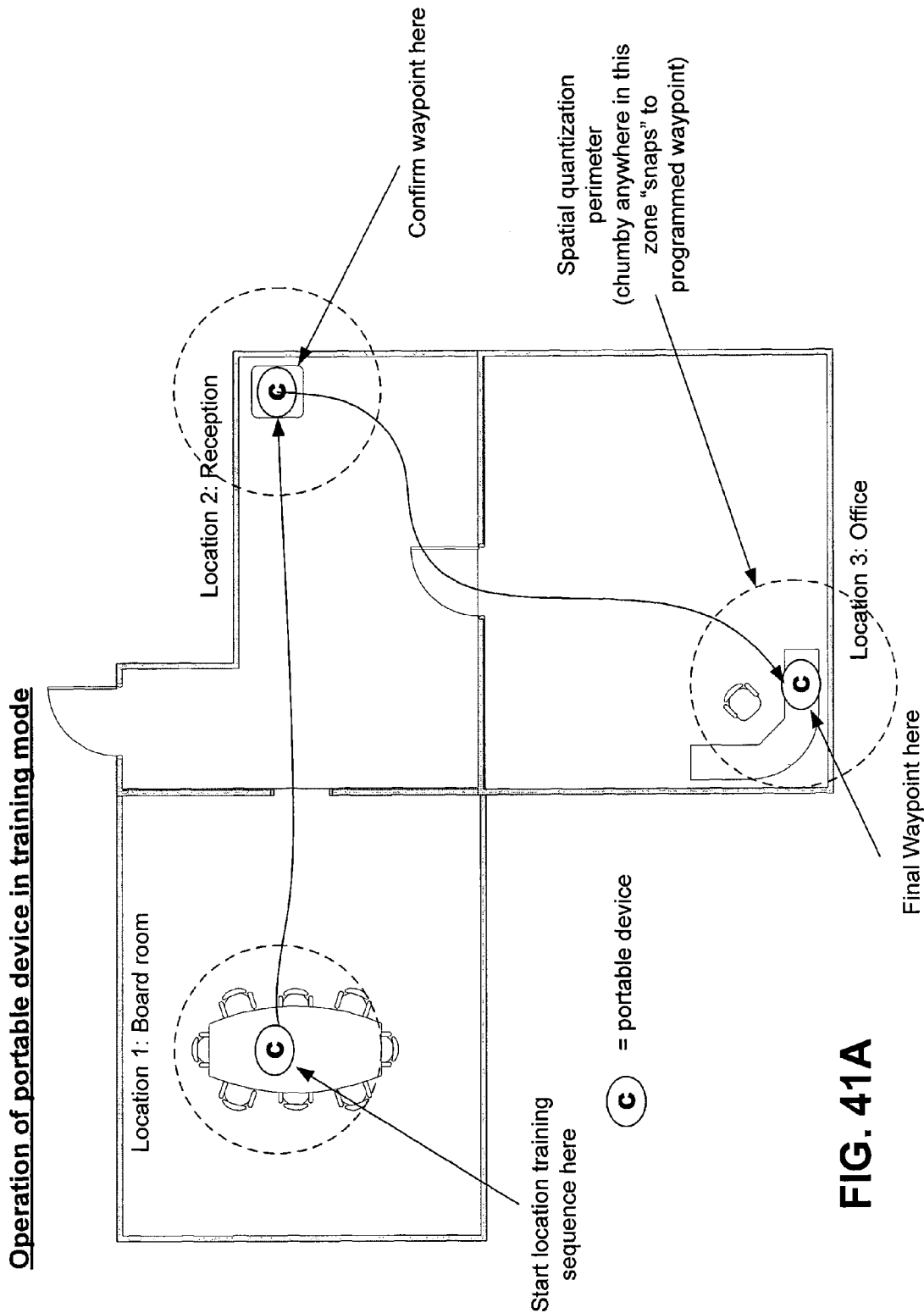
FIG. 41A illustrates operation of a portable device in location training mode as described with respect to FIG. 39A.

In the training mode, as illustrated in FIGS. 39A & 41A, the user holds the device at a reference position resting spot in step 3910, such as in a reference position in the first room. The user then makes a gesture initiating a training session in step 3912, by for example, pressing the screen or squeezing the device to generate a start signal. The device then performs a step 3914 of recording data and computing position. The process may be continued by picking up the device in step 3916 and moving to another position such as a reference position in another room. Once in the next position, the user again makes a gesture in step 3918 and continues the training in step 3920 until completion of training is signaled by a user supplied indication in step 3922 such as another gesture. The device may then complete any associated training and calibration calculations in step 3924. This process may be repeated at step 3920 by returning to step 3916 until all rooms have been trained. In one exemplary embodiment, there is a preference that the user return to the first room and position, then notify the device that it is in the original reference position, whereupon the device determines overall drift and error factors over the entire trajectory.

Figure 41B:
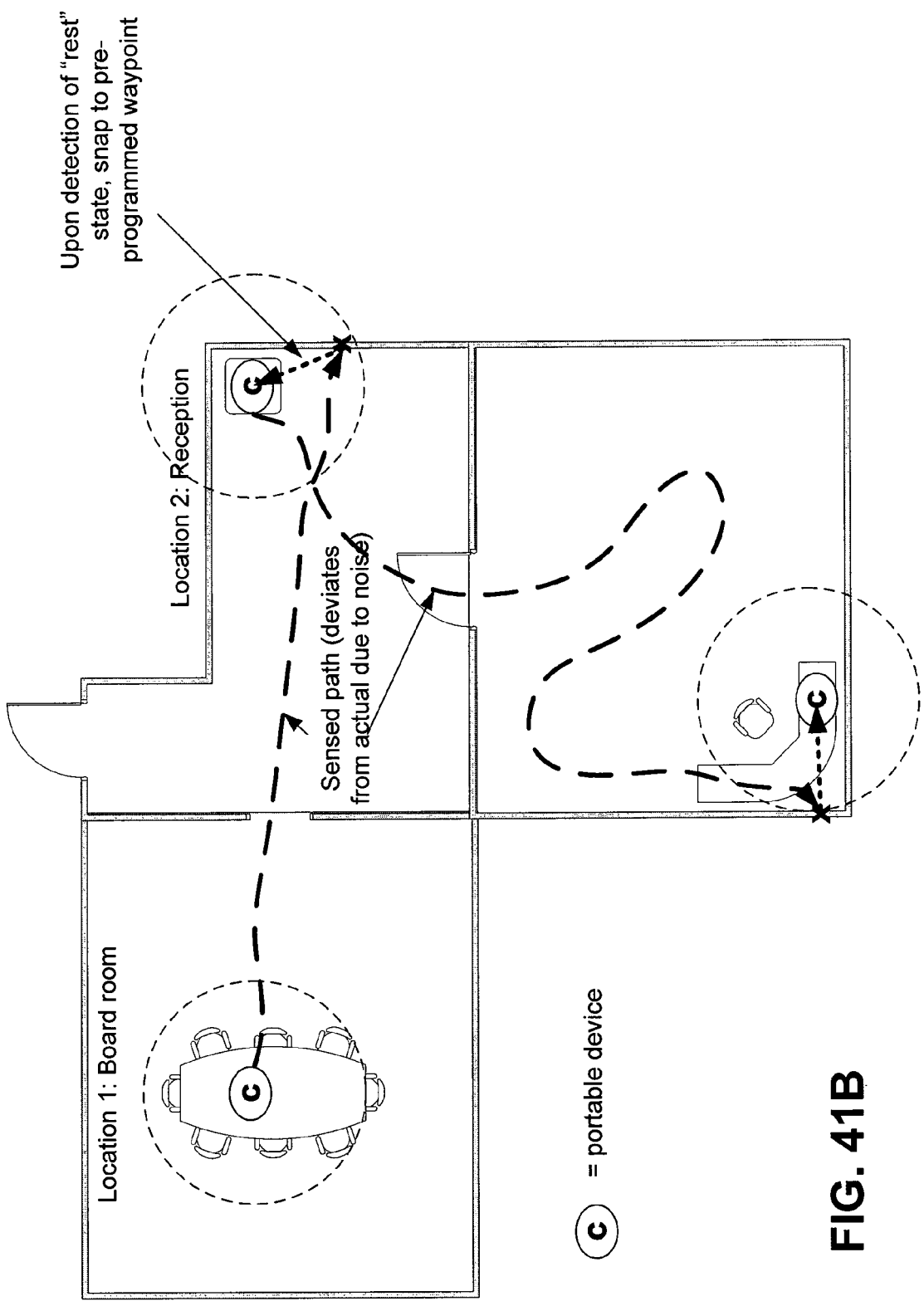
FIG. 41B illustrates operation of a portable device in running (location recognition) mode, and snapping as described with respect to FIG. 39B.

In the second mode, denoted the running mode, as illustrated in FIGS. 39B & 41B, the portable device may set a dead zone around the accelerometer, which may be determined based on the overall drift and error factors, so that it avoids integrating noise and static offsets. As shown in FIGS. 39B & 41B, a user may start operation by picking up the device at step 3950, whereupon the device begins determining position based on integrating acceleration in step 3952. There may also be additional intermediate movement steps as the user moves the device around a room or other trained area.

As the user moves the device, various errors may place the devices in a location that is not identical to any of the previously trained locations. In this case, the device may determine the nearest trained location in step 3956, by for example, calculating the magnitude of the vector between the current inferred location and the previously memorized locations. The device may then apply processing to "snap" (i.e. quantize) the position to the nearest trained location in step 3958. This snapping process may be used to help eliminate some or all of the drift factors that may accumulate over time and may be repeated as the user moves the device from place to place. It will be noted that this approach may have some weaknesses. For example, if the user cannot decide where to place the device, it may end up in a slightly different location each time it is put down. Presumably, however, each room will be large compared to the relative error in the placement of the device so the snapping routine will still place the device close to the desired position. Further, it will be noted that if the device is turned off, moved, then turned on again in a different location, it will generally not know where it is, so a user may be required to provide the current position to the device. This may be done by telling the device, via a menu, which of the previously trained locations it is closest to.

These motion tracking features may be used to implement a number of clever and fun applications on a portable device, especially if the device is coordinated with data from a central server so that the device has some knowledge or awareness of other the portable or similar devices in it's vicinity. In addition, these motion tracking features can be used to implement security features. For example, if a device is moved without a known user entering a security code, it may be configured to sound an alarm. Alternately, it could be hung on a door handle to provide an alarm or door chime when moved.

As previously discussed with reference to FIG. 36, a portable device may be trained to detect a particular motion pattern using a matched filter. For example, a device may be programmed to detect when motion on a washing machine stops and then send a message to another device indicating that the washing process is finished. The other device may then indicate to a user, by a variety of means such as audible or visual indicators, that the wash is finished. In other embodiments, a device may be configured to detect a motion pattern associated with earth movement, such as a vibration associated with a earthquake. In this mode a seismometer widget could be continuously or intermittently run so that when targeted earth movements occur the position, time, magnitude, and other parameters could be reported to a central server or local or remote user. This implementation might be used by geologists or seismologists to create more detailed maps of seismic activity than have been previously available.

In some embodiments it may be desirable to provide for calibration of the portable device. It will be noted that there are a variety of methods for calibrating a device either based on a known reference position or relative to the current device position. Due to natural static offsets in the accelerometer, it may not be possible to determine, based on a particular analog output such as a voltage, a representative fixed tilt angle. As a consequence, in some embodiments it may only be possible to reliably determine the relative angle of the device given an initial starting point. Therefore, in some embodiments calibration of the device may be an important step prior to operation.

Figure 40:
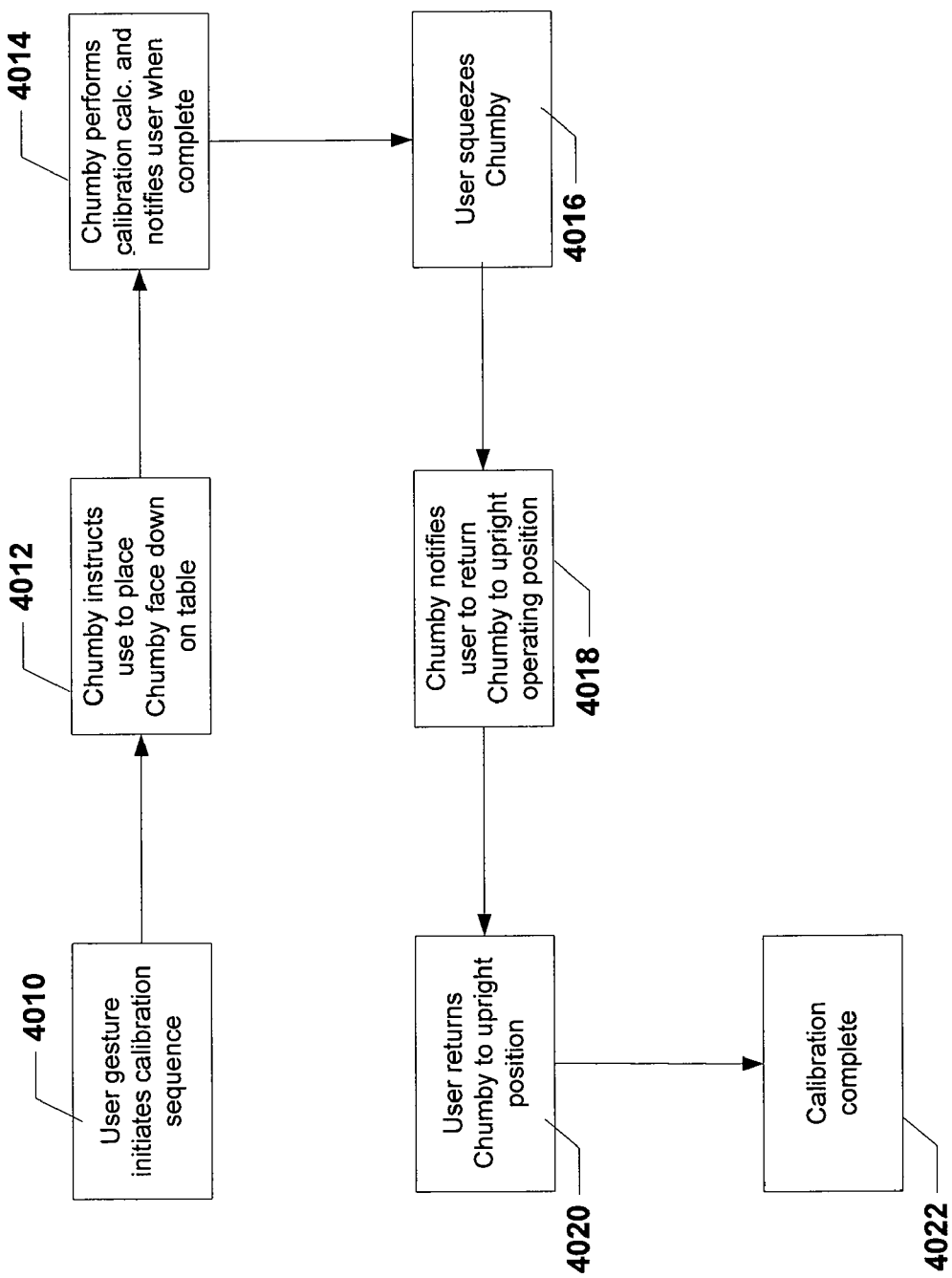
FIG. 40 is a flowchart illustrating an embodiment of a portable device motion sensing calibration process in accordance with aspects of the present invention.

In one exemplary embodiment of a calibration procedure as illustrated in FIG. 40, a portable device may use the multimedia capabilities described in other sections of this and other related disclosures to aid in calibration. In this embodiment, the user initiates the calibration process by, for example, providing an initiation gesture in step 4010. Once the process has been started, the device then instructs the user to place it on a surface, such as by placing it down on a table as in step 4012. The device then performs calibration calculations, determines the calibrated position, and notifies the user in step 4012 by, for example, making a beep or other sound or visual indication that the process is complete. Following the notification of step 4012, the user may then signal the device in step 4016, by, for example, squeezing the device. The device may then notify the user to return it to an upright position in step 4018. Because most tables in modern countries are flat with respect to gravitational attractive forces, this process can be used to establish a well-known, fixed geometry with respect to the earth as a calibration or reference point.

Server Systems and Applications

Figure 7:
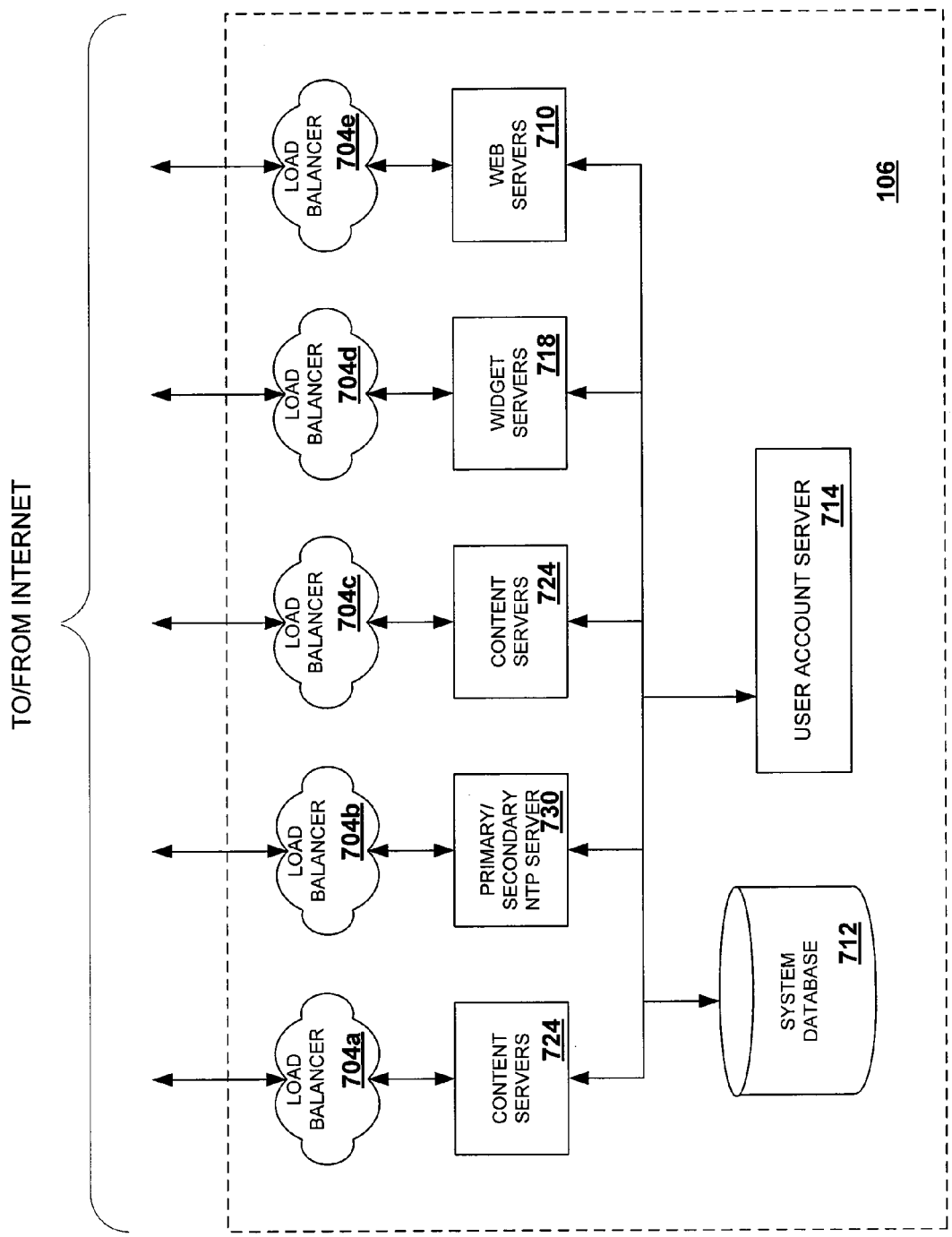
FIG. 7 provides a block diagrammatic representation of the server components and other infrastructure which may be utilized to facilitate the operations of a portable device service provider.

Referring now to FIG. 7, a block diagrammatic representation is provided of the server components and other infrastructure which may be utilized to facilitate the operations of portable device service provider 106. It is understood that the representation of FIG. 7 is functional in nature, and single or multiple computers may be adapted to execute software designed to perform one or more than one of the functions described below. For example, the functionality provided by the load balancers 704 may be provided by a single computer or multiple computers. Similarly, each of the servers represented in FIG. 7 may be realized using either a single server computer or using a cluster comprised of primary, secondary and backup server computers interconnected in configurations familiar to those skilled in the art.

As shown in FIG. 7, one or more Web servers 710 are used to define the Web interface presented by the portable device service provider 106 to users or other interested parties. A system database 712 may include, among other things, marketing materials, press information, and contact information relating to the portable device service that is served by the Web servers 710. Also included may be information relating to registration and first-level support.

A user account server 714 maintains user account data and provides authentication services to the other servers depicted in FIG. 7.

One or more widget servers 718 are used to serve widgets to portable devices 102. Each widget server 718 will typically be sufficiently powerful to encrypt and sign widgets on demand. In addition, each server 718 will be configured to "store-and-forward" widgets being sent from one user to another.

The service provider 106 may also utilize a number of content servers 724 to provide information (e.g., new, weather, stock market information) to portable devices 102. In an exemplary embodiment all content servers function in a "pull" mode of operation; that is, portable device 102 polls the applicable content server 724 for new data on some periodic basis. Each response from a content server 724 preferably contains the schedule and frequency for subsequent polls. For example, a content server 724 disposed to provide stock market information can change the polling frequency to reflect whether or not the stock market is open. In other implementations a portable device 102 may be provided with the capability to change polling frequencies on the basis of, for example, environmental conditions (e.g., ambient room brightness) or other factors. One or more of the content servers 724 may be used for serving certain types of content uploaded by users for use on their own or other portable devices 102 and stored within the system database 712.

The portable device service provider 106 will typically maintain a small number of load-balanced Network Time Protocol (NTP) servers 730 to provide time to portable devices 102. Each such server 730 will be configured to fetch their time from a "primary" NTP server, which fetches time from an upstream external public NTP server. If the primary NTP server 730 is inoperative, secondary NTP servers 730 will synchronize with a random selection of upstream servers. If all servers 730 are unavailable, a portable device 102 will either fetch time information from random public NTP servers or simply have its time adjusted via user input. In one embodiment each portable device 102 requests time upon connecting to the Internet and at jittered intervals thereafter, no more frequently than once a day.

Figure 8:
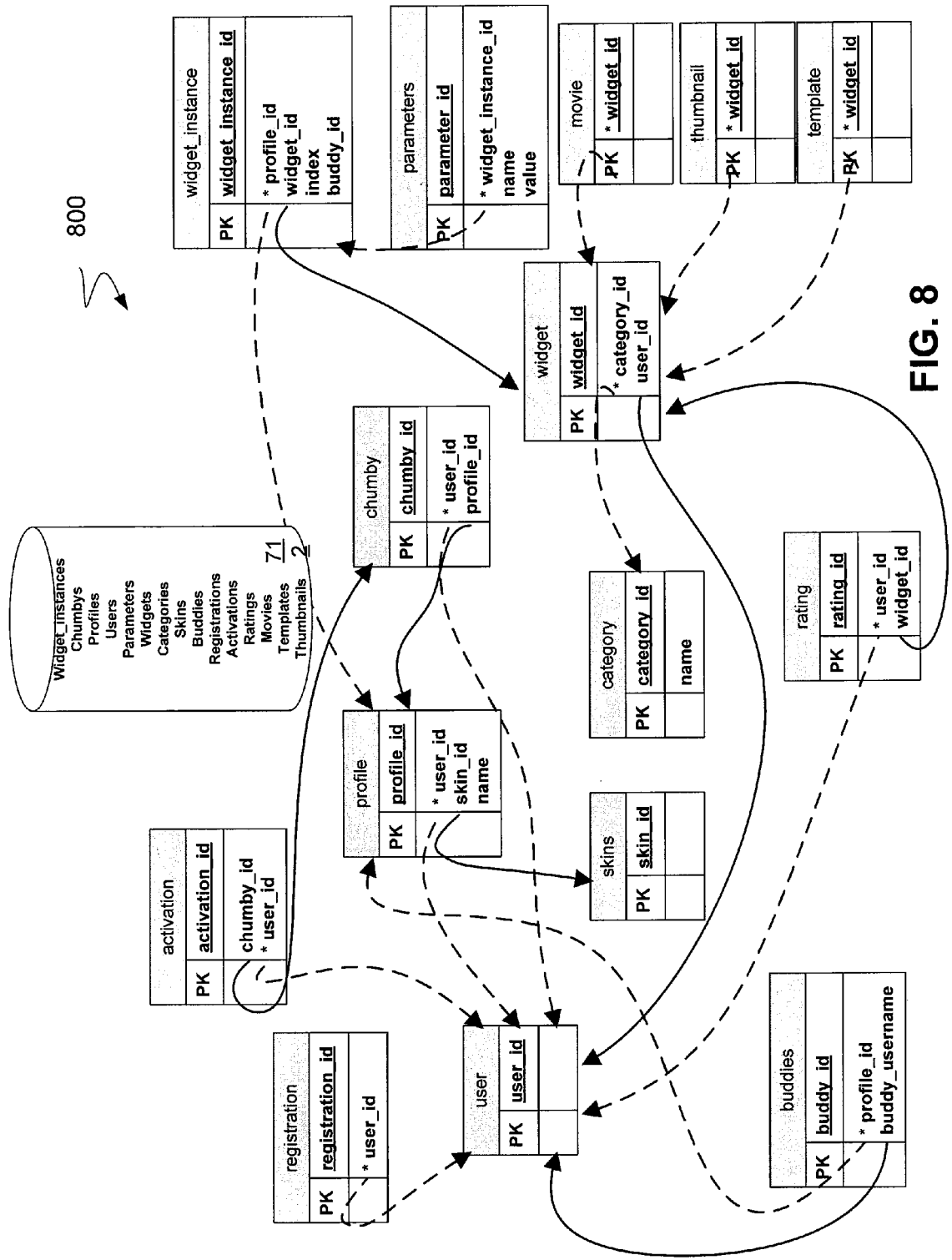
FIG. 8 provides a database model diagram of an exemplary object-oriented database schema utilized by a system database.

Turning now to FIG. 8, an illustrative representation is provided of an exemplary object-oriented database schema 800 utilized by the system database 712. As shown, the schema 800 includes the following tables: buddies, categories, portable devices, parameters, profiles, skins, users, widget instance, widgets. Although the type of information contained within a number of these tables will be readily apparent to those skilled in the art in view of the discussion herein, a simplified example of various steps performed during user registration and the adding of a widget to a "profile" is provided in order to further illuminate the structure of the database schema 800.

In one embodiment the user registration and account creation process is initiated by a user through submission, via a Web browser 122, of a portable device ID so as to identify a particular portable device 102. The act of creating a user account results in the construction of a default profile and one or more widget instances, each of which is automatically assigned to the portable device 102 (as identified by its portable device ID) currently being registered. When a user adds a widget to the user's profile, the user is presented with a list of potential categories based upon information within the categories table. The user then selects a category from the categories table, and the user is presented with a list of widgets belonging to the chosen category. After the user chooses a widget, a widget instance is constructed and information is entered into the appropriate fields (e.g., profile id, widget id, index). The user is then presented a user interface via the Web browser 122 for editing the widget-specific parameters associated with the selected widget. In response to the user's parameter selections, records are appropriately updated in the parameters table.

System Operation

Client-Server Communication Protocol

In general, it is contemplated that embodiments of the invention will be implemented such that each portable device 102 will function as a client relative to various servers existing within the portable device service provider 106. In these embodiments, the portable devices 102 do not engage in direct communication with each other, but may do so via independent client-sever relationships established with the service provider 106. In this way the service provider 106 may facilitate the communication of a variety of different types of executable files (e.g., widgets or other computer programs, audio clips, short "Flash" movies, etc.) among portable devices 102, subject to the permission of the content owner and potential recipient. A user may designate that a widget or other content be sent to another user, or to the members of a user's "buddy list" or the like. This designation may be made via a Web browser 122 in communication with the service provider 106, or directly through the interface of the user's portable device 102.

In one embodiment executable files may be created by users of portable devices 102 or other third parties and loaded within the system database 712 after being approved by the entity operating the service provider 106. Once a widget or other executable file has been created and stored within the system database 712, it is made available for use by all those users of portable devices 102 that have been granted the requisite permission. Various schemes for granting permissions among and between users are possible. For example, one such type of permission could entail that any user X that is given permission by a user Y to send widgets to user Y's portable device may select any widget for which user X has usage rights and "send" such widget to user Y's portable device. Other restrictions could be placed on the transferability of widgets or other files from the service provider 106 to a portable device at the request of another user. For example, a user could be provided with the capability to "lock" certain widgets on only the user's portable device, or a portable device could reach a "full" state and advertise itself as being incapable of receiving any additional widgets.

Although widgets and other executable files could be transferred between the service provider 106 and portable devices 102 in a number of different formats, in one embodiment such transfers will occur in the Flash movie format (i.e., as .swf files, when not signed or encrypted). In this case the process for downloading widgets from the service provider 106 includes receiving a notification at a portable device 102 that a "new" widget is ready for downloading. Since in the exemplary embodiment each portable device 102 acts in a "pull" mode, each device 102 periodically polls the service provider and inquires as to whether any configuration changes are available to load. In the case in which a new widget is available for downloading, the portable device 102 will generally use standard HTTP (or HTTPS) protocols in downloading the applicable widget file.

Attention is now directed to FIGS. 9-13, which are a series of signal flow diagrams representative of the client-server communication protocol established between a portable device 102 and the portable device service provider 106. As mentioned above, each portable device 102 functions as a client relative to the portable service provider 106. In one embodiment the basic protocol established between each portable device and the corresponding server entity of the portable service provider 106 may be characterized as XML using a Representational State Transfer (REST) architecture transmitted using HTTP. In general, the portable device 102 issues periodic HTTP GET or POST requests and the service provider 106 responds with a block of XML. The portable device 102 will use HTTP GET for relatively simple requests, and POST for more complex requests, which will be in encapsulated in XML. Individual data elements are uniquely identified by Global Unique Identifiers (GUID). In one embodiment, there will be some form of cryptographic key exchange and transactions will be encrypted using those keys. Furthermore, XML may be compressed in order to facilitate transfer between the portable device 102 and the portable device service provider 106.

Each portable device 102 will have a unique GUID. Time codes will be represented in ISO-8061 format.

Requesting a Portable Device Configuration

Figure 9:
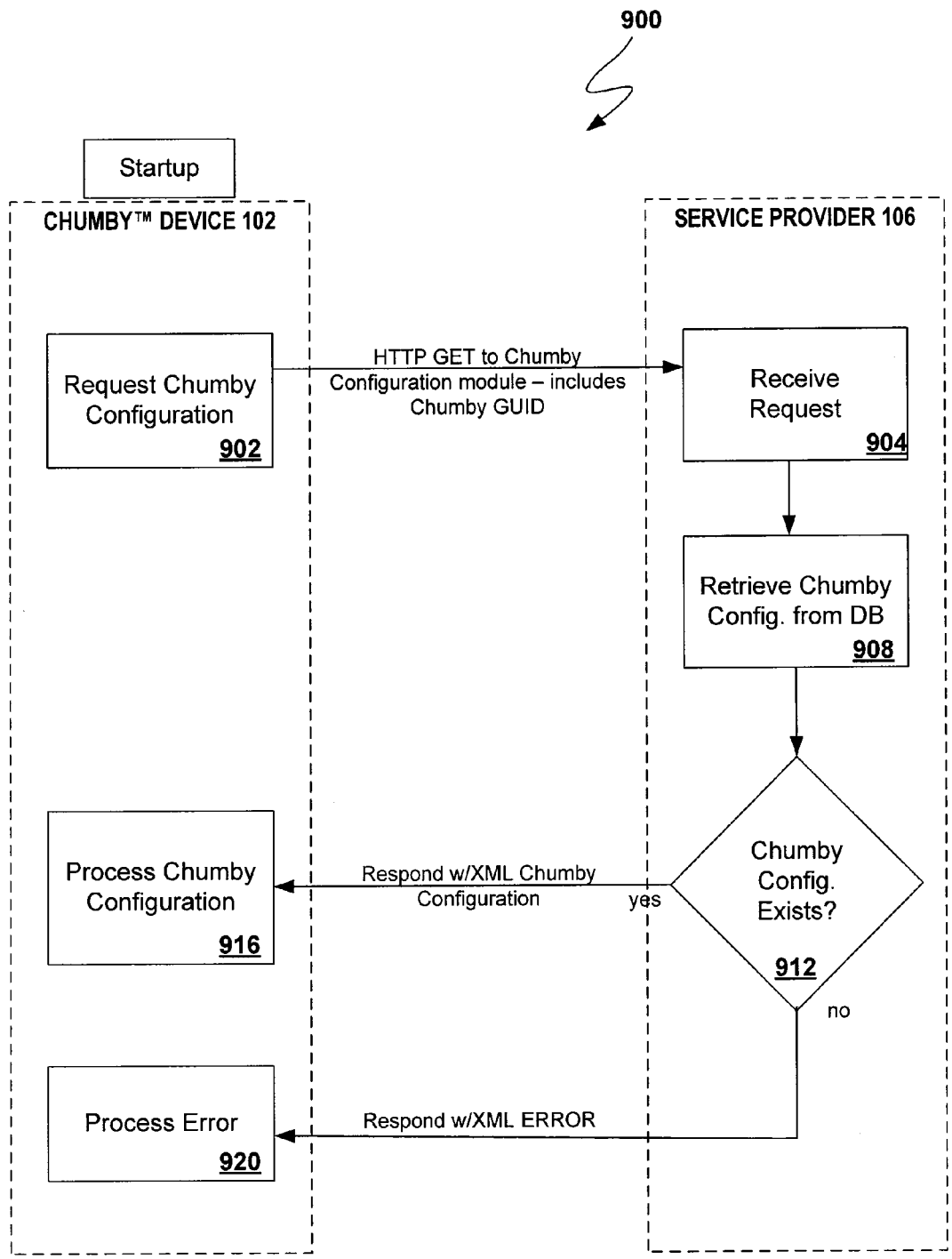
FIG. 9 is a signal flow diagram representative of one manner in which a configuration is provided to a portable device by a service provider.

Referring to FIG. 9, a signal flow diagram 900 illustratively represents one manner in which a "portable device configuration" is provided to a portable device 102 by the service provider 106. In one embodiment each portable device 102 operates in accordance with a configuration, which specifies the profile to be loaded by the portable device 102 under various conditions. The user specifies the profile for the portable device 102 via a web interface at the associated portable device web site. The profile contains several operational parameters for the portable device 102.

As shown in FIG. 9, the requesting of a configuration is initiated when the portable device 102 sends an HTTP GET request containing the GUID of the requested configuration to a portable device configuration object within the system database 712 maintained by the service provider 106 (stage 902). An example of such a request is provided below:

http://server.chumby.com/xml/chumbies/CB6A8A20-DFB8-11DA-98FA-00306555C864

The service provider 106 receives the request (stage 904), and retrieves the requested configuration from the system database 712 (stage 908). If the requested configuration exists, the service provider responds with an XML-based configuration; if not, the service provider 106 responds with an XML-based error message (stage 912). An exemplary XML-based response generated by the service provider 106 is given below:

```
<?xml version="1.0" encoding="UTF-8"?>
<chumby id="CB6A8A20-DFB8-11DA-98FA-00306555C864">
    <name>Bathroom</name>
    <profile href="/xml/profiles/00000000-0000-0000-0000-000000000001"
    name="Default" id="00000000-0000-0000-0000-000000000001"/>
    <user username="Frank" href="/xml/users/00000000-0000-0000-
    0000-000000000001" id="00000000-0000-0000-0000-
    000000000001"/>
</chumby>
```

Once the response is received by the portable device 102, it is processed by the Master Controller (stage 916). If an error is instead received, it is processed by the Master Controller as well (stage 920).

Requesting a Profile

Figure 10:
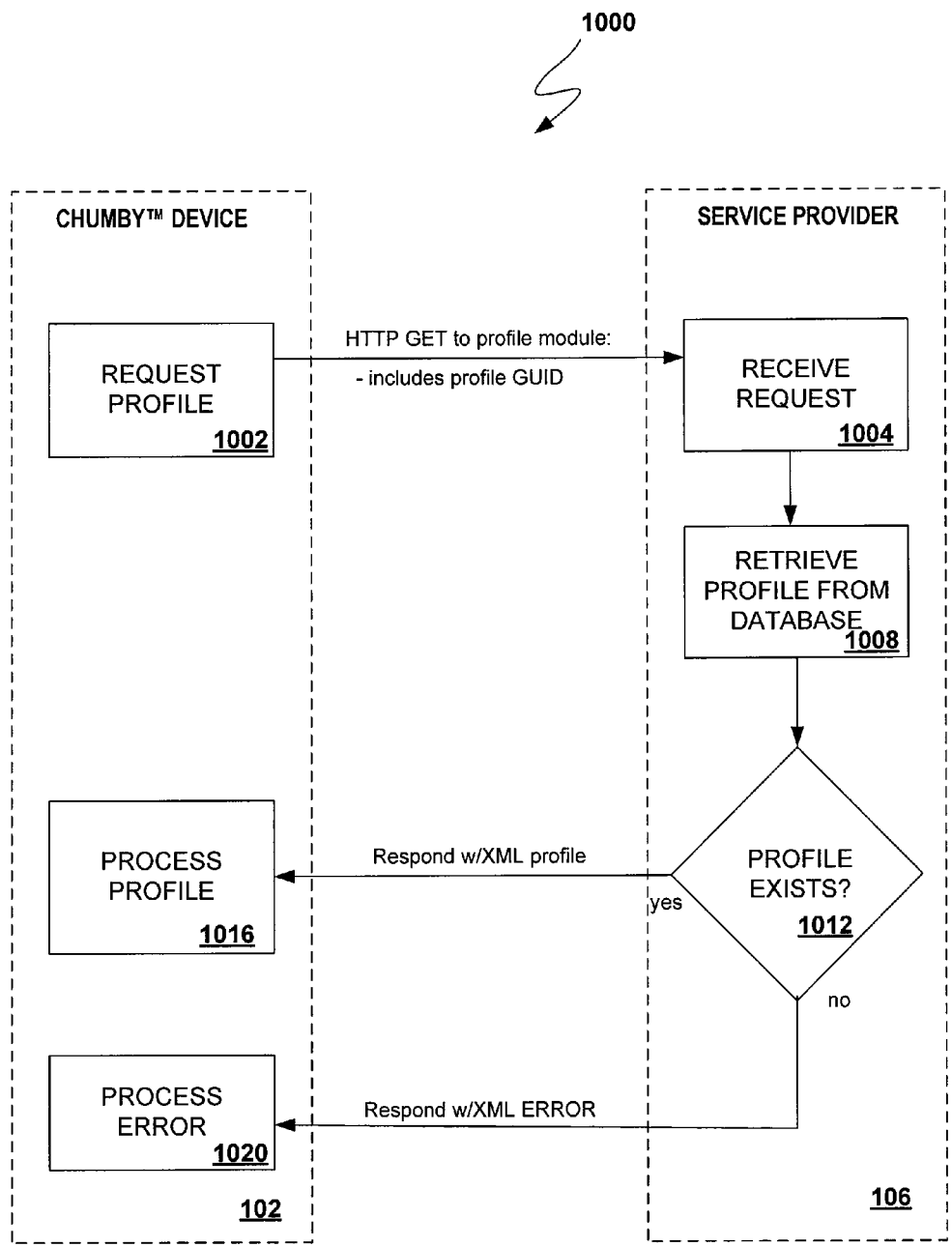
FIG. 10 is a signal flow diagram which represents one manner in which a profile is provided to a portable device by a service provider.

Referring to FIG. 10, a signal flow diagram 1000 illustratively represents one manner in which a "profile" is provided to a portable device 102 by the service provider 106. In one embodiment each portable device 102 operates in accordance with a profile, which specifies the set of widgets to be executed by the portable device 102 under various conditions. This enables a user to specify that a certain subset of the available set of widgets is to be instantiated and utilized during a particular time frame, based upon the location of the user's portable device 102 or the skin (or housing) within which the portable device 102 is currently seated. For instance, the user may desire that local weather and traffic information be provided while the user is located at home, but would prefer that airline flight information be available from the portable device 102 when the user is traveling.

As shown in FIG. 10, the requesting of a profile is initiated when the portable device 102 sends an HTTP GET request containing the GUID of the requested profile to a profile object within the system database 712 maintained by the service provider 106 (stage 1002). An example of such a request is provided below:

http://server.chumby.com/xml/profiles/00000000-0000-0000-0000-000000000001

The service provider 106 receives the request (stage 1004), and retrieves the requested profile from the system database 712 (stage 1008). If the requested profile exists, the service provider responds with an XML-based profile; if not, the service provider 106 responds with an XML-based error message (stage 1012). An exemplary XML-based response generated by the service provider 106 is given below:

```xml
<?xml version="1.0" encoding="UTF-8"?>
<profile id="00000000-0000-0000-0000-000000000001">
   <name>Default</name>
   <description>Default profile for your Chumby</description>
   <user username="chumby" href="/xml/users/00000000-0000-0000-0000-000000000001"
    id="00000000-0000-0000-0000-000000000001"/>
   <skin href="/xml/skins/00000000-0000-0000-0000-000000000001" name="Standard"
    id="00000000-0000-0000-0000-000000000001"/>
   <access access="private" id="EC667B90-EC41-11DA-8774-00306555C864"/>
   <widget_instances>
      <widget_instance href="/xml/widgetinstances/B2BE8552-E7F2-11DA-B4BD-00306555C864"
       id="B2BE8552-E7F2-11DA-B4BD-00306555C864"/>
      <widget_instance href="/xml/widgetinstances/033BFBC2-E794-11DA-B4BD-00306555C864"
       id="033BFBC2-E794-11DA-B4BD-00306555C864"/>
      <widget_instance href="/xml/widgetinstances/94177E18-E777-11DA-B4BD-00306555C864"
       id="94177E18-E777-11DA-B4BD-00306555C864"/>
      <widget_instance href="/xml/widgetinstances/9AA50336-E777-11DA-B4BD-00306555C864"
       id="9AA50336-E777-11DA-B4BD-00306555C864"/>
      <widget_instance href="/xml/widgetinstances/9E4647F2-E777-11DA-B4BD-00306555C864"
       id="9E4647F2-E777-11DA-B4BD-00306555C864"/>
      <widget_instance href="/xml/widgetinstances/7AC67832-E77D-11DA-B4BD-00306555C864"
       id="7AC67832-E77D-11DA-B4BD-00306555C864"/>
      <widget_instance href="/xml/widgetinstances/B4C35F06-E777-11DA-B4BD-00306555C864"
       id="B4C35F06-E777-11DA-B4BD-00306555C864"/>
      <widget_instance href="/xml/widgetinstances/5D81823A-E77D-11DA-B4BD-00306555C864"
       id="5D81823A-E77D-11DA-B4BD-00306555C864"/>
   </widget_instances>
</profile>
```

Once the response is received by the portable device 102, it is processed by the Master Controller (stage 916). If an error is instead received, it is processed by the Master Controller as well (stage 920).

Each Profile has a name, a description, a skin, and a list of "Widget Instances". The Profile will be periodically refetched in order to reflect changes made by the owner, for instance, adding and removing Widget Instances.

The portable device 102 processes each Widget Instance in turn, fetching the settings for each widget, and the Widget itself, and displays the Widget with the settings encapsulated by the Widget Instance.

A process similar to that described with reference to FIG. 9 may be used to change a profile. An example of an HTTP POST containing an the GUID of the profile to modify and an XML-based request to change a profile generated by the portable device 102 is given below:

```
http://server.chumby.com/xml/profiles/00000000-0000-0000-0000-000000000001
<?xml version="1.0" encoding="UTF-8"?>
<profile id="00000000-0000-0000-0000-000000000001">
   <name>Default</name>
   <description>Default profile for your Chumby</description>
   <user username="chumby" href="/xml/users/00000000-0000-0000-0000-000000000001"
    id="00000000-0000-0000-0000-000000000001"/>
   <skin href="/xml/skins/00000000-0000-0000-0000-000000000001" name="Standard"
    id="00000000-0000-0000-0000-000000000001"/>
   <access access="private" id="EC667B90-EC41-11DA-8774-00306555C864"/>
   <widget_instances>
      <widget_instance href="/xml/widgetinstances/B2BE8552-E7F2-11DA-B4BD-00306555C864"
       id="B2BE8552-E7F2-11DA-B4BD-00306555C864"/>
      <widget_instance href="/xml/widgetinstances/033BFBC2-E794-11DA-B4BD-00306555C864"
       id="033BFBC2-E794-11DA-B4BD-00306555C864"/>
      <widget_instance href="/xml/widgetinstances/94177E18-E777-11DA-B4BD-00306555C864"
       id="94177E18-E777-11DA-B4BD-00306555C864"/>
      <widget_instance href="/xml/widgetinstances/9AA50336-E777-11DA-B4BD-00306555C864"
       id="9AA50336-E777-11DA-B4BD-00306555C864"/>
      <widget_instance href="/xml/widgetinstances/9E4647F2-E777-11DA-B4BD-00306555C864"
       id="9E4647F2-E777-11DA-B4BD-00306555C864"/>
      <widget_instance href="/xml/widgetinstances/7AC67832-E77D-11DA-B4BD-00306555C864"
       id="7AC67832-E77D-11DA-B4BD-00306555C864"/>
      <widget_instance href="/xml/widgetinstances/B4C35F06-E777-11DA-B4BD-00306555C864"
       id="B4C35F06-E777-11DA-B4BD-00306555C864"/>
      <widget_instance href="/xml/widgetinstances/10A66395-8500-215E-81F0-003256F98257"
       id="10A66395-8500-215E-81F0-003256F98257"/>
   </widget_instances>
</profile>
```

An exemplary XML-based response corresponding to such a request which contains the updated profile could be provided by the service provider 106 as follows:

```
<?xml version="1.0" encoding="UTF-8"?>
<profile id="00000000-0000-0000-0000-000000000001">
  <name>Default</name>
  <description>Default profile for your Chumby</description>
  <user username="chumby" href="/xml/users/00000000-0000-0000-0000-000000000001"
    id="00000000-0000-0000-0000-000000000001"/>
  <skin href="/xml/skins/00000000-0000-0000-0000-000000000001" name="Standard"
    id="00000000-0000-0000-0000-000000000001"/>
  <access access="private" id="EC667B90-EC41-11DA-8774-00306555C864"/>
  <widget_instances>
    <widget_instance href="/xml/widgetinstances/B2BE8552-E7F2-11DA-B4BD-00306555C864"
      id="B2BE8552-E7F2-11DA-B4BD-00306555C864"/>
    <widget_instance href="/xml/widgetinstances/033BFBC2-E794-11DA-B4BD-00306555C864"
      id="033BFBC2-E794-11DA-B4BD-00306555C864"/>
    <widget_instance href="/xml/widgetinstances/94177E18-E777-11DA-B4BD-00306555C864"
      id="94177E18-E777-11DA-B4BD-00306555C864"/>
    <widget_instance href="/xml/widgetinstances/9AA50336-E777-11DA-B4BD-00306555C864"
      id="9AA50336-E777-11DA-B4BD-00306555C864"/>
    <widget_instance href="/xml/widgetinstances/9E4647F2-E777-11DA-B4BD-00306555C864"
      id="9E4647F2-E777-11DA-B4BD-00306555C864"/>
    <widget_instance href="/xml/widgetinstances/7AC67832-E77D-11DA-B4BD-00306555C864"
      id="7AC67832-E77D-11DA-B4BD-00306555C864"/>
    <widget_instance href="/xml/widgetinstances/B4C35F06-E777-11DA-B4BD-00306555C864"
      id="B4C35F06-E777-11DA-B4BD-00306555C864"/>
    <widget_instance href="/xml/widgetinstances/10A66395-8500-215E-81F0-003256F98257"
      id="10A66395-8500-215E-81F0-003256F98257"/>
  </widget_instances>
</profile>
```

Widget Instance Upload/Download

Figure 11:
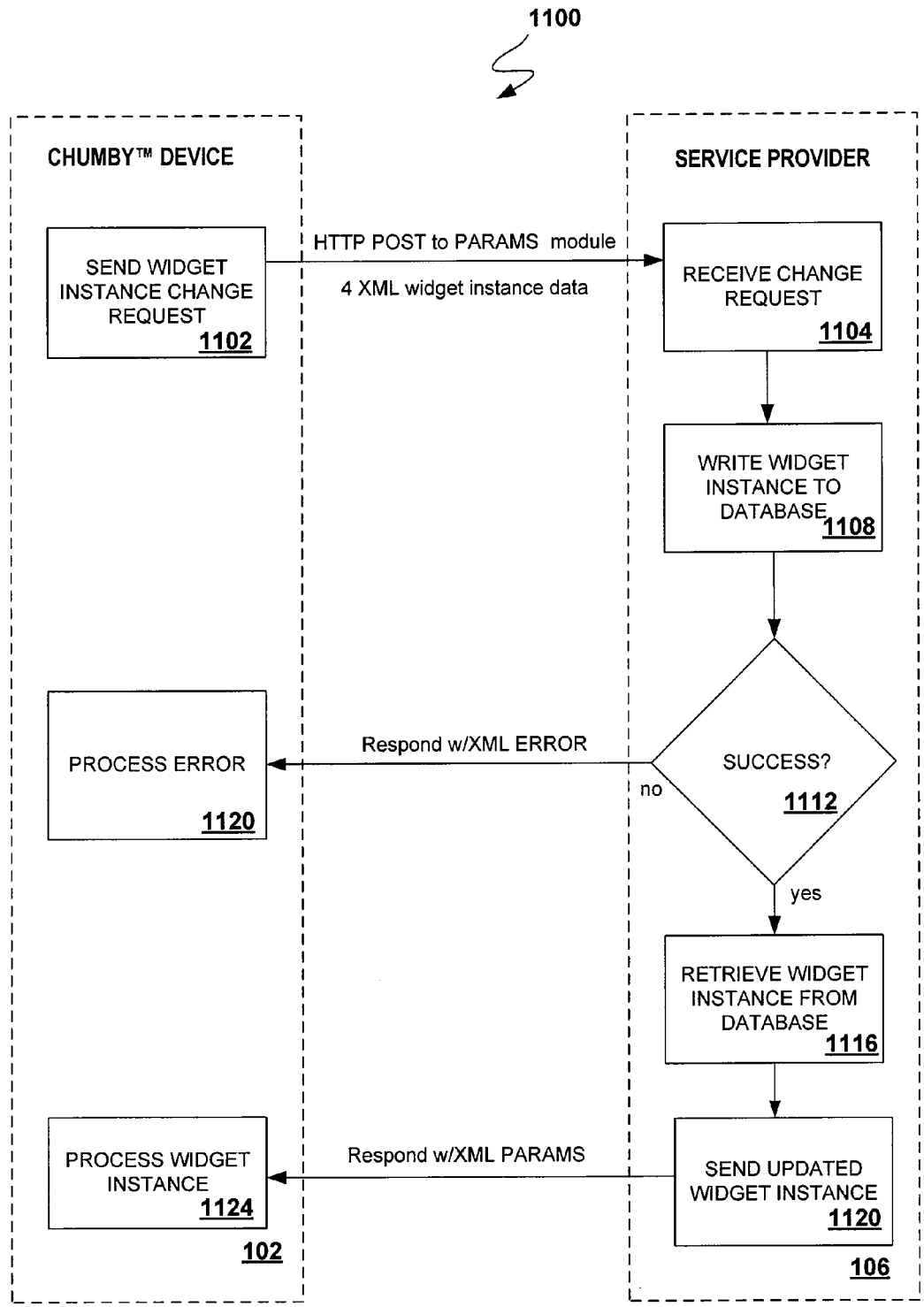
FIG. 11 is a signal flow diagram which depicts processing of changes made to the parameters of a widget instance through the interface of a portable device in which the widget is instantiated.
Figure 12:
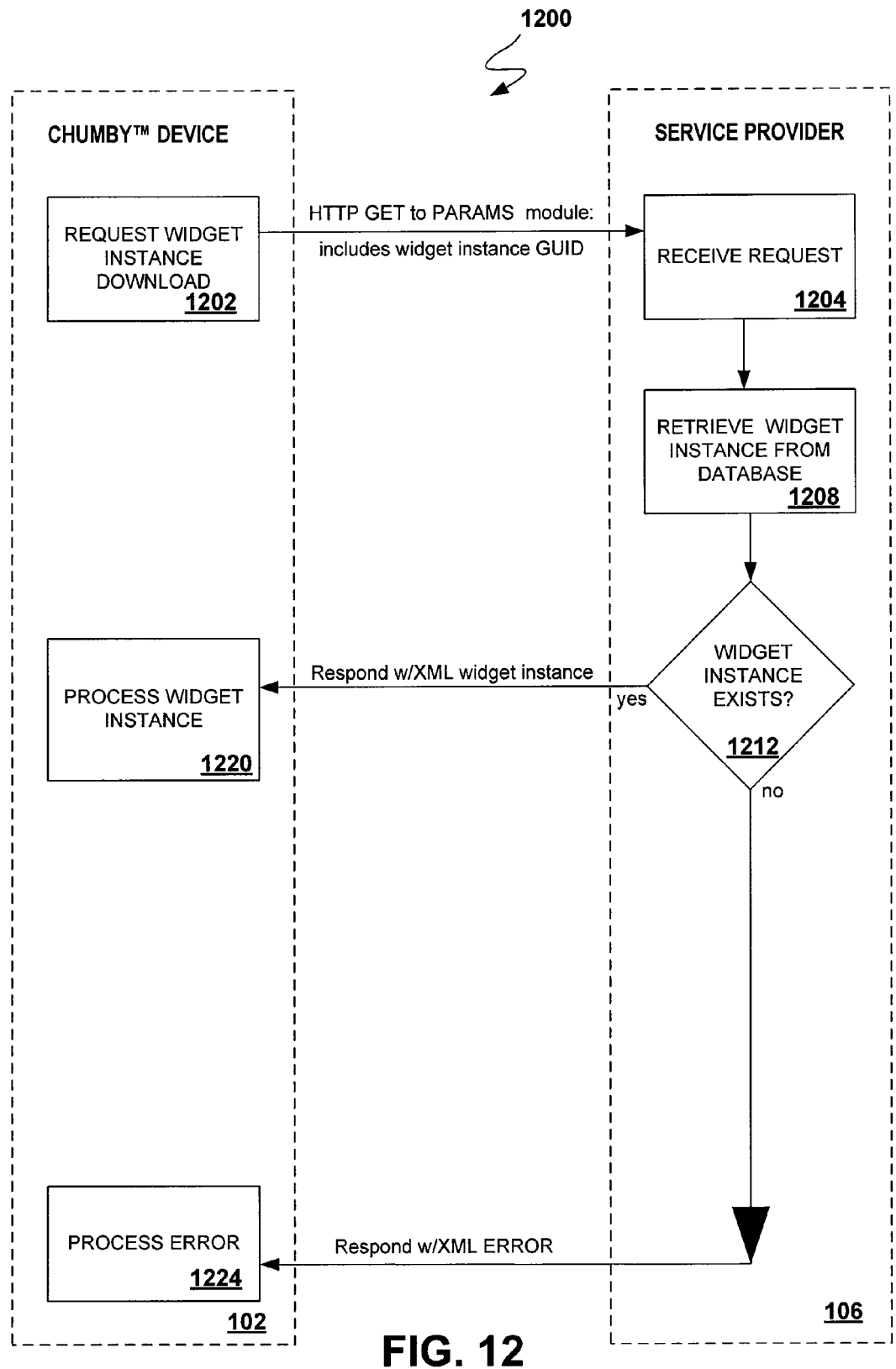
FIG. 12 is a signal flow diagram illustrating an exemplary widget instance download operation in which a service provider is requested to push values of widget-specific parameters to a requesting portable device.

Turning now to FIGS. 11-12, there are shown signal flow diagrams representative of the communication of widget instance information from the portable device 102 to the service provider 106, and vice-versa. In one embodiment the set of parameters associated with a widget instance determine the user-specified manner in which the behavior of the widget is modified when executed by a portable device 102. That is, the parameters fetched by the portable device 102 from the service provider 106 for a given widget constitute the user's "customized" settings, rather than dynamic content. For example, in the case of a "stock ticker" widget the applicable parameters could comprise the names and symbols of the stocks within the user's portfolios, but would not define or relate to the current prices of the stocks (which would be furnished by another service supplied by the service provider 106).

FIG. 11 is a signal flow diagram which depicts processing of changes made to the parameters of a widget instance through the interface of the portable device 102 in which the widget is instantiated. Examples of parameter changes could include changing a location of interest in the case of a "weather" widget, or adding/removing stock ticker symbols in the case of a "stock market" widget. In the exemplary embodiment it is not necessary for the user to set or otherwise modify all parameters of a given widget, and the service provider 106 will effectively "expand" the parameter change data into a full parameter record once received. For instance, a zip code could be sufficient to uniquely identify a location in the case of a weather widget, and the associated city, state, etc. could be supplied to the applicable record during processing of the parameter change request by the service provider 106.

As shown, the widget instance change operation is initiated when the portable device 102 sends an HTTP POST and an XML request to a widget instance object within the system database 712 maintained by the service provider 106 (stage 1102). This type of "UPLOAD" operation informs the service 106 that the parameters of a specific widget instance have been updated by the applicable user. As shown, the updated parameters are received by the service provider (stage 1104), and are attempted to be written to a corresponding widget instance object within the system database 712 (stage 1108). If this attempted write operation is unsuccessful (stage 1112), the service provider 106 responds with an error message that is processed by the requesting portable device 102 (stage 1120). If the write operation is successful, the newly updated widget instance are retrieved from the system database 712 (stage 1116) and sent to the applicable portable device 102 (stage 1120).

Once received, the widget instance is processed by the portable device 102 (stage 1124). In general, the processing of the parameters contained in a widget instance are dependent upon the characteristics of the particular widget. In certain cases the parameters may be sufficient to enable the widget to display information, while other widgets may use the parameters to fetch content from another service. As an example of the former, consider a "clock" widget capable of displaying information following receipt of a parameter indicating a time zone. In contrast, a "stock widget" may have stock symbols as parameters and use such symbols to fetch quote information.

Referring now to FIG. 12, there is shown a signal flow diagram illustrating an exemplary widget instance download operation in which the service provider 106 is requested to push values of widget-specific parameters to a requesting portable device 102. The requesting of a parameter download is initiated when the portable device 102 sends an HTTP GET containing the GUID of the requested widget instance request to a parameter object within the system database 712 maintained by the service provider 106 (stage 1202). An example of such a request in the case of a "weather" widget is provided below:

http://server.chumby.com/xml/widgetinstances/ 5D81823A-E77D-11DA-B4BD-00306555C864

The service provider 106 receives the request (stage 1204), and retrieves the requested parameters from the system database 712 (stage 1208). If the requested parameters exist, the service provider 106 responds with an XML-based widget instance message (stage 1212). Using the example of a weather widget, which utilizes a zip code to identify the location for which weather is to be retrieved, such a message could comprise:

```
<?xml version="1.0" encoding="UTF-8"?>
<widget_instance id="5D81823A-E77D-11DA-B4BD-00306555C864">
    <widget href="/xml/widgets/BF4CE814-DFB8-11DA-9C82-
    00306555C864" id="BF4CE814-DFB8-11DA-9C82-00306555C864"/>
    <profile href="/xml/profiles/00000000-0000-0000-0000-000000000001"
    id="00000000-0000-0000-0000-000000000001"/>
    <access access="private"/>
    <widget_parameters>
        <widget_parameter id="BF4CE814-DFB8-11DA-9C82-
        00306643C864">
            <name>ZipCode</name>
            <value>92037</value>
        </widget_parameter>
    </widget_parameters>
</widget_instance>
```

The portable device 102 uses the GUID in the "widget" tag to fetch the information about the Widget to be displayed. Once the widget has been started, it is passed the name/value pairs in the "widget_parameters" section, in order to customize the behavior of the widget.

If the requested parameters do not exist, a default widget instance is attempted to be retrieved from the system database 712 (stage 1224). If such a widget instance exists (stage 1228), the service provider 106 responds with an XML-based parameters message that is processed by the portable device 102 upon receipt (stage 1220). If such a default widget instance does not exist, an error message is returned to the portable device 102 (stage 1232).

Downloading a Widget

Figure 27:
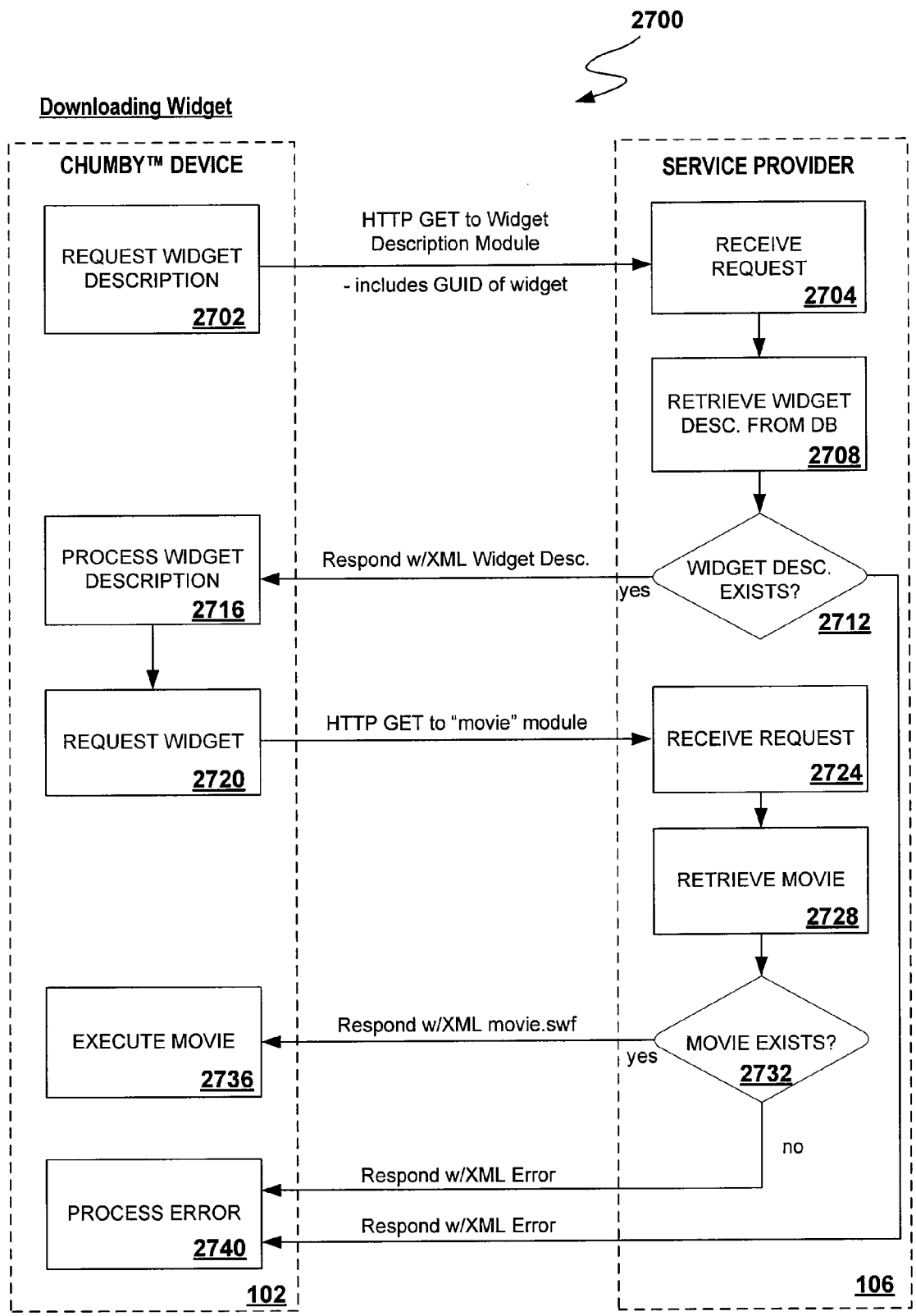
FIG. 27 is a signal flow diagram which illustratively represents the process of downloading the code for a widget from a service provider.

Referring now to FIG. 27, a signal flow diagram 2700 is provided which illustratively represents the process of downloading the code for a widget (e.g., a .swf file) from the service provider 106 for execution on a portable device 102. The process is initiated when the CHUMBY™ device 102 sends an HTTP GET request containing the GUID of the requested widget to a specific widget description object within the system database 712 maintained by the service provider 106 (stage 1302). An example of such a request is provided below:

http://server.chumby.com/xml/widgets/BF4CE814-DFB8-11DA-9C82-00306555C864

The service provider 106 receives the request (stage 2704), and attempts to retrieve the requested widget description from the system database 712 or other data source available to the service provider 106 (stage 2708). If the requested widget description is able to be retrieved, the service provider 106 responds with an XML-based widget description message; if not, the service provider 106 responds with an XML-based error message (stage 2712). An exemplary XML-based response generated by the service provider 106 is given below:

```
<?xml version="1.0" encoding="UTF-8"?>
<widget id="BF4CE814-DFB8-11DA-9C82-00306555C864">
    <name>Time Zones</name>
    <description>A time zone selector</description>
    <version>1.0</version>
    <protection protection="none"/>
```

-continued

```
    <access access="public"/>
    <user username="chumby" href="/xml/users/00000000-0000-
    0000-0000-000000000001" id="00000000-0000-0000-0000-
    000000000001"/>
    <category href="/xml/categories/00000000-0000-0000-0000-
    000000000001" name="Chumby" id="00000000-
    0000-0000-0000-000000000001"/>
    <thumbnail contenttype="image/jpeg" href="/xml/thumbnails/
    BF4CE814-DFB8-11DA-9C82-00306555C864"/>
    <template contenttype="text/xml" href="/xml/templates/
    BF4CE814-DFB8-11DA-9C82-00306555C864"/>
    <movie contenttype="application/x-shockwave-flash"
    href="/xml/movies/BF4CE814-DFB8-11DA-9C82-00306555C864"/>
</widget>
```

Once the requested widget description is received by the portable device 102, the portable device 102 uses the URL referencing the "movie" for the requested widget to download the movie (e.g., .swf) file from the service provider 106. The portable device 102 sends an HTTP GET request containing the GUID of the requested movie to a specific movie object within the system database 712 maintained by the service provider 106 (stage 1320). An example of such a request is provided below:

http://server.chumby.com/xml/movies/BF4CE814-DFB8-11DA-9C82-00306555C864

The service provider 106 receives the request (stage 2724), and attempts to retrieve the requested movie from the system database 712 or other data source available to the service provider 106 (stage 2728). If the requested movie is able to be retrieved, the service provider 106 responds with the .swf file which implements the movie; if not, the service provider 106 responds with an XML-based error message (stage 2732). Once the requested movie is received by the portable device 102, it is loaded by the Master Controller and queued for subsequent execution (stage 2736). If an error is instead received, it is processed accordingly (stage 2740).

Requesting Content

Figure 13:
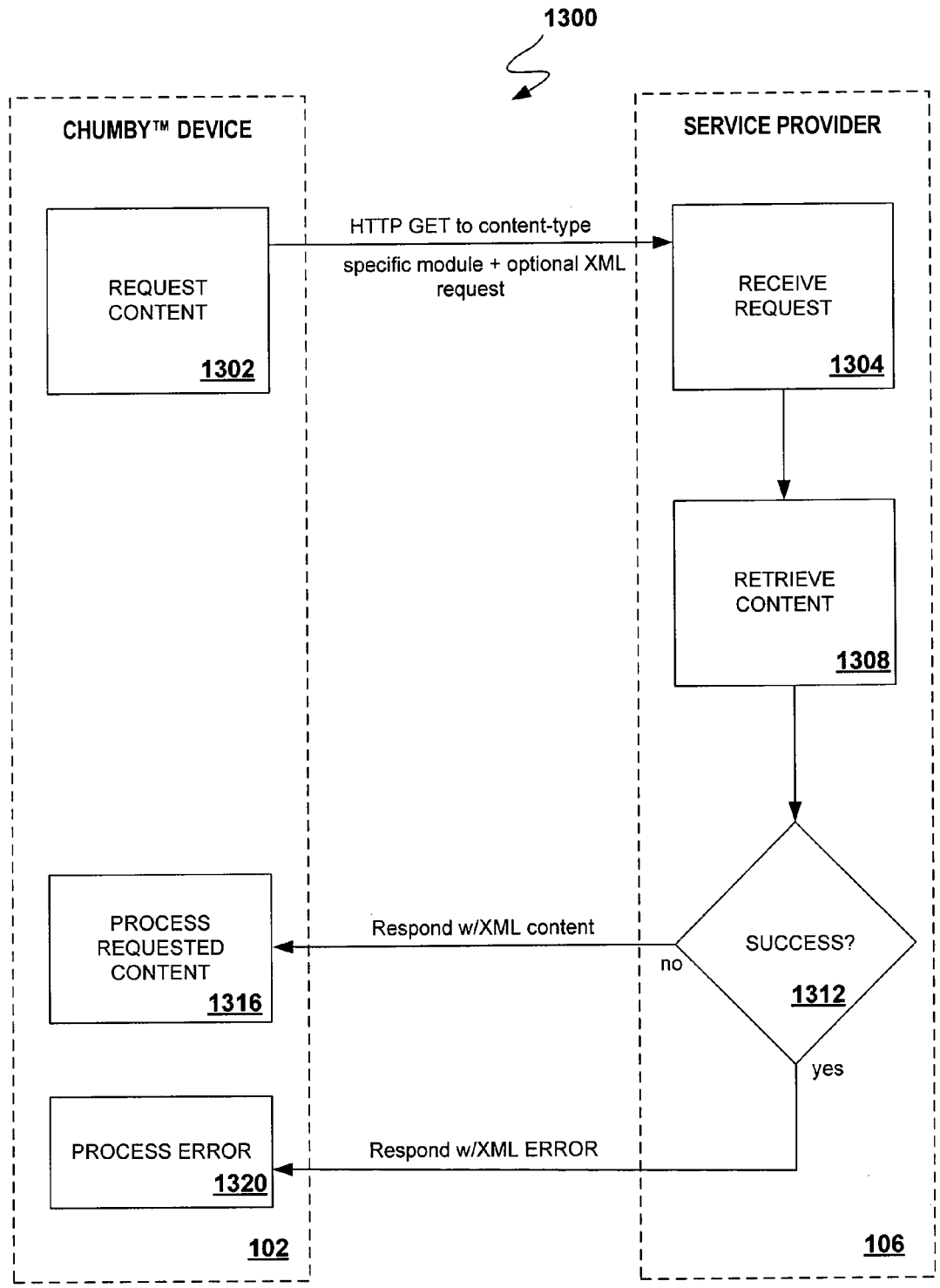
FIG. 13 is a signal flow diagram which illustratively represents the process of obtaining content from the service provider for a widget executed on a portable device.

Referring now to FIG. 13, a signal flow diagram 1300 is provided which illustratively represents the process of obtaining content from the service provider 106 for a widget of a portable device 102. The process is initiated when the portable device 102 sends an HTTP GET and an optional XML request to a specific content object within the system database 712 maintained by the service provider 106 (stage 1302). An example of such a request for content for a "tide" widget is provided below:

http://content.chumby.com/tides/United%20States/National%20City%2C%20San%20Diego%20Bay%2C%20California The service provider 106 receives the request (stage 1304), and attempts to retrieve the requested content from the system database 712, internal content service, external content service or other data source available to the service provider 106 (stage 1308). If the requested content is able to be retrieved, the service provider 106 responds with an XML-based content message; if not, the service provider 106 responds with an XML-based error message (stage 1312). Once the requested content is received by the portable device 102, corresponding audiovisual output is generated by the device 102 for the benefit of its user (stage 1316). If an error is instead received, it is processed accordingly (stage 1320). An exemplary XML-based response generated by the service provider 106 is given below:

```
<tideitems>
  <tideitem timestamp="2006-05-31T00:39:11Z">
    <location>
      <locationstring string="National City, San Diego Bay, California"/>
      <station id="National City, San Diego Bay"/>
      <state name="California"/>
      <country name="United States"/>
      <coordinates lat="32.6667Â°N", lon="117.1167Â°W"/>
    </location>
    <tides>
      <tide dateTime='2006-05-31T12:44:00Z', tidedescription="Low Tide", tidelevel="0.85 meters"/>
      <tide dateTime='2006-05-31T02:50:00Z', tidedescription="Sunset"/>
      <tide dateTime='2006-05-31T06:30 :00Z', tidedescription="Moonset"/>
      <tide dateTime='2006-05-31T06:56:00Z', tidedescription="High Tide", tidelevel="1.80 meters"/>
      <tide dateTime='2006-05-31T24:41:00Z', tidedescription="Sunrise"/>
      <tide dateTime='2006-05-31T14:46:00Z', tidedescription="Low Tide", tidelevel="-0.13 meters"/>
      <tide dateTime='2006-05-31T16:38:00Z', tidedescription="Moonrise"/>
      <tide dateTime='2006-05-31T21:55:00Z', tidedescription="High Tide", tidelevel="1.14 meters"/>
      <tide dateTime='2006-06-01T01:38:00Z', tidedescription="Low Tide", tidelevel="0.92 meters"/>
      <tide dateTime='2006-06-01T02:50:00Z', tidedescription="Sunset"/>
      <tide dateTime='2006-06-01T07:06:00Z', tidedescription="Moonset"/>
      <tide dateTime='2006-06-01T07:41:00Z', tidedescription="High Tide", tidelevel="1.64 meters"/>
      <tide dateTime='2006-06-01T24:41:00Z', tidedescription="Sunrise"/>
      <tide dateTime='2006-06-01T15:37:00Z', tidedescription="Low Tide", tidelevel="-0.01 meters"/>
      <tide dateTime='2006-06-01T17:38:00Z', tidedescription="Moonrise"/>
      <tide dateTime='2006-06-01T22:59:00Z', tidedescription="High Tide", tidelevel="1.18 meters"/>
      <tide dateTime='2006-06-02T02:51:00Z', tidedescription="Sunset"/>
      <tide dateTime='2006-06-02T02:58:00Z', tidedescription="Low Tide", tidelevel="0.96 meters"/>
      <tide dateTime='2006-06-02T07:37:00Z', tidedescription="Moonset"/>
      <tide dateTime='2006-06-02T08:35:00Z', tidedescription="High Tide", tidelevel="1.47 meters"/>
      <tide dateTime='2006-06-02T24:41:00Z', tidedescription="Sunrise"/>
      <tide dateTime='2006-06-02T16:28:00Z', tidedescription="Low Tide", tidelevel="0.09 meters"/>
      <tide dateTime='2006-06-02T18:35:00Z', tidedescription="Moonrise"/>
      <tide dateTime='2006-06-02T23:51:00Z', tidedescription="High Tide", tidelevel="1.26 meters"/>
      <tide dateTime='2006-06-03T02:51:00Z', tidedescription="Sunset"/>
      <tide dateTime='2006-06-03T04:44:00Z', tidedescription="Low Tide", tidelevel="0.93 meters"/>
      <tide dateTime='2006-06-03T08:04:00Z', tidedescription="Moonset"/>
      <tide dateTime='2006-06-03T09:46:00Z', tidedescription="High Tide", tidelevel="1.31 meters"/>
      <tide dateTime='2006-06-03T24:41:00Z', tidedescription="Sunrise "/>
      <tide dateTime='2006-06-03T17:17:00Z', tidedescription="Low Tide", tidelevel="0.19 meters"/>
      <tide dateTime='2006-06-03T19:31:00Z', tidedescription="Moonrise"/>
      <tide dateTime='2006-06-03T23:06:00Z', tidedescription="First Quarter"/>
      <tide dateTime='2006-06-04T12:30:00Z', tidedescription="High Tide", tidelevel="1.35 meters"/>
    </tides>
  </tideitem>
</tideitems>
```

In the case where content is retrieved directly from an external content service provider (i.e., from other than the service provider 106), a series of web-based transactions (most likely HTTP and/or XML-based) defined by such content service provider will take place between the portable device 102 and such provider.

Portable Device Security Protocol

Portable devices 102 may optionally include a hardware security module, which in one implementation is accessed via a character driver interface in the operating system ("OS") of the device 102. The module may or may not be installed. When the module is not installed, the OS preferably virtualizes the hardware security module by emulating it in software. While losing all the security benefits of a hardware module, this feature enables cost reduction savings while maintaining protocol interoperability with a secured system.

The hardware security module of a portable device 102 may be implemented in a number of ways. As an example, the hardware security module may be implemented using a cryptographic Smart Card module. This module, or its emulated counterpart, is capable of at a minimum, the following operations: (1) storage of secret numbers in hardware; (2) the ability to compute public-key signatures; (3) the ability to compute one-way cryptographic hashes; and (4) the ability to generate crytographically trusted random numbers.

During the manufacturing process the hardware security module, or its emulated counterpart, is initialized with a set of secret numbers that are only known to the module and to the portable service provider 106. These secret numbers may or may not consist of public and private keys. If the numbers consist of public and private keys, then a mutual key-pair is stored by both the portable device service provider 106 and the hardware module, along with a putative, insecure identifier number for the pair. Furthermore, these numbers are preferably not recorded by the portable device service provider 106 in association with any other identifying information, such as the MAC address for the WLAN interface, or any other serial numbers that are stored in insecure memory for customer service purposes.

When the user or service wishes to initiate a strong authenticated transaction, the portable device 102 sends the putative insecure key-pair identifier to the service provider 106. The service provider 106 looks up the putative insecure key-pair identifier and issues a challenge to the hardware module, consisting of a random number and time stamp encrypted by the public key whose private key is stored only inside the target hardware module. In particular, the challenge is packetized and sent through the Internet to the portable device 102. The device 102 unpacks the challenge and passes it directly to the hardware module. The hardware module decrypts the random number and time stamp, optionally hashing it, adds another time stamp and encrypts the entire message with the unique server public key associated with the putative insecure key-pair identifier. Again, this message is packetized and transmitted by the device 102 to the service provider 106 over the Internet. Upon receipt, the service provider 106 decrypts the message and verifies that the random number or its hash is valid, and that the timestamps are unique and increasing within a reasonable error bound. At the conclusion of this transaction, the service provider 106 has authenticated the device 102, and can fall back to any number of session keys that can be either dynamically generated or statically stored for further secured transactions. Advantageously, this authentication transaction does not involve uniquely associating the hardware module with user information. Rather, the service provider 106 is simply aware of the existence of the approved hardware module and upon completion of the authentication transaction may safely trust the integrity of the secrets stored therein.

A user of the device 102 may opt-out of privacy mode and provide identifying information, as required by some billing services such as credit cards and banks. Optionally, an anonymous cash-based transaction network can be established where accounts are opened and managed only by secrets contained within the hardware module.

To enable limited revocation of user-identifying information, the specific embodiment of the master authentication protocol should operate on a set of clean-room servers with a multiplicity of connections that are trusted by the portable device service provider 106, and authenticated session keys are then passed on laterally to the content servers. Thus, the anonymity of the master authentication key is nominally preserved, although it is possible to recreate and correlate transactions from forensic logs and transaction timings. The use of multiple servers and multiple connections, along with network routing randomization techniques, can be used to increase the anonymization resistance to forensic logging (cf. Tor network), but this configuration is in no way essential to the network's operation.

Portable Device Calibration, Registration and Account Management

Attention is now directed to FIGS. 14-21, which are a set of flowcharts representative of the calibration, registration and initial operation of a portable device and associated account management functions.

Initial Power-Up

Figure 14:
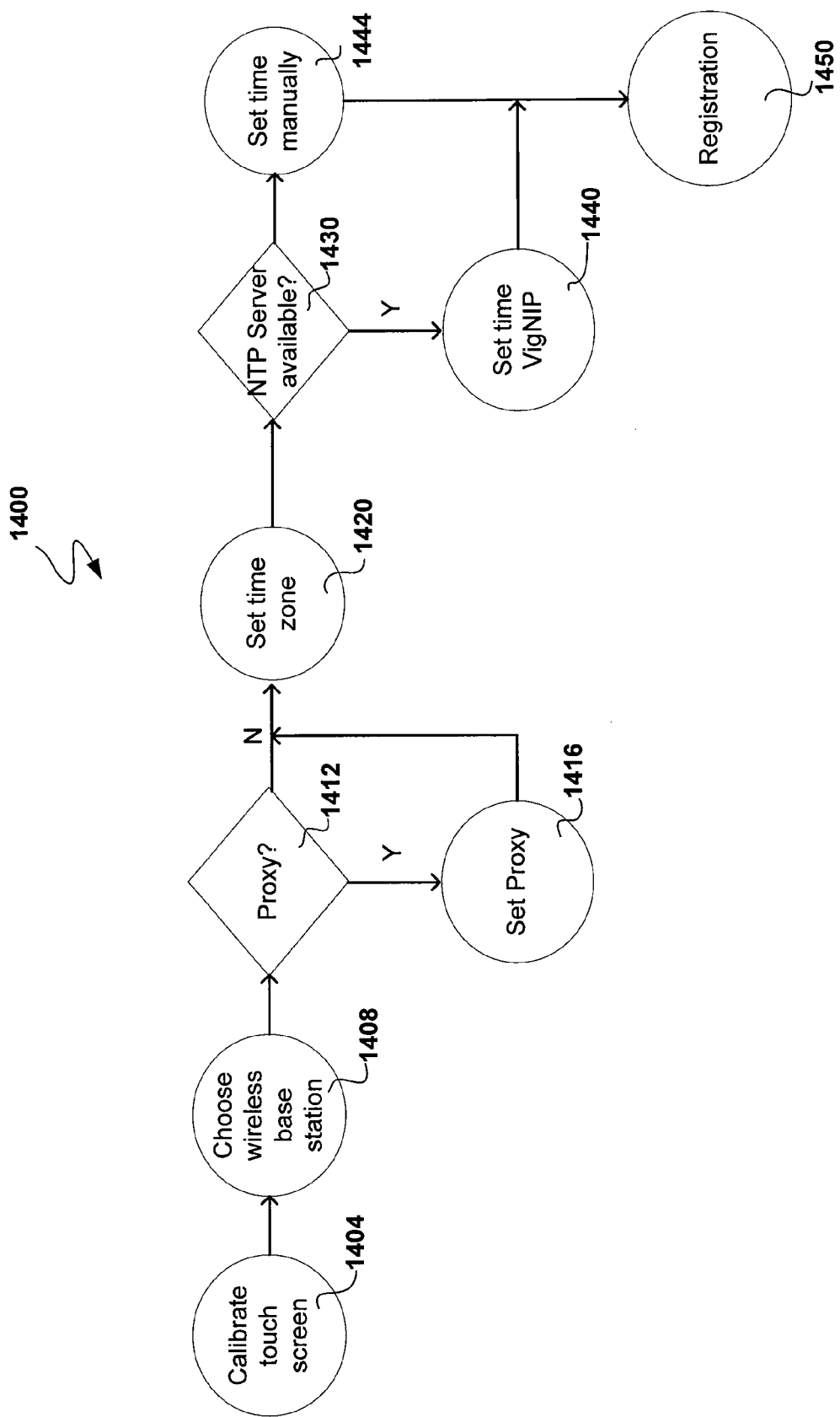
FIG. 14 is a flowchart which depicts an exemplary sequence of operations performed by a portable device upon initial power-up.

FIG. 14 is a flowchart 1400 which depicts an exemplary sequence of operations performed by a portable device 102 upon initial power-up. When a user initially connects a portable device 102 to a power source, the device 102 undergoes a touchscreen calibration process described below with reference to FIGS. 15-16 (stage 1404). The device 102 then selects a wireless base station in the manner described below with reference to FIG. 17 (stage 1408). If a proxy server is identified (stage 1412), then information relating to the proxy server is configured into the portable device 102 to enable it to with the Web site maintained by the service provider 106 (as well as with the Web sites of content providers) (stage 1416). At this point the user of the portable device 102 is prompted to set the time zone in which the device 102 is located (stage 1420). If an NTP server is determined to be available (stage 1430), then time is set automatically based upon information acquired from such a server (stage 1440). If not, the portable device 102 is referenced to a time set manually (stage 1444). After the time of the portable device 102 has been set, the registration process described below with reference to FIG. 18 is initiated (stage 1450).

In one embodiment a portable device downloads configuration information from the service provider 106 each time it is powered on or otherwise re-establishes communication with the service provider 106. However, a minimal amount of widget and configuration information may be locally stored on a portable device so that it may continue to function in the absence of network connectivity. For example, a clock widget may be permanently stored on a portable device so that its clock function could remain operational at all times. A portable device will typically include sufficient memory capacity to hold configuration information received from the service provider 106 for all of the widgets to be executed by the device, up to some reasonable number of widgets. If a user changes the configuration for a portable device through the Web site maintained by the service provider 106, a polling function implemented on the corresponding portable device will typically be used to "pull" the modified configuration information from the service provider 106. Alternatively, an operation may be manually initiated via the interface of the corresponding portable device in order to obtain this information (e.g., an "Update My CHUMBY™ Portable Device Now" operation).

Touchscreen Calibration

Figure 15:
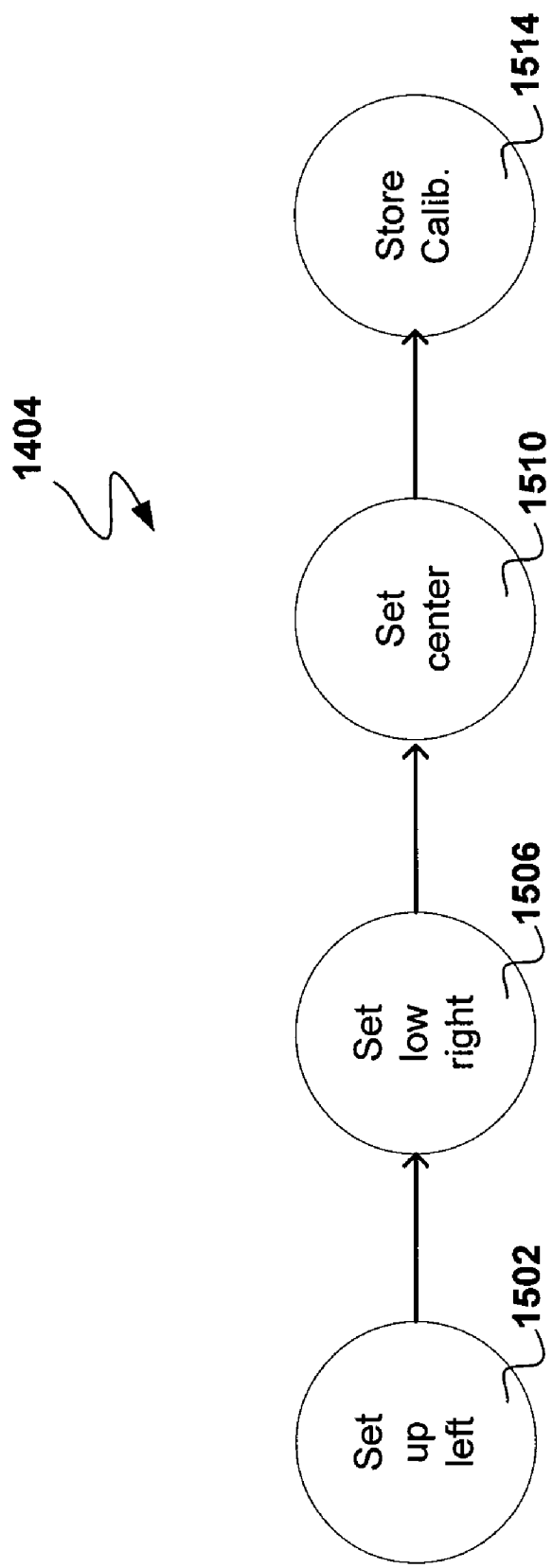
FIG. 15 is a flowchart illustrating an exemplary routine used to calibrate a touchscreen of a portable device.
Figure 16A:
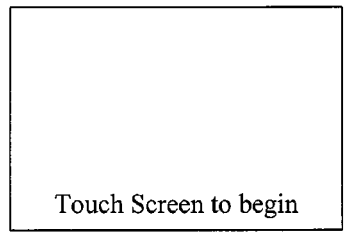
FIGS. 16A-16E provide a set of screen shots of the user interface of a portable device being calibrated pursuant to the routine of FIG. 15.
Figure 16B:
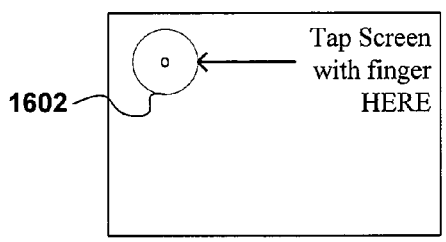
Figure 16E:
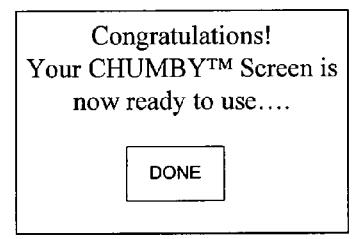
Figure 16C:
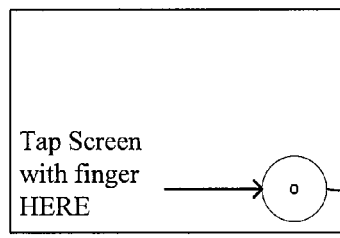
Figure 16D:
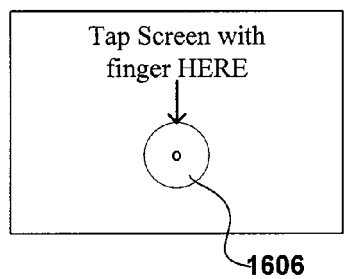

Turning now to FIG. 15, there is shown a flowchart which illustrates an exemplary routine used to calibrate the touchscreen of a portable device 102. FIGS. 16A-16E provide a set of screen shots of the user interface of the portable device 102 being calibrated pursuant to the routine of FIG. 15. As shown, the calibration routine involves determining an upper left set point (stage 1502) after the user has initiated the routine by touching the touchscreen of the device 102 (FIG. 16A). This set point is determined by generating a target 1602 (FIG. 16B) through the LCD screen 320 which the user is then prompted to tap. A lower right set point is then determined by prompting the user to tap a target 1604 depicted in FIG. 16C (stage 1506). Similarly, a center set point is next determined by prompting the user to tap a target 1606 depicted in FIG. 16D (stage 1510). The results of the calibration process are then stored (stage 1514). Based upon the coordinate data received from the touchscreen 330 during each of stages 1502, 1506 and 1510, the CPU 302 executes a program to generate calibration information used during subsequent operation of the device 102. A screen is then displayed to the user indicating that the calibration process has been completed (FIG. 16E).

Wireless Base Station Selection

Figure 17:
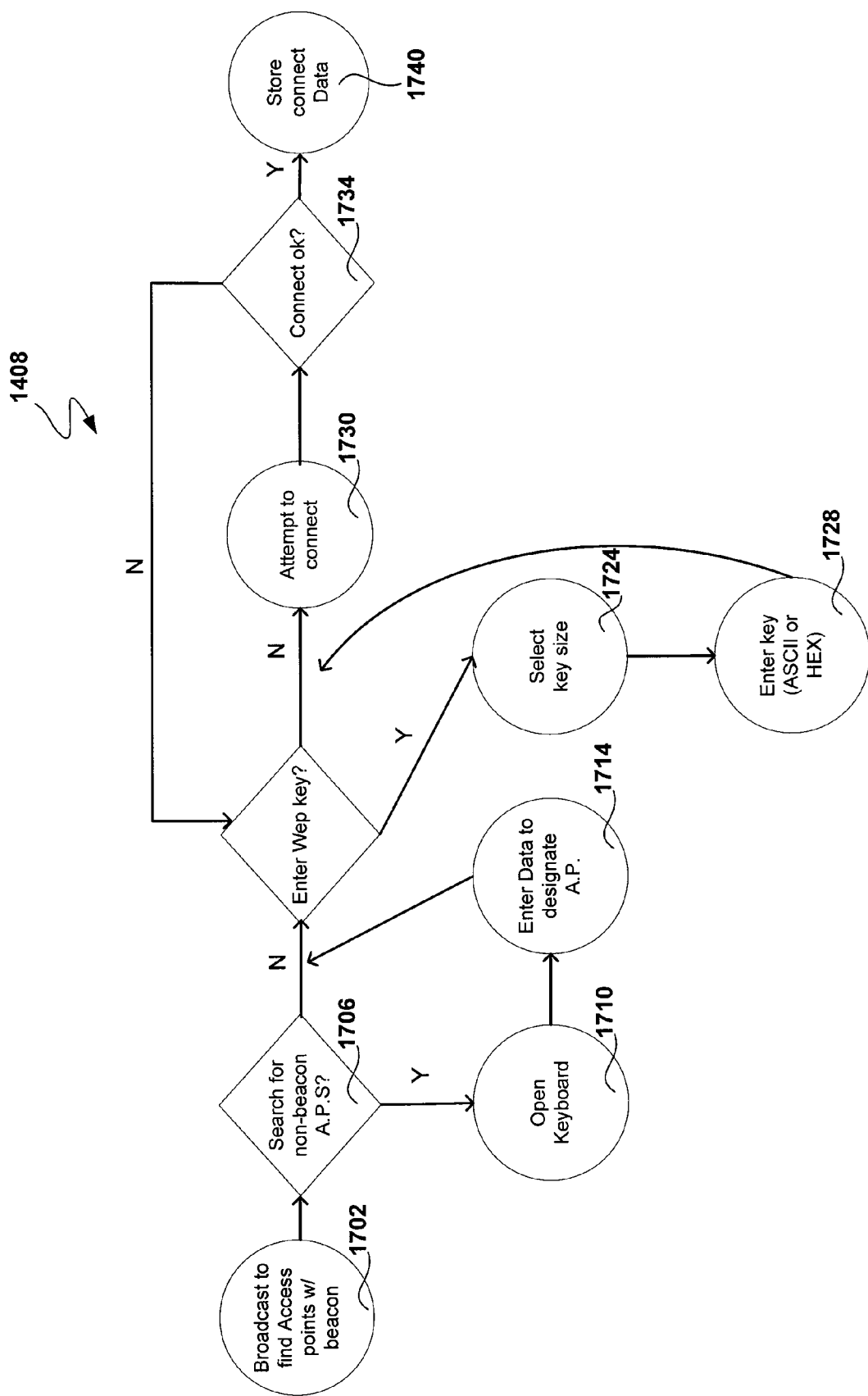
FIG. 17 is a flowchart illustrating the operations performed in selecting a wireless base station upon initial power-up of a portable device.
Figure 18:
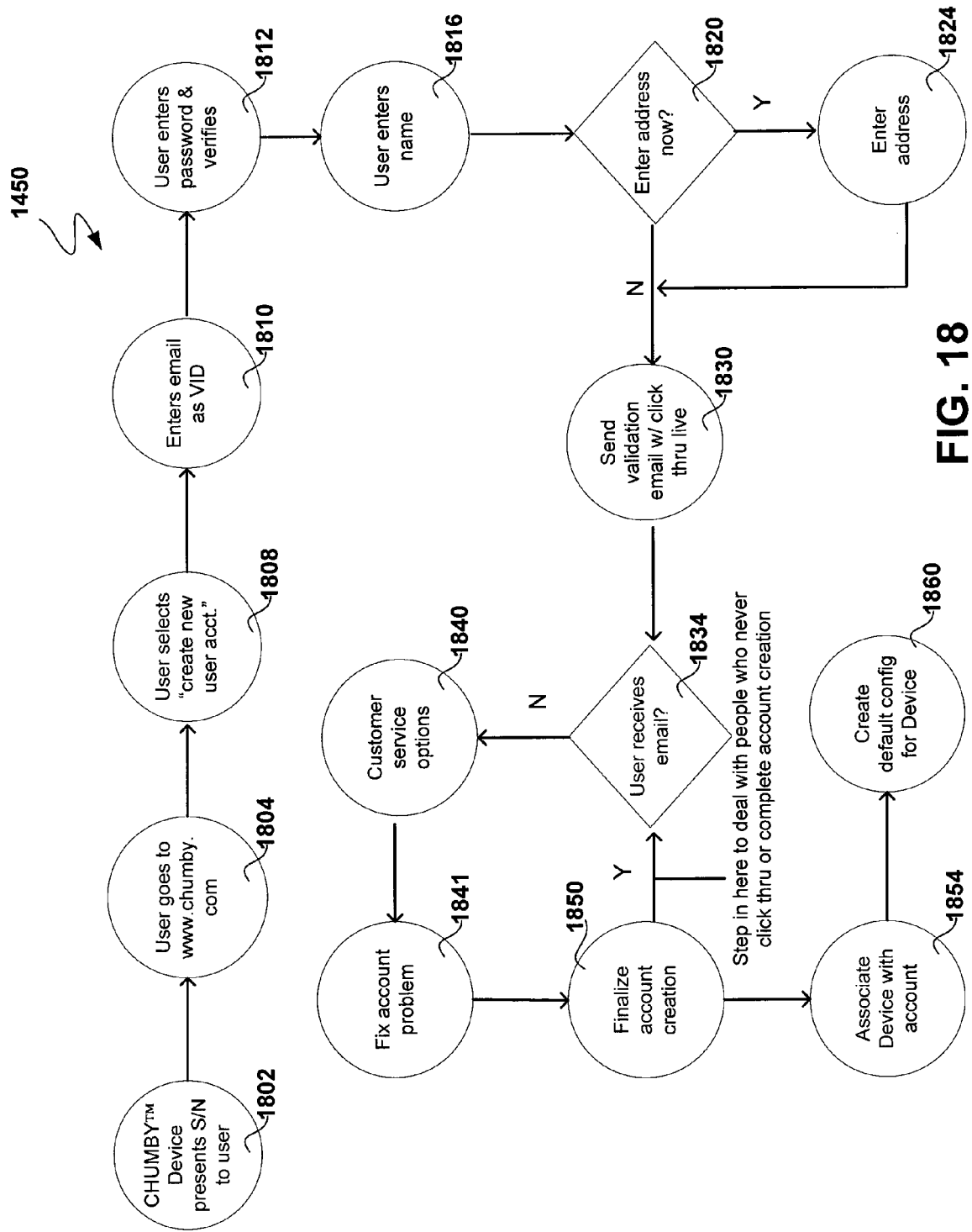
FIG. 18 is a flowchart of an exemplary account creation and registration process.

FIG. 17 is flowchart illustrating the operations performed in selecting a wireless base station upon initial power-up of the device 102. As shown, the Wi-Fi communications interface 314 of the device initially searches for one or more access points 210 emitting a beacon signal (stage 1702). If the device is configured to search for access points not emitting a beacon signal (stage 1706), then a keyboard is accessed (stage 1710) and data designating an access point is entered (stage 1714). The keyboard may comprise a physical keyboard connected to the device 102 as a peripheral component. Alternatively, an "onscreen" keyboard generated by the LCD screen 320 and interacted with via the touchscreen 330 may be utilized. At this point the user is given an opportunity to enter a WEP key (stage 1720). If this option is selected, a key size is selected (stage 1724) and is then entered via the keyboard (stage 1728). A connection is then attempted to be established with a detected or designated access point (stage 1730). If a connection is so established (stage 1734), then the information relating to the connection is stored within memory of the device 102 (stage 1740); otherwise, it is again attempted to establish the connection.

During or prior to stage 1720 the user may also be provided with the opportunity to enter a desired channel/frequency and to select a mode of encryption (e.g., WEP, WPA, WPA2). Although FIG. 17 describes the case in which WEP has been selected as the desired encryption methodology, those skilled in the art will recognize that similar operations may be performed following selection of an alternate encryption methodology.

Registration

Referring now to FIG. 18, a flowchart is provided of an exemplary account creation and registration process 1450. The process begins upon presentation by the device, via its LCD screen 320, of its serial number or other identifying information (stage 1802). The user then logs in, via a Web browser 122, to a web site operated by the service provider 106 (e.g., www.chumby.com) (stage 1804). In one embodiment the user may then select a "create new user account" tab or the like (stage 1808), and is prompted to enter an email address (stage 1810), password (stage 1812), and name (stage 1816). In certain implementations the user may also be offered the opportunity to enter his or her address (stage 1820), while in other implementations the user is not prompted to provide an address until this information is required for some particular purpose (e.g., to provide a billing information for a subscription or shipping information for a product purchase). If this option is selected, the user enters his or her address (stage 1824). At this point the service provider 106 sends an email to the address entered in stage 1810 which contains a "click through" account activation hyperlink (stage 1830). If the user does not receive this message (stage 1834), the user is provided with the opportunity to take advantage of various customer service options in order to remedy the account creation difficulties being experienced (stages 1840-1841). In any event, the account creation process is then finalized (stage 1850), and the portable device being registered is associated within the system database 712 with a particular user account in the manner described below (stage 1854). Once this has occurred a default configuration and a number of widget instances are established for the newly registered portable device (stage 1860).

Account Association

Figure 19:
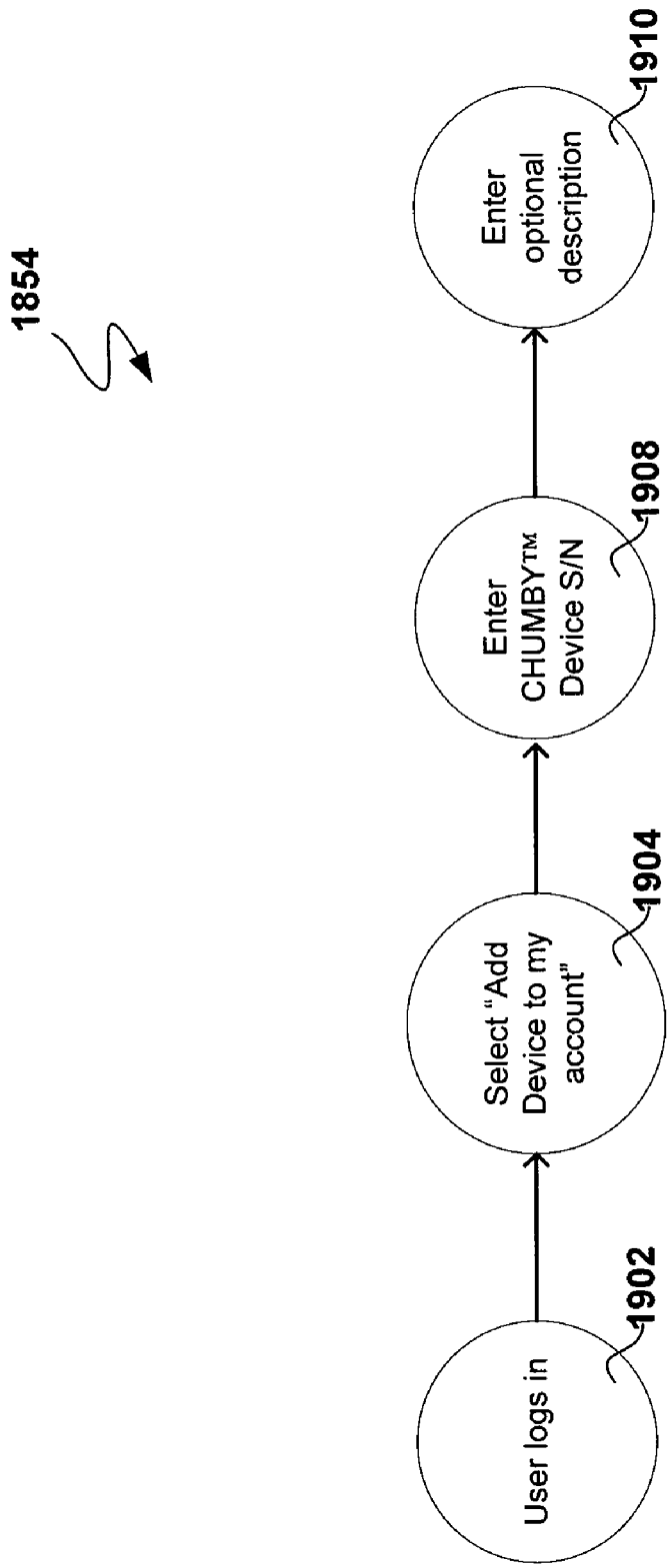
FIG. 19 is a flowchart representative of an exemplary Web-based interaction between a user and a service provider in connection with associating a particular portable device with the user's account.

FIG. 19 is a flowchart representative of exemplary Web-based interaction occurring between a user and the service provider 106 in connection with associating a particular portable device with the user's account. The process is initiated when the user logs in to a Web site operated by the service provider 106 (stage 1902) and selects an "Add portable device to my account" tab or the equivalent (stage 1904). The user then enters the serial number of the user's portable device into the Web page (stage 1908) and may also optionally enter a description (e.g., bedroom, study, family room, etc.) (stage 1910). An association is then created between the user's portable device and the applicable account within the system database 712.

In one embodiment user accounts are configured to be capable of hosting and moderating sub-accounts.

Disabling a Portable Device

Figure 20:
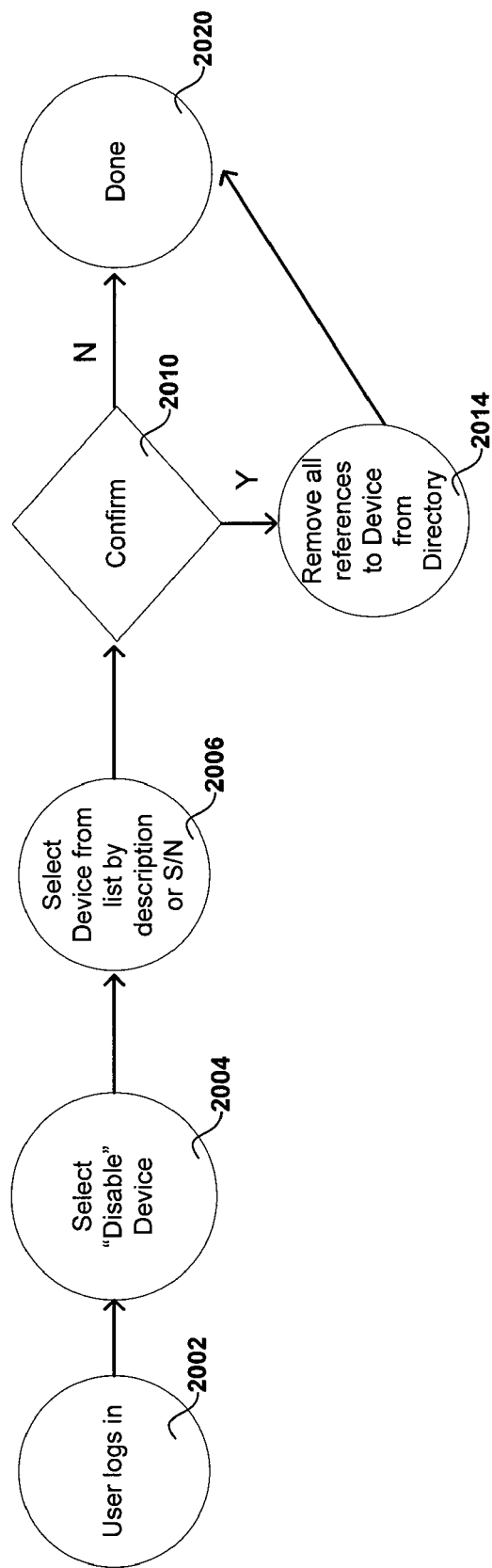
FIG. 20 is a flowchart of an exemplary Web-based interaction between a user and the service provider with regard to disabling a portable device that has been previously associated with the user's account.

Referring now to FIG. 20, a flowchart is provided of exemplary Web-based interaction occurring between a user and the service provider 106 with regard to disabling a portable device that has been previously associated with the user's account. As shown, the user logs in to the account via a Web browser 122 (stage 2002) and selects a "Disable portable device" tab or the equivalent (stage 2004). The user then selects the portable device to be disabled from a list based upon either the device's serial number or description (stage 2006). Next the user is prompted to confirm the selection (stage 2010), and if so all references to the disabled portable device are removed from the directory maintained within the system database 712 (stage 2014). The process is then completed whether or not the selection is confirmed (stage 2020), at which point the service provider 106 no longer responds to requests from the portable device which has been disabled.

Mirroring a Portable Device

Figure 21:
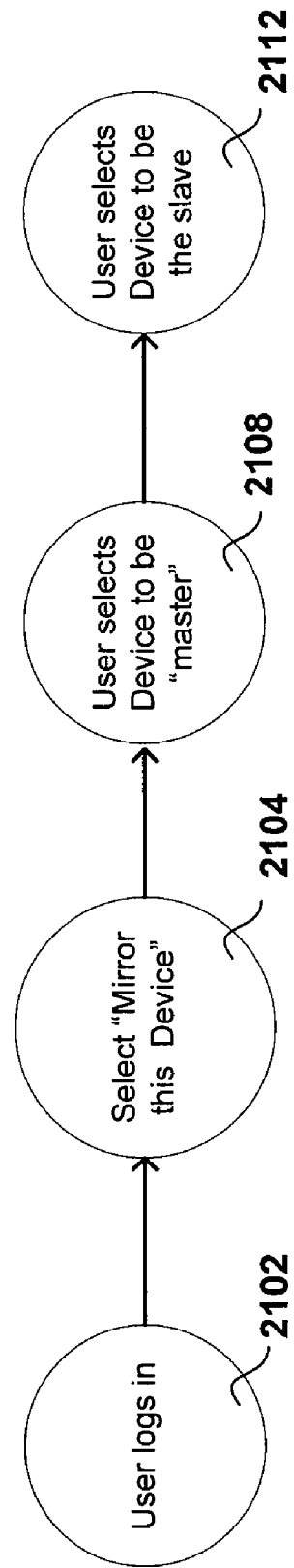
FIG. 21 is a flowchart of an exemplary Web-based interaction between a user and the service provider in connection with "mirroring" portable devices.

FIG. 21 is a flowchart which represents exemplary Web-based interaction occurring between a user and the service provider 106 in connection with "mirroring" portable devices; that is, enabling one portable device to utilize the widget set and configuration of another portable device. In one embodiment once a given portable device (i.e., the "slave device") has been mirrored to another portable device (i.e., the "master device"), widget-related changes made to the master device are automatically reflected in the slave device. As shown in FIG. 21, the user logs in to the applicable account via a Web browser 122 (stage 2102) and selects a "Mirror this portable device" tab or the equivalent (stage 2104). The user then selects the portable device to be the "master" (stage 2108) and further selects the portable device to the "slave" (stage 2112). In certain embodiments the master portable device need not correspond to a physical device, but could instead constitute a "virtual" portable device defined within the system database 712. In this case changes made to the widget set or configuration of the virtual portable device would be mirrored by all of its slave portable devices. In certain embodiments the slave portable device need not correspond to a physical device, but could instead constitute a "virtual" portable device defined within the system database 712.

Web-Based Widget Selection, Removal and Configuration

Attention is now directed to FIGS. 22-25, which are a set of flowcharts representative of Web-based widget selection, removal and configuration processes contemplated by embodiments of the present invention. Screen shots of exemplary user interfaces presented by the Web browser 122 used to facilitate certain of these processes are illustrated in FIG. 26.

Overview of Widget Management Process

Figure 22:
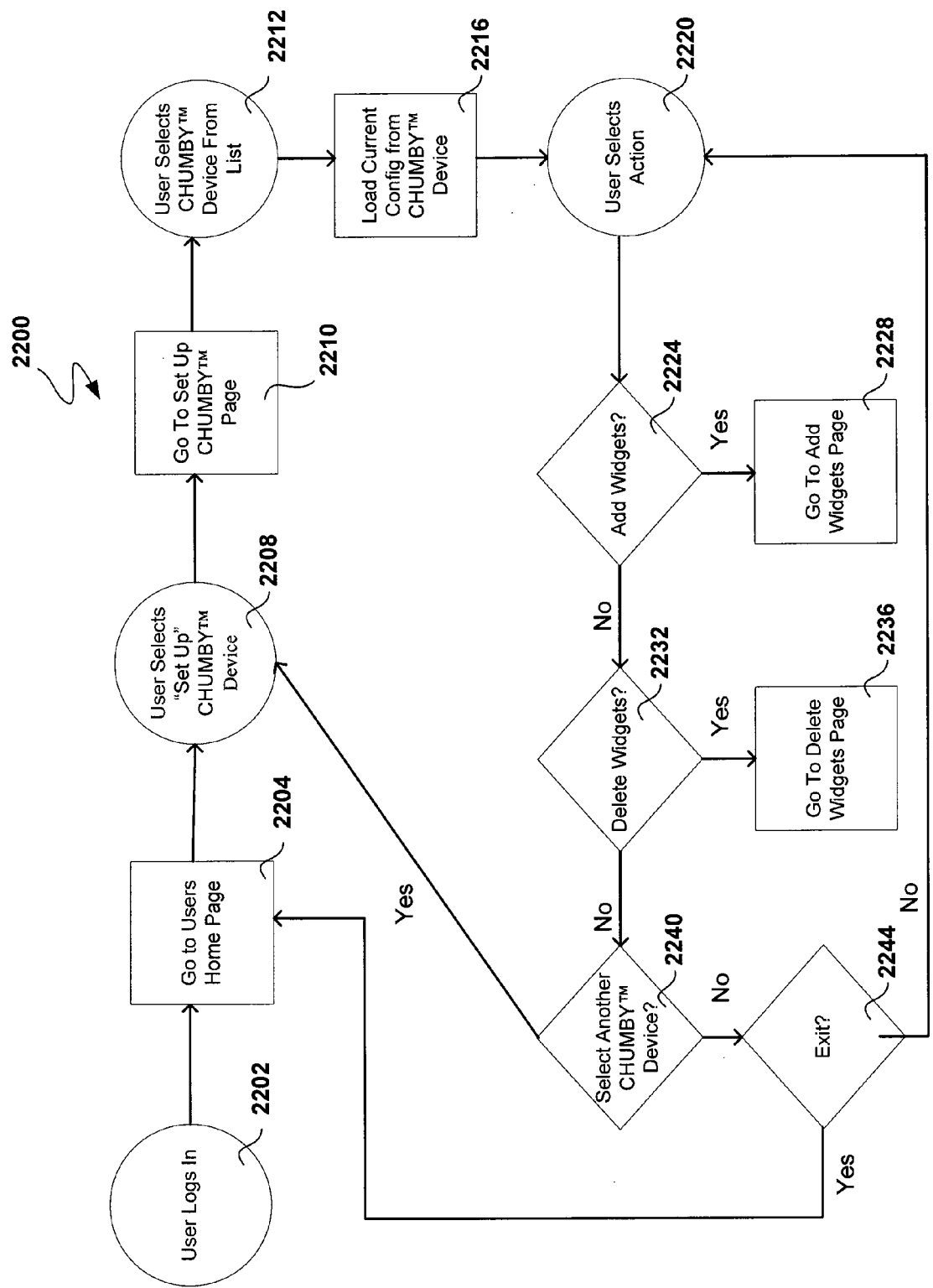
FIG. 22 is a top-level flowchart of exemplary Web-based or portable device-based interaction between a device user and the service provider with regard to adding, removing and configuring widget profiles relative to the user's portable device.

Turning now to FIG. 22, a top-level flowchart 2200 is provided of exemplary Web-based interaction occurring between a device user and the service provider 106 with regard to adding, removing and configuring widget profiles relative to the user's portable device. Although a user may have the impression that a portable device itself is being configured through the process of FIG. 22, in the exemplary embodiment a profile currently assigned to the user's portable device is instead configured.

As shown in FIG. 22, the user logs in to the user's account maintained with the service provider 106 via a Web browser 122 (stage 2202) and proceeds to the user's "home page" or the equivalent (stage 2204). From this home page the user selects a "Set Up" device tab or the like (stage 2208) and the Web browser 122 presents a corresponding "Set Up" page (stage 2210). The user then selects the portable device profile to be configured from a list based upon either the device's serial number or description (stage 2212). The current configuration for the selected device profile is then retrieved from the system database 712 and loaded into the device (stage 2216). Once this has occurred the user selects an action to be performed, as is illustrated by FIG. 26A (stage 2220). Such actions may include, for example, adding, deleting or editing widget profiles. If the user opts to add widget profiles (stage 2224), then the Web browser 122 displays an "Add Widgets Page" through which widget profiles may be added to the current configuration of the applicable portable device in the manner described below with reference to FIG. 23 (stage 2228). If the user instead chooses to delete widget profiles from such current configuration (stage 2232), then a "Delete Widgets Page" is presented through which the deletion operation may be completed consistent with the approach described below with reference to FIG. 24 (stage 2236). Alternatively, the user may select another portable device profile to configure (stage 2240), or simply exit and return to the user's home page (stage 2244).

Adding Widgets

Figure 23:
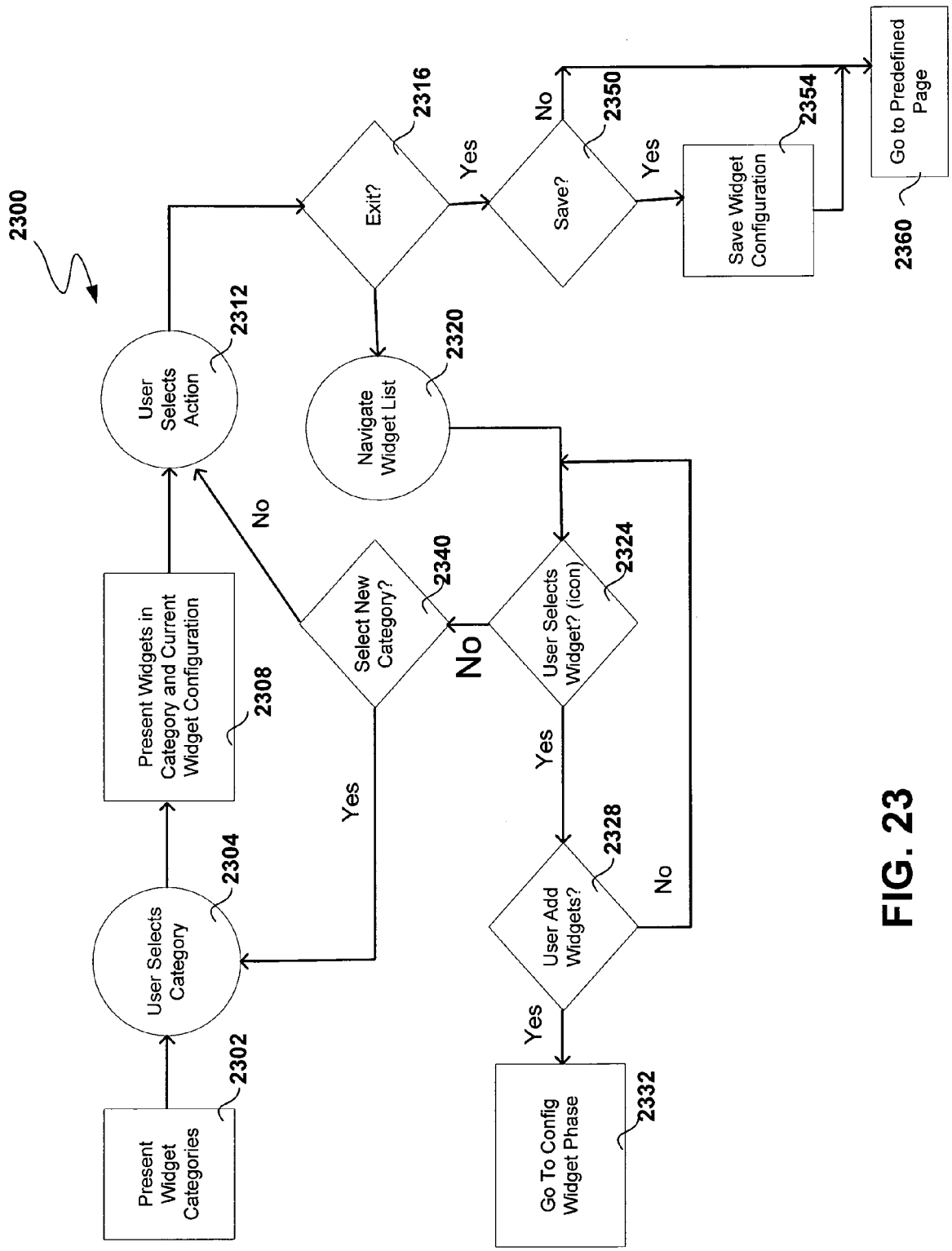
FIG. 23 is a flowchart representative of exemplary Web-based or portable device-based interaction between a device user and the service provider with respect to the addition of widgets to the current configuration of the user's portable device.

FIG. 23 is a flowchart 2300 representative of exemplary Web-based interaction occurring between a device user and the service provider 106 with respect to the addition of widgets to the current configuration of the user's portable device. In one embodiment the user is provided with the opportunity to choose, through an appropriate category selection page (see, e.g., FIG. 26B) presented by a Web browser 122, among various widget categories retrieved from the categories table of the system database 712 (stage 2302). After selecting a widget category (stage 2304), both the widgets included within the selected category and the current widget configuration of the applicable through which widgets may be added to the current configuration of the applicable portable device are presented to the user (stage 2308). The user then selects an action to perform (stage 2312) including, for example, exiting the widget addition process (stage 2316) or navigating the list of widgets presented for the selected category (stage 2320). If the latter action is selected (see, e.g., FIGS. 26C-26D), the user then selects a widget to be added to the current configuration (e.g., by selecting a corresponding icon) and the service provider 106 constructs an instance of the selected widget (stage 2324). At this point the user may also opt to add yet more widgets to the current configuration (stage 2328). Once the user has indicated that no additional widgets are to be added, a widget configuration phase (stage 2332) may be entered (see, e.g., FIG. 26E). If the user declines to select a widget while navigating the list of widgets presented for a selected category during stage 2320, a new category of widgets may be selected (stage 2340).

If the user decides to exit the process of adding widgets to the current configuration, the user may perform one of several actions, including, but not limited to: select another portable device to configure; navigate to another page on the portable site; log out from the portable site; or close the applicable browser window (stage 2316). If the user instead chooses to save the current widget configuration for the applicable portable device (stage 2350), the user selects a "Submit", "Commit", "Ok" or similar button to cause any changes made to be recorded in the system database 712 (stage 2354). After either saving the current widget configuration or electing to exit the process, the user may be directed to a predefined page (stage 2360).

Widget Removal

Figure 24:
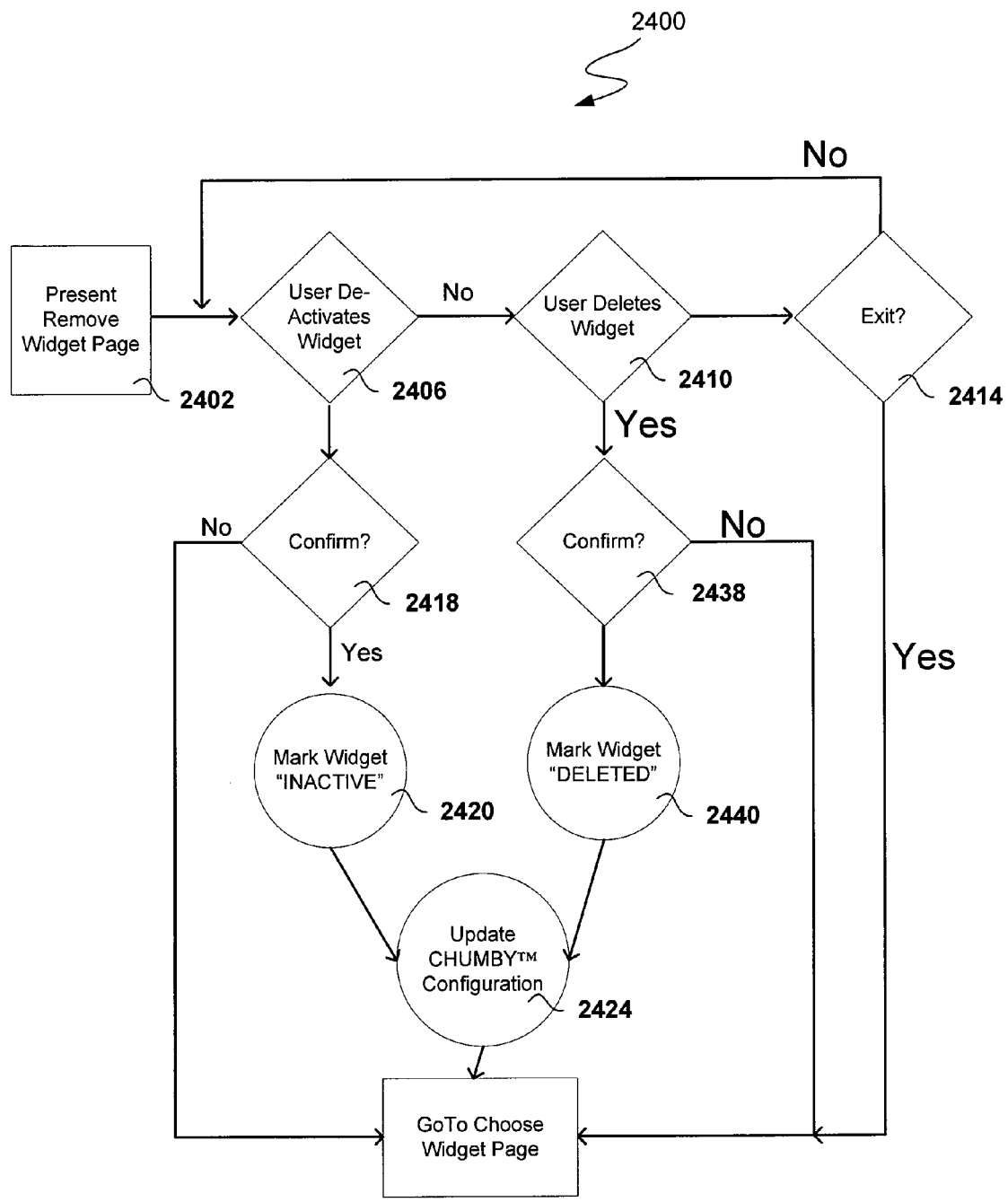
FIG. 24 is a flowchart representative of exemplary Web-based or portable device-based interaction between a device user and a service provider in connection with the removal of widgets from a channel, which may also be active on the user's portable device.

Referring now to FIG. 24, a flowchart 2400 is provided which is representative of exemplary Web-based interaction occurring between a device user and the service provider 106 in connection with the removal of widgets from the current configuration of the user's portable device. Upon being presented with a "Remove Widget Page" (stage 2402), the user may elect to either de-activate a selected widget (stage 2406), delete a selected widget (stage 2410), or exit the process (stage 2414). If widget de-activation is chosen, the user is prompted to confirm the choice (stage 2418). Once such confirmation has been provided the widget is marked as "inactive" on the page currently being rendered by the Web browser 122 (stage 2420). In addition, the widget configuration for the portable device of interest is updated within the system database 712 (stage 2424). Similarly, if it is instead chosen to delete the selected widget, the user is prompted to confirm the choice (stage 2438). Once such confirmation has been provided the widget is marked as "deleted" on the page currently being rendered by the Web browser 122 (stage 2440), and the widget configuration for the portable device of interest is updated (stage 2424). If confirmation to de-activate or delete the selected widget is not provided (stages 2418 and 2438), the Web browser 122 goes to a "Choose Widget Page" through which a different widget may be selected for removal or de-activation.

Widget Configuration

Figure 25:
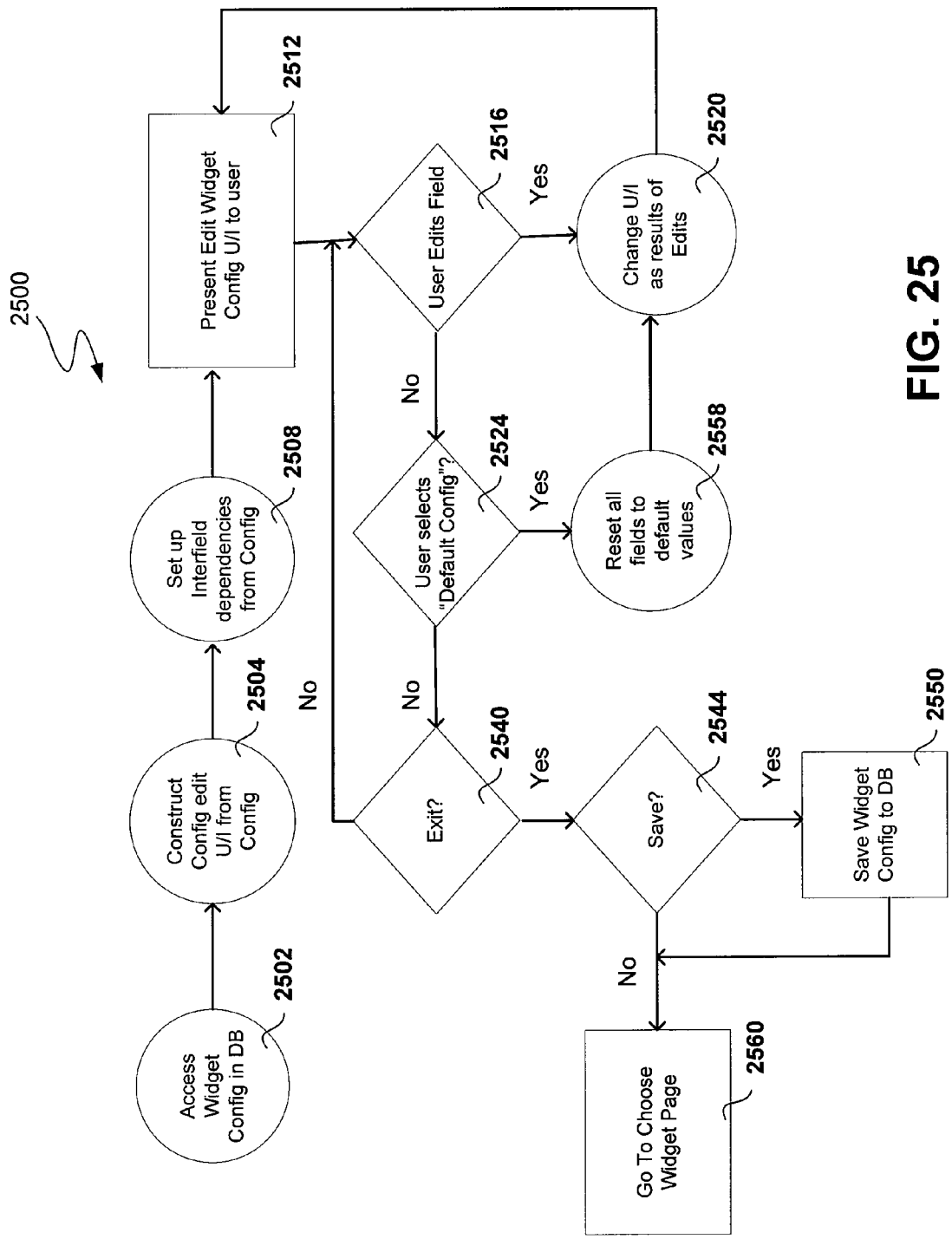
FIG. 25 is a flowchart depicting an exemplary set of operations involved in configuring parameters specific to of one or more widgets currently associated with a given portable device.

FIG. 25 is a flowchart 2500 depicting an exemplary set of operations involved in configuring parameters specific to of one or more widgets currently associated with a given portable device. The process is initiated by accessing the configuration of a selected widget maintained within the system database (stage 2502). An appropriate user interface through which the existing configuration of the selected widget may be edited is then generated based upon such existing configuration (stage 2504). This may involve, for example, establishing various inter-field dependencies based upon the existing configuration (stage 2508). Once the user interface has been generated it is presented to the user via a Web browser 122 in order to enable desired changes to the configuration to be made (stage 2512). If a user elects to edit one or more fields presented by the interface (2516), the user interface defining the widget configuration is correspondingly changed (stage 2520). If a user elects to not edit any of these fields, the user is given the option of selecting a "default configuration" (stage 2524). To the extent this option is selected, all fields are reset to default values (stage 2528); otherwise, the user is given the option to exit the process or return to stage 2516 (stage 2540). When the process is exited, the user is given the option of saving the edited version of the configuration in the system database 712 (stage 2544). If this option is selected, the current widget configuration is saved to the database 712 (stage 2550). A "Choose Widget Page" is then presented to the user, irrespective of whether or not the user elected to save the widget configuration (stage 2560).

In an exemplary embodiment the service provider 106 populates a corresponding widget and parameters tables within the system database in accordance with the user's parameter selections. In this regard the widget table may include an XML-based "param_desc_xml" field containing instructions enabling the construction of associated records in parameters table. For example, for a "clock" widget the XML-based instructions could indicate that a time zone should be a valid parameter, and could also be utilized to create appropriate records in the parameters table.

It is noted that in various embodiments the present invention may relate to processes such as are described or illustrated herein. These processes are typically implemented in one or more modules comprising systems as described herein, and such modules typically including computer software stored on a computer readable medium including instructions configured to be executed by one or more processors. It is noted that, while the processes described and illustrated herein may include particular stages, it is apparent that other processes including fewer, more, or different stages than those described and shown are also within the spirit and scope of the present invention. Accordingly, the processes shown herein are provided for purposes of illustration, not limitation.

It is further noted that some embodiments of the present invention may include computer software and/or computer hardware/software combinations configured to implement one or more processes or functions associated with the present invention. These embodiments may be in the form of modules implementing functionality such as has been described previously in software, hardware, and/or hardware software combinations. Modules may comprise instructions stored on a computer readable medium and configured to be executed on one or more processors on one or more systems.

Embodiments may also take the form of a computer storage product with a computer-readable medium having computer code thereon for performing various computer-implemented operations, such as operations related to functionality as described herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices.

Examples of software or computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using assembly language, Java, C, C#, C++, or other programming languages and software development tools as are known in the art. Other embodiments of the invention may be implemented in whole or in part with hardwired circuitry in place of, or in combination with, machine-executable software instructions.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A motion module for incorporation in a portable device, comprising:
   a processor module, including a processor and a processor readable memory disposed to store data and instructions for execution by said processor;
   a motion sensing module in electrical communication with the processor module, said motion sensing module including:
   an accelerometer disposed to provide an analog acceleration signal associated with one or more axes of motion of said portable electronic device;
   an analog to digital (A/D) converter disposed to receive said analog acceleration signal and generate a plurality of digital acceleration values; and
   a signal processing module disposed to:
   generate, from said plurality of digital acceleration values, a plurality of relative velocity values and a plurality of relative position values, and store, in said memory, said plurality of relative velocity values and said plurality of relative position values,
   wherein the signal processing module further comprises a matched filter configured to correlate at least one of said acceleration values, velocity values and position values with prestored target values thereof, whereby to detect a preconfigured motion or location of the portable device, the matched filter being capable of operating in a plurality of operating modes, at least one said operating mode comprising a training mode in which the matched filter is configured to store acceleration values generated by the A/D convertor and/or velocity or position values generated therefrom as target values.

2. The module of claim 1 wherein said analog acceleration signal includes signal components associated with each of three orthogonal axes (X, Y, and Z) of motion.

3. The module of claim 1 wherein said motion sensing module further comprises a prefiltering module in electrical communication with said accelerometer and said analog to digital converter, said prefilter module disposed to provide a lowpass filtered analog acceleration signal to the input of said analog to digital converter.

4. The module of claim 1 wherein said signal processing module includes a first integrator module disposed to generate, based at least in part on said plurality of digital acceleration values, said plurality of relative velocity values, and a second integrator module disposed to generate, based at least in part on said plurality of relative velocity values, said plurality of relative position values.

5. The module of claim 4 wherein said signal processing module includes a heuristic trend analysis module disposed to receive said plurality of digital acceleration values and provide, to said first and second integrator modules, a noise offset suppression signal.

6. The module of claim 4 wherein said signal processing module further includes a Kalman filter module disposed to:
receive, at a Kalman filter input, said plurality of digital acceleration values, said plurality of relative velocity values, and said plurality of relative position values;
apply a Kalman filtering process to said plurality of relative acceleration values, said plurality of relative velocity values, and said plurality of relative position values, to provide a plurality of interpolated position values; and
store said plurality of interpolated position values in said memory.

7. The module of claim 6 wherein said signal processing module further includes a vector quantization module disposed to:
receive position calibration data including a set of predefined positions;
receive said plurality of interpolated position values;
generate, based at least in part on said position calibration data and said interpolated position values, a first implied position value, said first implied position value based on one of said predefined positions; and
store said first implied position value in said memory.

8. The module of claim 6 wherein said signal processing module further includes a gesture recognition module disposed to:
receive a set of gesture data, said gesture data including data sets associated with a plurality of predefined gestures;
receive said plurality of interpolated position values;
compare said gesture data and said plurality of interpolated position values;
generate, responsive to said comparing, gesture match data, said gesture match data including match information associated with one or more of said plurality of predefined gestures; and
store said gesture match data in said memory.

9. The module of claim 8, wherein said gesture recognition module is disposed to generate said gesture match data at least in part based on a trellis algorithm.

10. A portable electronic device comprising:
a frame structure;
a core electronics unit including a processor and memory disposed to store data and instructions for one or more computer programs configured to be executed by the processor;
a motion sensing module in electrical communication with the core electronics unit, said motion sensing module including:
an accelerometer disposed to provide an analog acceleration signal associated with one or more axes of motion of said portable electronic device;
an analog to digital (A/D) converter disposed to receive said analog acceleration signal and generate a plurality of digital acceleration values;
a communications module configured to provide one or more network connections;

a signal processing module including machine readable instructions, stored in said memory and configured to be implemented, at least in part, on said processor, to generate, from said plurality of digital acceleration values, a plurality of relative velocity and relative position values, and store, in said memory, said plurality of digital acceleration values, said plurality of relative velocity values, and said plurality of relative position values; and
a housing attached to the frame structure, the housing at least partially defining a compartment containing the core electronics unit and the motion sensing unit,
wherein the signal processing module further comprises a matched filter configured to correlate at least one of said acceleration values, velocity values and position values with prestored target values thereof, whereby to detect a preconfigured motion or location of the portable device, the matched filter being capable of operating in a plurality of operating modes, at least one said operating mode comprising a training mode in which the matched filter is configured to store acceleration values generated by the A/D convertor and/or velocity or position values generated therefrom as target values.

11. The device of claim 10 wherein said analog acceleration signal includes signal components associated with each of three orthogonal axes (X, Y, and Z) of motion.

12. The device of claim 10 wherein said motion sensing module further comprises a prefiltering module in electrical communication with said accelerometer and said analog to digital converter, said prefilter module disposed to provide a lowpass filtered analog acceleration signal to the input of said analog to digital converter.

13. The device of claim 10 wherein said signal processing module includes a first integrator module disposed to generate, based at least in part on said plurality of digital acceleration values, said plurality of relative velocity values, and a second integrator module disposed to generate, based at least in part on said plurality of relative velocity values, said plurality of relative position values.

14. The device of claim 13 wherein said signal processing module includes a heuristic trend analysis module disposed to receive said plurality of digital acceleration values and provide, to said first and second integrator modules, an offset suppression signal.

15. The device of claim 13 wherein said signal processing module further includes a Kalman filter module disposed to:
receive said plurality of digital acceleration values, said plurality of relative velocity values, and said plurality of relative position values;
apply a Kalman filtering process to said plurality of relative acceleration values, said plurality of relative velocity values, and said plurality of relative position values, to provide a plurality of interpolated position values; and
store said plurality of interpolated position values in said memory.

16. The device of claim 15 wherein said signal processing module further includes a vector quantization module disposed to:
receive position calibration data including a set of predefined positions;
receive said plurality of interpolated position values;
generate, based at least in part on said position calibration data and said interpolated position values, a first implied position value, said first implied position value based on one of said predefined positions; and
store said first implied position value in said memory.

17. The device of claim 15 wherein said signal processing module further includes a gesture recognition module disposed to:
receive a set of gesture data, said gesture data including data sets associated with a plurality of predefined gestures;
receive said plurality of interpolated position values;
compare said gesture data and said plurality of interpolated position values;
generate, responsive to said comparing, gesture match data, said gesture match data including match information associated with one or more of said plurality of predefined gestures;
and store said gesture match data in said memory.

18. The device of claim 17, wherein said gesture recognition module is disposed to determine generate said gesture match data at least in part based on a trellis algorithm.

19. A method of operating a portable device comprising the steps of:
generating, at an accelerometer, an analog acceleration signal associated with one or more axes of motion of said portable device;
providing, to an A/D converter, said analog acceleration signal;
providing, from said A/D converter, a plurality of digital acceleration values based on said analog acceleration signal;
generating, based at least in part on said plurality of digital acceleration values, a plurality of relative velocity values and a plurality of relative position values; and
storing, in a processor readable memory, said plurality of digital acceleration values, said plurality of relative velocity values, and said plurality of relative position values,
the method further comprising:
using a matched filter to correlate at least one of said acceleration values, velocity values and position values with prestored target values thereof, whereby to detect a preconfigured motion or location of the portable device;
configuring the matched filter in one of a plurality of operating modes, at least one said operating mode comprising a training mode in which the matched filter stores acceleration values generated by the A/D convertor and/or velocity or position values generated therefrom as target values.

20. The method of claim 19 wherein said analog acceleration signal includes signal components associated with three orthogonal axes (X, Y, and Z) of motion, and said plurality of digital acceleration values includes a plurality of digital acceleration values associated with each of said X, Y, and Z axes of motion.

21. The method of claim 19 further including the step of lowpass filtering said analog acceleration signal to provide a lowpass filtered analog acceleration signal, and providing said lowpass filtered analog acceleration signal to said A/D converter.

22. The method of claim 19 wherein said plurality of digital acceleration values are integrated in a first integrator module to provide said plurality of relative velocity values, and said plurality of relative velocity values are integrated in a second integrator module to provide said plurality of relative position values.

23. The method of claim 22 further including the steps of receiving, at a heuristic trend analysis module, said plurality of digital acceleration values, and providing, from said heuristic trend analysis module, an offset suppression signal.

24. The method of claim 22 further including the steps of:
receiving, at a Kalman filter, said plurality of digital acceleration values, said plurality of relative velocity values, and said plurality of relative position values;
providing, from said Kalman filter, a plurality of interpolated position values; and storing, in said memory, said plurality of interpolated position values.

25. The method of claim 24 further including the steps of:
receiving position calibration data, including a set of predefined positions;
receiving said plurality of interpolated position values;
generating, based at least in part on said position calibration data and said plurality of interpolated position values, a first implied position value, said first implied position value based on one of said predefined positions; and
storing said first implied position value in said memory.

26. The method of claim 24 further including the steps of:
receiving a set of gesture data, said gesture data including one or more data sets associated with each of a plurality of predefined gestures;
receiving said plurality of interpolated position values;
comparing said gesture data and said plurality of interpolated position values;
generating, responsive to said comparing, gesture match data, said gesture match data including matching information associated with one or more of said plurality of predefined gestures; and
storing said gesture match data in said memory.

27. The method of claim 26, wherein said gesture match data is generated at least in part based on a trellis algorithm.

* * * * *